(12) United States Patent
Hayashi et al.

(10) Patent No.: US 12,391,859 B2
(45) Date of Patent: Aug. 19, 2025

(54) COMPOSITION FOR FORMING THERMALLY CONDUCTIVE MATERIAL, AND THERMALLY CONDUCTIVE MATERIAL

(71) Applicant: FUJIFILM Corporation, Tokyo (JP)

(72) Inventors: Daisuke Hayashi, Kanagawa (JP); Seiichi Hitomi, Kanagawa (JP); Teruki Niori, Kanagawa (JP); Keita Takahashi, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 924 days.

(21) Appl. No.: 17/385,092

(22) Filed: Jul. 26, 2021

(65) Prior Publication Data

US 2021/0355364 A1 Nov. 18, 2021

Related U.S. Application Data

(63) Continuation of application No. PCT/JP2019/050619, filed on Dec. 24, 2019.

(30) Foreign Application Priority Data

Feb. 1, 2019 (JP) .................................. 2019-017067

(51) Int. Cl.
| | |
|---|---|
| C09K 5/14 | (2006.01) |
| C08G 59/32 | (2006.01) |
| C08G 59/38 | (2006.01) |
| C08G 59/40 | (2006.01) |
| C08G 59/50 | (2006.01) |
| C08K 3/38 | (2006.01) |
| C08K 9/00 | (2006.01) |

(52) U.S. Cl.
CPC ................ *C09K 5/14* (2013.01); *C08G 59/32* (2013.01); *C08G 59/3227* (2013.01); *C08G 59/38* (2013.01); *C08G 59/4071* (2013.01); *C08G 59/5073* (2013.01); *C08K 3/38* (2013.01); *C08K 9/00* (2013.01); *C08K 2003/385* (2013.01); *C08K 2201/001* (2013.01)

(58) Field of Classification Search
CPC ... C09K 5/14; C08K 3/38; C08K 9/00; C08K 2003/385; C08K 2201/001; C08G 59/32; C08G 59/3227; C08G 59/5073

See application file for complete search history.

(56) References Cited

U.S. PATENT DOCUMENTS

| | | | |
|---|---|---|---|
| 4,855,427 A | 8/1989 | Peter et al. | |
| 2004/0000712 A1 | 1/2004 | Wilson et al. | |
| 2006/0275608 A1 | 12/2006 | Tonapi et al. | |
| 2010/0288968 A1 | 11/2010 | Lin et al. | |
| 2010/0292508 A1 | 11/2010 | Rajendran | |
| 2013/0266812 A1 | 10/2013 | Zeng et al. | |
| 2014/0015000 A1 | 1/2014 | Nishiyama et al. | |
| 2014/0187715 A1 | 7/2014 | Hiwatari et al. | |
| 2015/0183923 A1 | 7/2015 | Potisek et al. | |
| 2015/0323867 A1* | 11/2015 | Iwashita ................ H05K 3/287 430/280.1 |
| 2016/0122604 A1 | 5/2016 | Yoshimoto et al. | |
| 2017/0190885 A1 | 7/2017 | Dadvand et al. | |
| 2017/0247546 A1 | 8/2017 | Takahashi | |
| 2018/0134926 A1 | 5/2018 | Lei et al. | |
| 2019/0085229 A1 | 3/2019 | Takahashi | |
| 2020/0090831 A1 | 3/2020 | Sugimoto et al. | |
| 2020/0180957 A1 | 6/2020 | Hitomi et al. | |
| 2021/0403786 A1 | 12/2021 | Hayashi et al. | |

FOREIGN PATENT DOCUMENTS

| | | |
|---|---|---|
| CN | 102421841 A | 4/2012 |
| CN | 102633990 A | 8/2012 |
| CN | 102634164 A | 8/2012 |
| CN | 104559067 A | 4/2015 |
| CN | 109153567 A | 1/2019 |
| EP | 1832792 A1 | 2/2015 |
| JP | 64-033116 A | 2/1989 |
| JP | 2004-156001 A | 6/2004 |
| JP | 2005-531667 A | 10/2005 |
| JP | 2008-545869 A | 12/2008 |
| JP | 2009-221039 A | 10/2009 |
| JP | 2011-236376 A | 11/2011 |
| JP | 2014-094937 A | 5/2014 |
| JP | 2014-177581 A | 9/2014 |
| JP | 2015-007214 A | 1/2015 |
| JP | 2015-218192 A | 12/2015 |
| JP | 2015-535308 A | 12/2015 |
| JP | 2017-128637 A | 7/2017 |
| JP | 2019-196433 A | 11/2019 |
| KR | 20020036933 A | 5/2002 |

(Continued)

OTHER PUBLICATIONS

Machine translation WO 2015002071 A1 to Yoda et al. Published Jan. 8, 2015 (Year: 2015).*
Taiwanese Office Action dated Mar. 31, 2023 in Taiwanese Application No. 108148435.
Extended European Search Report issued Jan. 18, 2022 in European Application No. 19912415.7.
CVC Thermoset Specialties: "Erisys GE-60 datasheet", 2017, http://www.cvc.emeraldmaterials.com/cms/cvc/fis_ftp.downloadPublicDoc?p_filename=GE60_TDS_ENG.pdf&p_doc_type=TDS (2 pages total).
BASF, "Tinuvin® 479", Technical Information, Feb. 2011, pp. 1-3 (3 pages total).
Office Action issued Jul. 5, 2022 in Japanese Application No. 2020-569449.

(Continued)

*Primary Examiner* — Jane L Stanley
(74) *Attorney, Agent, or Firm* — Sughrue Mion, PLLC

(57) ABSTRACT

A composition for forming a thermally conductive material contains a compound represented by General Formula (1), a phenolic compound, and an inorganic substance, in which a content of the compound represented by General Formula (1) is 30.0% by mass or greater with respect to a total organic solid content, $$(X-Z^1-)_m\text{-A-}(-Z^2-Y)_n \qquad (1).$$

12 Claims, No Drawings

(56) References Cited

FOREIGN PATENT DOCUMENTS

| TW | 201641635 | A |   | 12/2016 |   |          |
|----|-----------|---|---|---------|---|----------|
| TW | 201901885 | A |   | 1/2019  |   |          |
| WO | WO-2015002071 | A1 | * | 1/2015 | ............ | C08F 290/00 |
| WO | 2016/010067 | A1 |   | 1/2016  |   |          |
| WO | 2016/084873 | A1 |   | 6/2016  |   |          |
| WO | 2016/104136 | A1 |   | 6/2016  |   |          |
| WO | 2019/013261 | A1 |   | 1/2019  |   |          |
| WO | 2019/240079 | A1 |   | 12/2019 |   |          |
| WO | 2020/070252 | A1 |   | 4/2020  |   |          |
| WO | 2020/195496 | A1 |   | 10/2020 |   |          |

OTHER PUBLICATIONS

Notification of Reasons for Refusal dated Feb. 6, 2023 from the Chinese Patent Office in Application No. 201980090123.X.
International Search Report dated Mar. 17, 2020 in International Application No. PCT/JP2019/050619.
International Preliminary Report on Patentability dated Jul. 27, 2021 in International Application No. PCT/JP2019/050619.
Written Opinion of the International Searching Authority dated Mar. 17, 2020 in International Application No. PCT/JP2019/050619.
International Search Report dated Mar. 24, 2020 in International Application No. PCT/JP2020/001179.
International Preliminary Report on Patentability issued Jul. 27, 2021 in International Application No. PCT/JP2020/001179.
Written Opinion of the International Searching Authority issued Mar. 24, 2020 in International Application No. PCT/JP2020/001179.
Extended European Search Report dated Feb. 17, 2022 in European Application No. 20744515.6.
Hong Jun Ahn et al., "Effects of amphiphilic agent on thermal conductivity of boron nitride/poly(vinyl butyral) composites", Thermochimica Acta, 2014, vol. 591, pp. 96-100 (5 pages total).
Office Action dated Mar. 20, 2023 from the Taiwanese Patent Office in Application No. 109102199.
Office Action issued Jan. 4, 2023 in Korean Application No. 10-2021-7017907.
Office Action Dated Apr. 12, 2022 issued by the Japanese Patent Office in Japanese Application No. 2020-568089.
Taiwanese Office Action issued Dec. 26, 2023 in Application No. 109102199.
Chinese Office Action and Search Report issued Jan. 6, 2024 in Application No. 202080007122.7.
Office Action issued May 21, 2024 in U.S. Appl. No. 17/344,176.
Office Action issued Oct. 26, 2023 in U.S. Appl. No. 16/740,786.
Office Action issued Sep. 26, 2022 in Chinese Application No. 201880043394.5.
International Search Report dated Oct. 16, 2018 from the International Searching Authority in International Application No. PCT/JP2018/026217.
Written Opinion dated Oct. 16, 2018 from the International Bureau in International Application No. PCT/JP2018/026217.
International Preliminary Report on Patentability dated Jan. 14, 2020 from the International Bureau in International Application No. PCT/JP2018/026217.
Communication dated May 18, 2020, from the European Patent Office in application No. 18831151.8.
Communication dated Sep. 21, 2024 in Chinese Application No. 202080007122.7.
Communication dated Dec. 10, 2024 in U.S. Appl. No. 17/344,176.
Office Action issued Mar. 7, 2025 in European Application No. 20 744 515.6, corresponding to U.S. Appl. No. 17/344,176.
Notice of Allowance issued Jun. 10, 2025 in U.S. Appl. No. 17/344,176.

* cited by examiner

COMPOSITION FOR FORMING THERMALLY CONDUCTIVE MATERIAL, AND THERMALLY CONDUCTIVE MATERIAL

CROSS-REFERENCE TO RELATED APPLICATIONS

This application is a Continuation of PCT International Application No. PCT/JP2019/050619 filed on Dec. 24, 2019, which claims priority under 35 U.S.C § 119(a) to Japanese Patent Application No. 2019-017067 filed on Feb. 1, 2019. Each of the above application(s) is hereby expressly incorporated by reference, in its entirety, into the present application.

BACKGROUND OF THE INVENTION

1. Field of the Invention

The present invention relates to a composition for forming a thermally conductive material, and a thermally conductive material.

2. Description of the Related Art

In recent years, a power semiconductor device used in various electrical machines such as a personal computer, a general household electric appliance, and an automobile has been rapidly miniaturized. With the miniaturization, it is difficult to control heat generated from the power semiconductor device having a high density.

In order to deal with such a problem, a thermally conductive material, which promotes heat dissipation from the power semiconductor device, is used.

For example, JP2008-545869A discloses a "film containing a thermal interface material which is capable of being disposed on a heat transfer surface to fix a heat-generating device to a heat-dissipating component, wherein the film is flowable and crosslinkable, and is capable of transmitting thermal energy from the heat-generating device to the heat-dissipating component (claim 1)". As a component of the film, for example, diethylene glycol diglycidyl ether is proposed (claim 6).

SUMMARY OF THE INVENTION

As a result of an examination of the film described in JP2008-545869A, the present inventors have found that there is room for improvement in thermally conductive properties.

Therefore, an object of the present invention is to provide a composition for forming a thermally conductive material, from which a thermally conductive material having excellent thermally conductive properties can be obtained.

Moreover, another object of the present invention is to provide a thermally conductive material formed of the composition.

As a result of a thorough examination conducted to achieve the objects, the present inventors have found that the objects can be achieved by the following configuration.

[1]
A composition for forming a thermally conductive material, comprising:
a compound represented by General Formula (1);
a phenolic compound; and
an inorganic substance,
in which a content of the compound represented by General Formula (1) is 30.0% by mass or greater with respect to a total organic solid content.

$$(X-Z^1-)_m\text{-A-}(-Z^2-Y)_n \quad (1)$$

In General Formula (1), m represents an integer of 3 or greater.

n represents an integer of 0 or greater.
X represents an epoxy group.
Y represents a hydroxyl group.
$Z^1$ and $Z^2$ each independently represent a single bond or an alkylene group having 1 to 7 carbon atoms.
One or more —$CH_2$—'s constituting the alkylene group may be substituted with —O—.
A represents an (m+n)-valent aliphatic saturated hydrocarbon group.
One or more —$CH_2$—'s constituting the aliphatic saturated hydrocarbon group may be substituted with —O—.
One or more —CH<'s constituting the aliphatic saturated hydrocarbon group may be substituted with —N<.
In a case where there are a plurality of X's, the plurality of X's may be the same as or different from each other.
In a case where there are a plurality of Y's, the plurality of Y's may be the same as or different from each other.
In a case where there are a plurality of Z's, the plurality of Z's may be the same as or different from each other.
In a case where there are a plurality of $Z^2$'s, the plurality of $Z^2$'s may be the same as or different from each other.

[2]
The composition for forming a thermally conductive material as described in [1], in which $Z^1$ is the alkylene group.

[3]
The composition for forming a thermally conductive material as described in [1] or [2], in which the content of the compound represented by General Formula (1) is 40.0% by mass or greater with respect to the total organic solid content.

[4]
The composition for forming a thermally conductive material as described in any one of [1] to [3], in which a compound having an epoxy group, other than the compound represented by General Formula (1), is not substantially contained.

[5]
The composition for forming a thermally conductive material as described in any one of [1] to [4], in which a hydroxyl group content of the phenolic compound is 7.0 mmol/g or greater.

[6]
The composition for forming a thermally conductive material as described in any one of [1] to [5], in which the inorganic substance includes an inorganic nitride.

[7]
The composition for forming a thermally conductive material as described in [6], in which the inorganic nitride includes boron nitride.

[8]
The composition for forming a thermally conductive material as described in [6] or [7], in which a content of the inorganic nitride is 50% by mass or greater with respect to a total mass of the inorganic substance.

[9]
The composition for forming a thermally conductive material as described in any one of [1] to [8], further comprising a curing accelerator.

[10]

The composition for forming a thermally conductive material as described in any one of [6] to [8], further comprising a surface modifier for the inorganic nitride.

[11]

A thermally conductive material which is obtained by curing the composition for forming a thermally conductive material as described in any one of [1] to [10].

According to the present invention, it is possible to provide a composition for forming a thermally conductive material, from which a thermally conductive material having excellent thermally conductive properties can be obtained.

Moreover, according to the present invention, it is possible to provide a thermally conductive material formed of the composition.

DESCRIPTION OF THE PREFERRED EMBODIMENTS

Hereinafter, a composition for forming a thermally conductive material and a thermally conductive material according to an embodiment of the present invention will be described in detail.

The following constituent elements are described based on the representative embodiments of the present invention in some cases, but the present invention is not limited to such an embodiment.

Moreover, in the present specification, the numerical range expressed using "to" means a range including the numerical values listed before and after "to" as a lower limit value and an upper limit value.

Furthermore, in the present specification, an epoxy group is a functional group which is also referred to as an oxiranyl group, and for example, a group, in which two adjacent carbon atoms of a saturated hydrocarbon ring group are bonded to each other through an oxo group (—O—) to form an oxirane ring, and the like are also included in the epoxy group. The epoxy group may or may not have a substituent (a methyl group or the like), if possible.

Furthermore, in the present specification, the description of "(meth)acryloyl group" means "either or both of an acryloyl group and a methacryloyl group". Moreover, the description of "(meth)acrylamide group" means "either or both of an acrylamide group and a methacrylamide group".

In the present specification, an acid anhydride group may be a monovalent group or a divalent group, unless otherwise specified. In a case where the acid anhydride group represents a monovalent group, examples of the monovalent group include a substituent obtained by removing any hydrogen atom from an acid anhydride such as maleic acid anhydride, phthalic acid anhydride, pyromellitic acid anhydride, and trimellitic acid anhydride. Moreover, in a case where the acid anhydride group represents a divalent group, the divalent group means a group represented by *—CO—O—CO—* (* represents a bonding position).

In addition, in the present specification, a substituent or the like, which is not specified whether to be substituted or unsubstituted, may have an additional substituent (for example, a substituent group Y which will be described later), if possible, as long as the desired effect is not impaired. For example, the notation of an "alkyl group" means a substituted or unsubstituted alkyl group as long as the desired effect is not impaired.

Moreover, in the present specification, an expression such as "may" means that conditions for "may" may or may not be satisfied. For example, the expression "may have a substituent" also includes "may not have a substituent".

Furthermore, in the present specification, in a case where the description of "may have a substituent" appears, the kind of a substituent, the position of a substituent, and the number of substituents are not particularly limited. Examples of the number of substituents include 1 and 2 or more. Examples of the substituent include a group of monovalent nonmetallic atoms excluding a hydrogen atom, and the substituent can be selected from the following substituent group Y, for example.

In the present specification, examples of a halogen atom include a chlorine atom, a fluorine atom, a bromine atom, and an iodine atom.

Substituent group Y:

a halogen atom (—F, —Br, —Cl, —I, or the like), a hydroxyl group, an amino group, a carboxylic acid group and a conjugated base group thereof, a carboxylic acid anhydride group, a cyanate ester group, an unsaturated polymerizable group, an epoxy group, an oxetanyl group, an aziridinyl group, a thiol group, an isocyanate group, a thioisocyanate group, an aldehyde group, an alkoxy group, an aryloxy group, an alkylthio group, an arylthio group, an alkyldithio group, an aryldithio group, an N-alkylamino group, an N,N-dialkylamino group, an N-arylamino group, an N,N-diarylamino group, an N-alkyl-N-arylamino group, an acyloxy group, a carbamoyloxy group, an N-alkylcarbamoyloxy group, an N-arylcarbamoyloxy group, an N,N-dialkylcarbamoyloxy group, an N,N-diarylcarbamoyloxy group, an N-alkyl-N-arylcarbamoyloxy group, an alkylsulfoxy group, an arylsulfoxy group, an acylthio group, an acylamino group, an N-alkylacylamino group, an N-arylacylamino group, a ureido group, an N'-alkylureido group, an N',N'-dialkylureido group, an N'-arylureido group, an N',N'-diarylureido group, an N'-alkyl-N'-arylureido group, an N-alkylureido group, an N-arylureido group, an N'-alkyl-N-alkylureido group, an N'-alkyl-N-arylureido group, an N',N'-dialkyl-N-alkylureido group, an N',N'-dialkyl-N-arylureido group, an N'-aryl-N-alkylureido group, an N'-aryl-N-arylureido group, an N',N'-diaryl-N-alkylureido group, an N',N'-diaryl-N-arylureido group, an N'-alkyl-N'-aryl-N-alkylureido group, an N'-alkyl-N'-aryl-N-arylureido group, an alkoxycarbonylamino group, an aryloxycarbonylamino group, an N-alkyl-N-alkoxycarbonylamino group, an N-alkyl-N-aryloxycarbonylamino group, an N-aryl-N-alkoxycarbonylamino group, an N-aryl-N-aryloxycarbonylamino group, a formyl group, an acyl group, an alkoxycarbonyl group, an aryloxycarbonyl group, a carbamoyl group, an N-alkylcarbamoyl group, an N,N-dialkylcarbamoyl group, an N-arylcarbamoyl group, an N,N-diarylcarbamoyl group, an N-alkyl-N-arylcarbamoyl group, an alkylsulfinyl group, an arylsulfinyl group, an alkylsulfonyl group, an arylsulfonyl group, a sulfo group (—SO$_3$H) and a conjugated base group thereof, an alkoxysulfonyl group, an aryloxysulfonyl group, a sulfinamoyl group, an N-alkylsulfinamoyl group, an N,N-dialkylsulfinamoyl group, an N-arylsulfinamoyl group, an N,N-diarylsulfinamoyl group, an N-alkyl-N-arylsulfinamoyl group, a sulfamoyl group, an N-alkylsulfamoyl group, an N,N-dialkylsulfamoyl group, an N-arylsulfamoyl group, an N,N-diarylsulfamoyl group, an N-alkyl-N-arylsulfamoyl group, an N-acylsulfamoyl group and a conjugated base group thereof, an N-alkylsulfonylsulfamoyl group (—SO$_2$NHSO$_2$(alkyl)) and a conjugated base group thereof, an N-arylsulfonylsulfamoyl group (—SO$_2$NHSO$_2$(aryl)) and a conjugated base group thereof, an N-alkylsulfonylcarbamoyl group (—CONHSO$_2$(alkyl)) and a conjugated base group thereof, an N-arylsulfonylcarbamoyl group (—CONHSO$_2$(aryl)) and a conjugated base group thereof, an alkoxysilyl group (—Si(Oalkyl)$_3$), an aryloxysilyl group (—Si(Oaryl)$_3$), a hydroxysilyl group (—Si(OH)$_3$) and a conjugated base group thereof, a phosphono group (—PO$_3$H$_2$) and a conjugated base group thereof, a dialkylphosphono group (—PO$_3$(alkyl)$_2$), a diarylphosphono group (—PO$_3$(aryl)$_2$), an alkylarylphosphono group (—PO$_3$(alkyl)(aryl)), a monoalkylphosphono group (—PO$_3$H(alkyl)) and a conjugated base group thereof, a monoarylphosphono group (—PO$_3$H(aryl)) and a conjugated base group thereof, a phosphonooxy group (—OPO$_3$H$_2$) and a conjugated base group thereof, a dialkylphosphonooxy group (—OPO$_3$(alkyl)$_2$), a diarylphosphonooxy group (—OPO$_3$(aryl)$_2$), an alkylarylphosphonooxy group (—OPO$_3$(alkyl)(aryl)), a monoalkylphosphonooxy group (—OPO$_3$H(alkyl)) and a conjugated base group thereof, a monoarylphosphonooxy group (—OPO$_3$H(aryl)) and a conjugated base group thereof, a cyano group, a nitro group, an aryl group, an alkenyl group, an alkynyl group, and an alkyl group.

Moreover, these substituents may or may not form a ring by being bonded to each other, if possible, or by being bonded to a group substituted with the substituent.

[Composition]

The composition for forming a thermally conductive material (hereinafter, also simply referred to as a "composition") according to the embodiment of the present invention is a composition for forming a thermally conductive material, which contains a compound represented by General Formula (1), a phenolic compound, and an inorganic substance, and a content of the compound represented by General Formula (1) is 30% by mass or greater with respect to a total organic solid content.

The mechanism by which the objects of the present invention are achieved with the composition according to the embodiment of the present invention, which adopts the constitution described above, is not always clear, but the present inventors estimate as follows.

That is, the compound represented by General Formula (1) is a compound which is in a extending radially structure and has an aliphatic saturated hydrocarbon group. Such a compound represented by General Formula (1) is likely to make a viscosity of the entire composition relatively low even in the coexistence with the phenolic compound and the inorganic substance in order to improve thermally conductive properties of the thermally conductive material, and foam removal from the composition is also favorable. Accordingly, in a case where the content of the compound represented by General Formula (1) is 30% by mass or greater with respect to the total organic solid content, microbubbles, which adversely affect thermally conductive properties, are less likely to remain in a cured substance (thermally conductive material) obtained by curing the composition, and thus thermally conductive properties of the obtained thermally conductive material are improved. Furthermore, it is estimated that the compound represented by General Formula (1) has three or more epoxy groups and can increase a crosslink density of the thermally conductive material, which also contributes to the thermally conductive properties of the obtained thermally conductive material.

In addition, a thermally conductive material formed of the composition according to the embodiment of the present invention also has favorable insulating properties and adhesiveness.

Hereinafter, the components contained in the composition will be described in detail.

[Compound Represented by General Formula (1)]

General Formula (1) will be shown below.

$$(X-Z^1-)_m-A-(-Z^2-Y)_n \quad (1)$$

In General Formula (1), m represents an integer of 3 or greater.

Among them, m is preferably 3 to 20, more preferably 3 to 10, and even more preferably 3 to 6.

In General Formula (1), n represents an integer of 0 or greater.

Among them, n is preferably 0 to 5, more preferably 0 or 1, and even more preferably 0.

In General Formula (1), X represents an epoxy group.

The epoxy group may have one or more substituents, if possible, and as the substituent, an alkyl group is preferable, a linear or branched alkyl group having 1 to 5 carbon atoms is more preferable, and a methyl group is even more preferable.

The epoxy group preferably does not have a substituent.

In particular, the epoxy group represented by X is preferably an epoxy group represented by the following general formula.

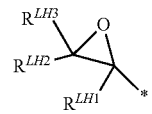

In the general formula, $R^{LH1}$, $R^{LH2}$, and $R^{LH3}$ each independently represent a hydrogen atom or a substituent, and a hydrogen atom is preferable.

As the substituent, an alkyl group is preferable, a linear or branched alkyl group having 1 to 5 carbon atoms is more preferable, and a methyl group is even more preferable.

In the general formula, * represents a bonding position.

In General Formula (1), $Z^1$ and $Z^2$ each independently represent a single bond or an alkylene group having 1 to 7 carbon atoms.

The alkylene group may be linear or branched, and is preferably linear.

The alkylene group preferably does not have a substituent.

The number of carbon atoms in the alkylene group is 1 to 7, preferably 1 to 4, and more preferably 1 or 2.

Furthermore, the number of carbon atoms mentioned here is the number of carbon atoms in a state before —CH$_2$— constituting the alkylene group is substituted with —O—, as will be described below.

One or more (preferably one to four and more preferably one) —CH$_2$-'s constituting the alkylene group may be substituted with —O—. Here, an atom adjacent to —O—, which has been substituted for —CH$_2$—, is preferably a carbon atom or a nitrogen atom, and more preferably a carbon atom.

In particular, $Z^1$ is preferably the alkylene group (the alkylene group in which one or more —CH$_2$-'s may be substituted with —O—), and more preferably "—(CH$^2$)$_{ZN}$—O—". ZN in "—(CH$^2$)$_{ZN}$—O—" represents an integer of 1 to 6, and is preferably 1 to 3 and more preferably 1. "—(CH²)$_{ZN}$—" in "—(CH²)$_{ZN}$—O—" is preferably present on an X side (epoxy group side).

Z² is preferably a single bond.

A represents an (m+n)-valent aliphatic saturated hydrocarbon group.

The aliphatic saturated hydrocarbon group may be linear or branched, and may have a cyclic structure. The aliphatic saturated hydrocarbon group is preferably branched group which does not have a cyclic structure.

The aliphatic saturated hydrocarbon group preferably does not have a substituent other than "X—Z¹—" and "—Z²—Y".

The number of carbon atoms in the aliphatic saturated hydrocarbon group is preferably 1 to 30, more preferably 3 to 20, and even more preferably 2 to 15.

Furthermore, the preferred number of carbon atoms mentioned here is the number of carbon atoms in a state before —CH$_2$— and/or —CH<constituting the aliphatic saturated hydrocarbon group is substituted with —O— and/or —N<, as will be described below.

One or more (preferably one to ten and more preferably one) —CH$_2$-'s constituting the aliphatic saturated hydrocarbon group may be substituted with —O—. Here, an atom adjacent to —O—, which has been substituted for —CH$_2$—, is preferably a carbon atom or a nitrogen atom, and more preferably a carbon atom.

Moreover, one or more (preferably one to five and more preferably one) —CH<'s constituting the aliphatic saturated hydrocarbon group may be substituted with —N<. Here, an atom adjacent to —N<, which has been substituted for —CH<, is preferably a carbon atom, an oxygen atom, or a nitrogen atom, and more preferably a carbon atom.

In particular, A is preferably any group represented by the following general formulae.

Furthermore, in the following general formulae, * represents a bonding position.

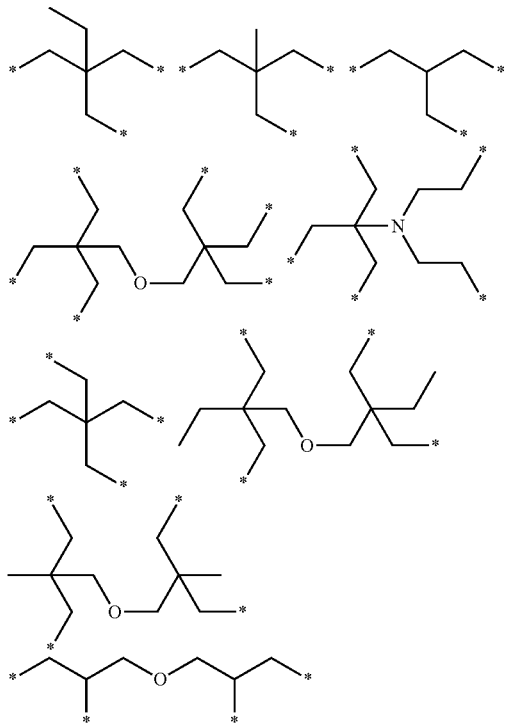

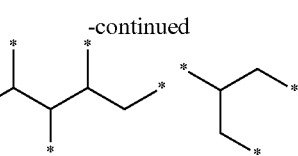

-continued

In General Formula (1), in a case where there are a plurality of X's, the plurality of X's may be the same as or different from each other. In a case where there are a plurality of Y's, the plurality of Y's may be the same as or different from each other. In a case where there are a plurality of Z's, the plurality of Z's may be the same as or different from each other. In a case where there are a plurality of Z²'s, the plurality of Z²'s may be the same as or different from each other.

The lower limit value of an epoxy group content of the compound represented by General Formula (1) is preferably 4.0 mmol/g or greater and more preferably 7.0 mmol/g or greater. The upper limit value thereof is preferably 20.0 mmol/g or less and more preferably 15.0 mmol/g or less.

Moreover, the epoxy group content means the number of epoxy groups contained in 1 g of a compound having an epoxy group.

The compound represented by General Formula (1) is preferably a liquid at room temperature (23° C.).

The content of the compound represented by General Formula (1) in the composition according to the embodiment of the present invention is preferably 3.0% to 30.0% by mass, more preferably 6.0% to 20.0% by mass, and even more preferably 9.0% to 17.0% by mass, with respect to the total solid content.

In the present specification, the solid content of the composition means all components except for a solvent in a case where the composition contains the solvent, and as long as the component is a component other than the solvent, the component is considered to be a solid content even in a case where the component is a liquid component.

The content of the compound represented by General Formula (1) in the composition according to the embodiment of the present invention is 30.0% by mass or greater, more preferably 40.0% by mass or greater, and even more preferably greater than 40.0% by mass, with respect to the total organic solid content. The upper limit thereof is preferably 70.0% by mass or less and more preferably 60.0% by mass or less.

Furthermore, the organic solid content of the composition in the present specification means all components except for the inorganic substance and the solvent (any component), and as long as the component is a component other than the inorganic substance and the solvent, the component is considered to be an organic solid content even in a case where the component is a liquid component.

[Inorganic Substance]

The composition contains an inorganic substance.

As the inorganic substance, any inorganic substances, which have been used in the related art in an inorganic filler of a thermally conductive material, may be used. The inorganic substance preferably includes an inorganic nitride or an inorganic oxide and more preferably includes an inorganic nitride, from the viewpoint that the thermally conductive properties and insulating properties of the thermally conductive material are superior.

A shape of the inorganic substance is not particularly limited, and may be particulate, a film shape, or a plate shape. Examples of a shape of the particulate inorganic substance include a rice grain shape, a spherical shape, a cubical shape, a spindle shape, a scale shape, an aggregation shape, and an amorphous shape.

Examples of the inorganic oxide include zirconium oxide ($ZrO_2$), titanium oxide ($TiO_2$), silicon oxide ($SiO_2$), aluminum oxide ($Al_2O_3$), iron oxide ($Fe_2O_3$, FeO, or $Fe_3O_4$), copper oxide (CuO or $Cu_2O$), zinc oxide (ZnO), yttrium oxide ($Y_2O_3$), niobium oxide ($Nb_2O_5$), molybdenum oxide ($MoO_3$), indium oxide ($In_2O_3$ or $In_2O$), tin oxide ($SnO_2$), tantalum oxide ($Ta_2O_5$), tungsten oxide ($WO_3$ or $W_2O_5$), lead oxide (PbO or $PbO_2$), bismuth oxide ($Bi_2O_3$), cerium oxide ($CeO_2$ or $Ce_2O_3$), antimony oxide ($Sb_2O_3$ or $Sb_2O_5$), germanium oxide ($GeO_2$ or GeO), lanthanum oxide ($La_2O_3$), and ruthenium oxide ($RuO_2$).

Only one kind of the inorganic oxides may be used, or two or more kinds thereof may be used.

The inorganic oxide is preferably titanium oxide, aluminum oxide, or zinc oxide, and more preferably aluminum oxide.

The inorganic oxide may be an oxide which is produced by oxidizing a metal prepared as a nonoxide in an environment or the like.

Examples of the inorganic nitride include boron nitride (BN), carbon nitride ($C_3N_4$), silicon nitride ($Si_3N_4$), gallium nitride (GaN), indium nitride (InN), aluminum nitride (AlN), chromium nitride ($Cr_2N$), copper nitride ($Cu_3N$), iron nitride ($Fe_4N$), iron nitride ($Fe_3N$), lanthanum nitride (LaN), lithium nitride ($Li_3N$), magnesium nitride ($Mg_3N_2$), molybdenum nitride ($Mo_2N$), niobium nitride (NbN), tantalum nitride (TaN), titanium nitride (TiN), tungsten nitride ($W_2N$), tungsten nitride ($WN_2$), yttrium nitride (YN), and zirconium nitride (ZrN).

The inorganic nitride preferably contains an aluminum atom, a boron atom, or a silicon atom, more preferably includes aluminum nitride, boron nitride, or silicon nitride, even more preferably includes aluminum nitride or boron nitride, and particularly preferably includes boron nitride.

Only one kind of the inorganic nitrides may be used, or two or more kinds thereof may be used.

A size of the inorganic substance is not particularly limited, but from the viewpoint that the dispersibility of the inorganic substance is superior, an average particle diameter of the inorganic substances is preferably 500 μm or less, more preferably 300 μm or less, and even more preferably 200 μm or less. The lower limit thereof is not particularly limited, but is preferably 10 nm or greater and more preferably 100 nm or greater, from the viewpoint of handleability.

For the average particle diameter of the inorganic substances, in a case where a commercial product is used, the value listed in the catalog is adopted. In a case where a value is not listed in the catalog, as a method for measuring the average particle diameter, 100 inorganic substances are randomly selected using an electron microscope, particle diameters (major axes) of the respective inorganic substances are measured, and the arithmetic mean thereof is determined.

Only one kind of the inorganic substances may be used, or two or more kinds thereof may be used.

The inorganic substance preferably includes at least one of an inorganic nitride or an inorganic oxide, and more preferably includes at least an inorganic nitride.

The inorganic nitride preferably includes at least one of boron nitride or aluminum nitride and more preferably includes at least boron nitride.

A content of the inorganic nitride (preferably boron nitride) in the inorganic substance is preferably 10% by mass or greater, more preferably 50% by mass or greater, and even more preferably 80% by mass or greater, with respect to the total mass of the inorganic substance. The upper limit thereof is 100% by mass or less.

The inorganic oxide is preferably aluminum oxide.

From the viewpoint that the thermally conductive properties of the thermally conductive material are superior, the composition more preferably contains at least inorganic substances having an average particle diameter of 20 μm or greater (preferably, 40 μm or greater).

A content of the inorganic substance in the composition is preferably 40% to 95% by mass, more preferably 50% to 95% by mass, and even more preferably 60% to 95% by mass, with respect to the total solid content of the composition.

[Phenolic Compound]

The composition according to the embodiment of the present invention contains a phenolic compound.

The phenolic compound is a compound having one or more (preferably two or more and more preferably three or more) phenolic hydroxyl groups.

From the viewpoint that the effect of the present invention is superior, the phenolic compound is preferably one or more kinds selected from the group consisting of compounds represented by General Formula (P1) and compounds represented by General Formula (P2).

<Compound Represented by General Formula (P1)>

General Formula (P1) will be shown below.

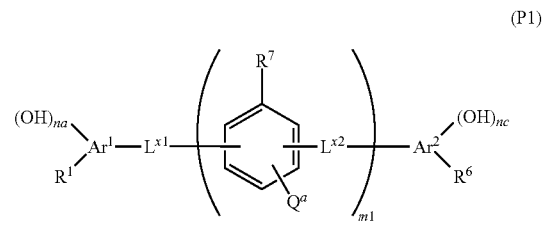

(P1)

In General Formula (P1), m1 represents an integer of 0 or greater.

m1 is preferably 0 to 10, more preferably 0 to 3, even more preferably 0 or 1, and particularly preferably 1.

In General Formula (P1), na and nc each independently represent an integer of 1 or greater.

na and nc are each independently preferably 1 to 4.

In General Formula (P1), $R^1$ and $R^6$ each independently represent a hydrogen atom, a halogen atom, a carboxylic acid group, a boronic acid group, an aldehyde group, an alkyl group, an alkoxy group, or an alkoxycarbonyl group.

The alkyl group may be linear or branched. The number of carbon atoms in the alkyl group is preferably 1 to 10. The alkyl group may or may not have a substituent.

An alkyl group moiety in the alkoxy group and an alkyl group moiety in the alkoxycarbonyl group are the same as the aforementioned alkyl group.

$R^1$ and $R^6$ are each independently preferably a hydrogen atom or a halogen atom, more preferably a hydrogen atom or a chlorine atom, and even more preferably a hydrogen atom.

In General Formula (P1), $R^7$ represents a hydrogen atom or a hydroxyl group.

In a case where there are a plurality of $R^7$'s, the plurality of $R^7$'s may be the same as or different from each other.

In a case where there are the plurality of $R^7$'s, it is also preferable that at least one $R^7$ among the plurality of $R^7$'s represents a hydroxyl group.

In General Formula (P1), $L^{x1}$ represents a single bond, —C($R^2$)($R^3$)—, or —CO—, and is preferably —C($R^2$)($R^3$)— or —CO—.

$L^{x2}$ represents a single bond, —C($R^4$)($R^5$)—, or —CO—, and is preferably —C($R^4$)($R^5$)— or —CO—.

$R^2$ to $R^5$ each independently represent a hydrogen atom or a substituent.

The substituents are each independently preferably a hydroxyl group, a phenyl group, a halogen atom, a carboxylic acid group, a boronic acid group, an aldehyde group, an alkyl group, an alkoxy group, or an alkoxycarbonyl group, and more preferably a hydroxyl group, a halogen atom, a carboxylic acid group, a boronic acid group, an aldehyde group, an alkyl group, an alkoxy group, or an alkoxycarbonyl group.

The alkyl group may be linear or branched. The number of carbon atoms in the alkyl group is preferably 1 to 10. The alkyl group may or may not have a substituent.

An alkyl group moiety in the alkoxy group and an alkyl group moiety in the alkoxycarbonyl group are the same as the aforementioned alkyl group.

The phenyl group may or may not have a substituent, and in a case where the phenyl group has a substituent, it is more preferable to have one to three hydroxyl groups.

$R^2$ to $R^5$ are each independently preferably a hydrogen atom or a hydroxyl group and more preferably a hydrogen atom.

$L^{x1}$ and $L^{x2}$ are each independently preferably —CH$_2$—, —CH(OH)—, —CO—, or —CH(Ph)—.

Ph represents a phenyl group which may have a substituent.

Furthermore, in General Formula (P1), in a case where there are a plurality of $R^4$'s, the plurality of $R^4$'s may be the same as or different from each other. In a case where there are a plurality of $R^5$'s, the plurality of $R^5$'s may be the same as or different from each other.

In General Formula (P1), $Ar^1$ and $Ar^2$ each independently represent a benzene ring group or a naphthalene ring group.

$Ar^1$ and $Ar^2$ are each independently preferably a benzene ring group.

In General Formula (P1), $Q^a$ represents a hydrogen atom, an alkyl group, a phenyl group, a halogen atom, a carboxylic acid group, a boronic acid group, an aldehyde group, an alkoxy group, or an alkoxycarbonyl group.

The alkyl group may be linear or branched. The number of carbon atoms in the alkyl group is preferably 1 to 10. The alkyl group may or may not have a substituent.

An alkyl group moiety in the alkoxy group and an alkyl group moiety in the alkoxycarbonyl group are the same as the aforementioned alkyl group.

The phenyl group may or may not have a substituent.

$Q^a$ is preferably bonded to a para position with respect to a hydroxyl group that a benzene ring group, to which $Q^a$ is bonded, may have.

$Q^a$ is preferably a hydrogen atom or an alkyl group. The alkyl group is preferably a methyl group.

Furthermore, in General Formula (P1), in a case where there are a plurality of $R^7$'s, $L^2$'s and/or $Q^a$'s, the plurality of $R^7$'s may be the same as or different from each other, the plurality of $L^x$'s may be the same as or different from each other, and/or the plurality of $Q^a$'s may be the same as or different from each other.

<Compound Represented by General Formula (P2)>
General Formula (P2) will be shown below.

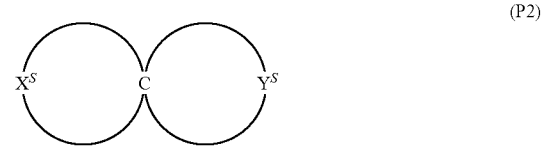

In General Formula (P2), C represents a carbon atom which is a spiro atom.

In General Formula (P2), $X^S$ and $Y^S$ each independently represent a divalent linking group having one or more phenolic hydroxyl groups.

Both terminals of $X^S$ are each bonded to the same carbon atom C. Both terminals of Ys are each bonded to the same carbon atom C. Moreover, the carbon atom C to which the both terminals of $X^S$ are bonded, and the carbon atom C to which the both terminals of Ys are bonded are the same, and the compound represented by General Formula (P2) is a spiro compound having the carbon atom C as a spiro atom.

$X^S$ and $Y^S$ are each independently preferably a group represented by General Formula (P2L).

$$—CR^{S1}R^{S2}-L^{S1}-L^{S2}-L^{S3}-\qquad(P2L)$$

Moreover, a group represented by General Formula (P2L) for $X^S$, and a group represented by General Formula (P2L) for $Y^S$ may be the same as or different from each other.

In General Formula (P2L), $R^{S1}$ and $R^{S2}$ each independently represent a hydrogen atom or a substituent.

Among them, $R^{S1}$ and $R^{S2}$ are each preferably a hydrogen atom.

In General Formula (P2L), $L^{S1}$ represents —$CR^{S3}R^{S4}$—, —O—, or —S—.

$R^{S3}$ and $R^{S4}$ each independently represent a hydrogen atom or a substituent.

Substituents represented by $R^{S3}$ and $R^{S4}$ are each independently preferably an alkyl group or an aryl group.

The alkyl group may be linear or branched. The number of carbon atoms in the alkyl group is preferably 1 to 6.

The aryl group may be monocyclic or polycyclic. The number of carbon atoms in the aryl group is preferably 6 to 15 and more preferably 6. Examples of a substituent that the aryl group may have include a hydroxyl group.

In particular, $L^{S1}$ is preferably —$CR^{S3}R^{S4}$— and more preferably —C(CH$_3$)$_2$—.

In General Formula (P2L), $L^{S2}$ represents a divalent linking group having a phenolic hydroxyl group.

$L^{S2}$ is preferably an aromatic ring group having a phenolic hydroxyl group as a substituent, or —$CR^{S5}R^{S6}$—.

The aromatic ring group in the aromatic ring group having a phenolic hydroxyl group as a substituent may be monocyclic or polycyclic. The aromatic ring group may be an aromatic hydrocarbon ring group or an aromatic heterocyclic group. The number of carbon atoms in the aromatic ring group is preferably 6 to 15 and more preferably 6.

The number of the phenolic hydroxyl groups that the aromatic ring group has as the substituent is 1 or more, preferably 1 to 5, and more preferably 1 or 2. The aromatic ring group may have a substituent (preferably an alkyl group having 1 to 3 carbon atoms), in addition to a hydroxyl group (phenolic hydroxyl group).

The aromatic ring group having a phenolic hydroxyl group as a substituent is preferably a benzene ring group having one or two hydroxyl groups as a substituent, and more preferably a 1,2-benzenediyl group having one or two hydroxyl groups as a substituent.

$R^{S5}$ in —$CR^{S5}R^{S6}$— represents a hydrogen atom or a substituent.

$R^{S6}$ in —$CR^{S5}R^{S6}$— represents an aryl group having a hydroxyl group as a substituent.

The aryl group in the aryl group having a hydroxyl group as a substituent may be monocyclic or polycyclic. The number of carbon atoms in the aryl group is preferably 6 to 15 and more preferably 6.

In the aryl group having a hydroxyl group as a substituent, the number of the hydroxyl groups as a substituent is 1 or more, preferably 1 to 5, and more preferably 1 or 2. The aryl group in the aryl group having a hydroxyl group as a substituent may have a substituent, in addition to a hydroxyl group (phenolic hydroxyl group).

The aryl group having a hydroxyl group as a substituent is preferably a hydroxyphenyl group and more preferably a 4-hydroxyphenyl group.

In particular, $L^{S2}$ is preferably an aromatic ring group having a phenolic hydroxyl group as a substituent, more preferably a benzene ring group having one or two hydroxyl groups as a substituent, and even more preferably a 1,2-benzenediyl group having one or two hydroxyl groups as a substituent.

In General Formula (P2L), $L^{S3}$ represents a single bond, an alkylene group, —O—, or —S—.

The alkylene group may be linear or branched, and is preferably linear.

The number of carbon atoms in the alkylene group is preferably 1 to 6 and more preferably 1 to 3.

As the alkylene group, —C(CH$_3$)$_2$— or —CH$_2$—CH$_2$— is preferable.

In particular, $L^{S3}$ is preferably —O—.

<Compound Represented by any One of General Formula (B01), . . . , or (B03) and Having Phenolic Hydroxyl Group>

In addition, the phenolic compound may be a compound (compound represented by any one of General Formula (B01), . . . , or (B03) and having a phenolic hydroxyl group) represented by any one of General Formula (B01), . . . , or (B03) in a surface modifier, which will be described later, and having one or more phenolic hydroxyl groups.

The compound used as the phenolic compound is a compound represented by General Formula (B02) or (B03), and is preferably a compound having two or more groups, which are represented by General Formula (B2R) and have a hydroxyl group as a specific functional group, and more preferably a compound having three or more aforementioned groups. Moreover, it is also preferable that the compound used as the phenolic compound is a compound represented by General Formula (B02) or (B03) and having only a hydroxyl group as a specific functional group.

The details of General Formulae (B01) to (B03) will be described later.

In addition to the aforementioned phenolic compounds, as the phenolic compound, for example, benzene polyol such as benzenetriol, a biphenyl aralkyl-type phenolic resin, a phenol novolac resin, a cresol novolac resin, an aromatic hydrocarbon formaldehyde resin-modified phenolic resin, a dicyclopentadiene phenol addition-type resin, a phenol aralkyl resin, a polyhydric phenol novolac resin synthesized from a polyhydric hydroxy compound and formaldehyde, a naphthol aralkyl resin, a trimethylolmethane resin, a tetraphenylolethane resin, a naphthol novolac resin, a naphthol phenol co-condensed novolac resin, a naphthol cresol co-condensed novolac resin, a biphenyl-modified phenolic resin, a biphenyl-modified naphthol resin, an aminotriazine-modified phenolic resin, an alkoxy group-containing aromatic ring-modified novolac resin, or the like is also preferable.

The lower limit value of the hydroxyl group content of the phenolic compound is preferably 3.0 mmol/g or greater and more preferably 7.0 mmol/g or greater. The upper limit value thereof is preferably 25.0 mmol/g or less and more preferably 20.0 mmol/g or less.

Moreover, the hydroxyl group content means the number of hydroxyl groups (preferably, phenolic hydroxyl groups) contained in 1 g of the phenolic compound.

Furthermore, the phenolic compound may have an active hydrogen-containing group (carboxylic acid group or the like) capable of a polymerization reaction with an epoxy compound, in addition to the hydroxyl group. The lower limit value of the content (total content of hydrogen atoms in a hydroxyl group, a carboxylic acid group, and the like) of an active hydrogen in the phenolic compound is preferably 3.0 mmol/g or greater and more preferably 7.0 mmol/g or greater. The upper limit value thereof is preferably 25.0 mmol/g or less and more preferably 20.0 mmol/g or less.

Moreover, the content of the active hydrogen means the number of active hydrogen atoms contained in 1 g of the phenolic compound.

The upper limit value of the molecular weight of the phenolic compound is preferably 600 or less, more preferably 500 or less, even more preferably 450 or less, and particularly preferably 400 or less. The lower limit value thereof is preferably 110 or greater and more preferably 300 or greater.

One kind of the phenolic compounds may be used singly, or two or more kinds thereof may be used.

In a case where the composition according to the embodiment of the present invention contains the phenolic compound, the content of the phenolic compound is preferably 1.0% by mass or greater, more preferably 3.0% to 25.0% by mass, and even more preferably 5.0% to 20.0% by mass, with respect to the total solid content of the composition.

Furthermore, the composition according to the embodiment of the present invention may contain compounds (also referred to as "other active hydrogen-containing compounds") having a group capable of reacting with the epoxy group, as compounds other than the phenolic compound.

In a case where the composition according to the embodiment of the present invention contains the phenolic compound and also contains the other active hydrogen-containing compounds, a mass ratio (content of other active hydrogen-containing compounds/content of phenolic compound) of a content of the other active hydrogen-containing compounds to the content of the phenolic compound in the composition according to the embodiment of the present invention is preferably 0 to 1, more preferably 0 to 0.1, and even more preferably 0 to 0.05.

[Other Epoxy Compounds]

The composition according to the embodiment of the present invention may further contain epoxy compounds (other epoxy compounds) other than the compound represented by General Formula (1).

The other epoxy compounds are compounds having at least one epoxy group (oxiranyl group) in one molecule. The epoxy group may or may not have a substituent, if possible.

The number of epoxy groups contained in the other epoxy compounds is preferably 2 or greater, more preferably 2 to 40, even more preferably 2 to 10, and particularly preferably 2, in one molecule.

A molecular weight of the other epoxy compounds is preferably 150 to 10,000, more preferably 150 to 2,000, and even more preferably 250 to 400.

The lower limit value of the epoxy group content of the other epoxy compounds is preferably 2.0 mmol/g or greater, more preferably 4.0 mmol/g or greater, and even more preferably 5.0 mmol/g or greater. The upper limit value thereof is preferably 20.0 mmol/g or less, more preferably 15.0 mmol/g or less, and even more preferably 10.0 mmol/g or less.

Moreover, the epoxy group content means the number of epoxy groups contained in 1 g of the epoxy compound.

The other epoxy compounds may or may not exhibit liquid crystallinity.

That is, the other epoxy compounds may be liquid crystal compounds. In other words, a liquid crystal compound having an epoxy group can also be used as the other epoxy compounds.

Examples of the other epoxy compounds (which may be other epoxy compounds having liquid crystallinity) include a compound (rod-like compound) which has a rod-like structure in at least a portion thereof, and a compound (discotic compound) which has a disk-like structure in at least a portion thereof.

Among them, a rod-like compound is preferable from the viewpoint that the thermally conductive properties of the obtained thermally conductive material are superior.

Hereinafter, the rod-like compound and the discotic compound will be described in detail.

(Rod-Like Compound)

Examples of the other epoxy compounds, which are rod-like compounds, include azomethines, azoxies, cyanobiphenyls, cyanophenyl esters, benzoic acid esters, cyclohexane carboxylic acid phenyl esters, cyanophenyl cyclohexanes, cyano-substituted phenylpyrimidines, alkoxy-substituted phenylpyrimidines, phenyldioxanes, tolans, and alkenylcyclohexyl benzonitriles. In addition to these low-molecular-weight compounds described above, high-molecular-weight compounds can also be used. The aforementioned high-molecular-weight compounds are high-molecular-weight compounds obtained by polymerizing rod-like compounds having a low-molecular-weight reactive group.

Examples of a preferred rod-like compound include a rod-like compound represented by General Formula (E1).

Among them, the rod-like compound is preferably a compound represented by General Formula (E1).

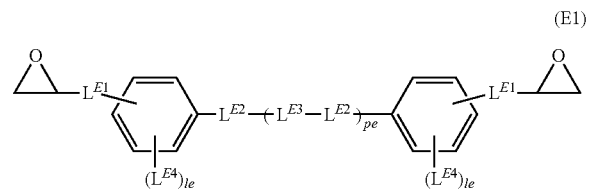

(E1)

In General Formula (E1), $L^{E1}$'s each independently represent a single bond or a divalent linking group.

Among them, $L^{E1}$ is preferably a divalent linking group.

The divalent linking group is preferably —O—, —S—, —CO—, —NH—, —CH=CH—, —C≡C—, —CH=N—, —N=CH—, —N=N—, an alkylene group which may have a substituent, or a group consisting of a combination of two or more thereof, and more preferably —O-alkylene group- or -alkylene group-O—.

Moreover, the alkylene group may be any one of linear, branched, or cyclic, but is preferably a linear alkylene group having 1 or 2 carbon atoms.

The plurality of $L^{E1}$'s may be the same as or different from each other.

In General Formula (E1), $L^{E2}$'s each independently represent a single bond, —CH=CH—, —CO—O—, —O—CO—, —C(—CH$_3$)=CH—, —CH=C(—CH$_3$)—, —CH=N—, —N=CH—, —N=N—, —C≡C—, —N=N+(—O—)—, —N+(—O—)=N—, —CH=N+(—O—)—, —N+(—O—)=CH—, —CH=CH—CO—, —CO—CH=CH—, —CH=C(—CN)—, or —C(—CN)=CH—.

Among them, $L^{E2}$'s are each independently preferably a single bond, —CO—O—, or —O—CO—.

In a case where there are a plurality of $L^{E2}$'s, the plurality of $L^{E2}$'s may be the same as or different from each other.

In General Formula (E1), $L^{E3}$'s each independently represent a single bond, a 5-membered or 6-membered aromatic ring group or a 5-membered or 6-membered non-aromatic ring group, which may have a substituent, or a polycyclic group consisting of these rings.

Examples of the aromatic ring group and non-aromatic ring group represented by $L^{E3}$ include a 1,4-cyclohexanediyl group, a 1,4-cyclohexenediyl group, a 1,4-phenylene group, a pyrimidine-2,5-diyl group, a pyridine-2,5-diyl group, a 1,3,4-thiadiazole-2,5-diyl group, a 1,3,4-oxadiazole-2,5-diyl group, a naphthalene-2,6-diyl group, a naphthalene-1,5-diyl group, a thiophene-2,5-diyl group, and a pyridazine-3,6-diyl group, each of which may have a substituent. In a case of the 1,4-cyclohexanediyl group, the group may be any one isomer of structural isomers of a trans-isomer and a cis-isomer, or a mixture in which the isomers are mixed at any ratio. Among them, a trans-isomer is preferable.

In particular, $L^{E3}$ is preferably a single bond, a 1,4-phenylene group, or a 1,4-cyclohexenediyl group.

The substituents contained in the groups represented by $L^{E3}$ are each independently preferably an alkyl group, an alkoxy group, a halogen atom, a cyano group, a nitro group, or an acetyl group, and more preferably an alkyl group (preferably having one carbon atom).

Furthermore, in a case where there are a plurality of substituents, these substituents may be the same as or different from each other.

In a case where there are a plurality of $L^{E3}$'s, the plurality of $L^{E3}$'s may be the same as or different from each other.

In General Formula (E1), pe represents an integer of 0 or greater.

In a case where pe is an integer of 2 or greater, a plurality of (-$L^{E3}$-$L^{E2}$-)'s may be the same as or different from each other.

Among them, pe is preferably 0 to 2, more preferably 0 or 1, and even more preferably 0.

In General Formula (E1), $L^{E4}$'s each independently represent a substituent.

The substituents are each independently preferably an alkyl group, an alkoxy group, a halogen atom, a cyano group, a nitro group, or an acetyl group, and more preferably an alkyl group (preferably having one carbon atom).

The plurality of $L^{E4}$'s may be the same as or different from each other. Moreover, in a case where le described below is an integer of 2 or greater, the plurality of $L^{E4}$'s in the same $(L^{E4})_{le}$ may also be the same as or different from each other.

In General Formula (E1), le's each independently represent an integer of 0 to 4.

Among them, le's are each independently preferably 0 to 2.

The plurality of le's may be the same as or different from each other.

The rod-like compound preferably has a biphenyl skeleton.

(Discotic Compound)

The epoxy compound, which is a discotic compound, has a disk-like structure in at least a portion thereof.

The disk-like structure has at least an alicyclic ring or an aromatic ring. In particular, in a case where the disk-like structure has an aromatic ring, the discotic compound can form a columnar structure by forming a stacking structure based on the intermolecular π-π interaction. Specific examples of the disk-like structure include the triphenylene structure described in Angew. Chem. Int. Ed. 2012, 51, 7990 to 7993, or JP1995-306317A (JP-H07-306317A), and the trisubstituted benzene structures described in JP2007-2220A and JP2010-244038A.

The discotic compound preferably has three or more epoxy groups. The cured substance of the epoxy compound, which includes the discotic compound having three or more epoxy groups, tends to have a high glass transition temperature and high heat resistance. The number of epoxy groups contained in the discotic compound is preferably 8 or less and more preferably 6 or less.

Specific examples of the discotic compound include compounds which have an epoxy group at at least one (preferably, three or more) of terminals in the compounds or the like described in C. Destrade et al., Mol. Crysr. Liq. Cryst., vol. 71, page 111 (1981); edited by The Chemical Society of Japan, Quarterly Review of Chemistry, No. 22, Chemistry of liquid crystal, Chapter 5, Chapter 10, Section 2 (1994); B. Kohne et al., Angew. Chem. Soc. Chem. Comm., page 1794 (1985); J. Zhang et al., J. Am. Chem. Soc., vol. 116, page 2655 (1994); and JP4592225B.

Examples of the discotic compound include compounds which have an epoxy group at at least one (preferably, three or more) of terminals in the triphenylene structure described in Angew. Chem. Int. Ed. 2012, 51, 7990 to 7993 and JP1995-306317A (JP-H07-306317A) and the trisubstituted benzene structures described in JP2007-2220A and JP2010-244038A.

Examples of other epoxy compounds other than the aforementioned epoxy compound include an epoxy compound represented by General Formula (DN).

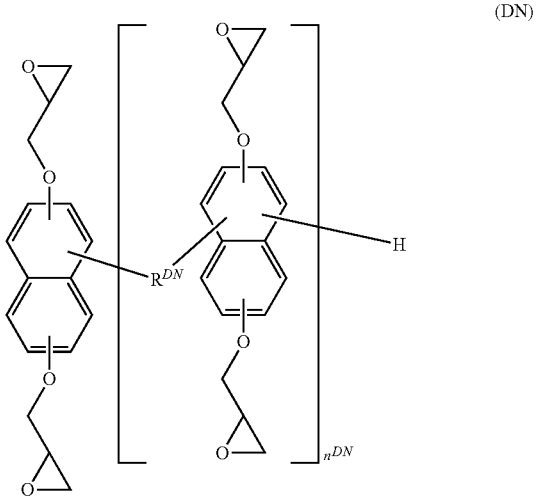

(DN)

In General Formula (DN), $n^{DN}$ represents an integer of 0 or greater, and is preferably 0 to 5 and more preferably 1.

RN represents a single bond or a divalent linking group. The divalent linking group is preferably —O—, —O—CO—, —CO—O—, —S—, an alkylene group (the number of carbon atoms is preferably 1 to 10), an arylene group (the number of carbon atoms is preferably 6 to 20), or a group consisting of a combination thereof, more preferably an alkylene group, and even more preferably a methylene group.

Examples of the other epoxy compounds include, in addition to the aforementioned epoxy compounds, a bisphenol A-type epoxy compound (compound in which in General Formula (E1), "pe is 0" and "$L^{E2}$ is —C(CH$_3$)$_2$—", or the like), a bisphenol F-type epoxy compound, a bisphenol S-type epoxy compound, a bisphenol AD-type epoxy compound, and the like, which are glycidyl ethers of bisphenol A, F, S, and AD, and the like; a hydrogenated bisphenol A-type epoxy compound, a hydrogenated bisphenol AD-type epoxy compound, and the like; a phenol novolac-type glycidyl ether (phenol novolac-type epoxy compound), a cresol novolac-type glycidyl ether (cresol novolac-type epoxy compound), a bisphenol A novolac-type glycidyl ether, and the like; a dicyclopentadiene-type glycidyl ether (dicyclopentadiene-type epoxy compound); a dihydroxypentadiene-type glycidyl ether (dihydroxypentadiene-type epoxy compound); a polyhydroxybenzene-type glycidyl ether (polyhydroxybenzene-type epoxy compound); a benzene polycarboxylic acid-type glycidyl ester (benzene polycarboxylic acid-type epoxy compound); an alicyclic epoxy compound such as 3,4:8,9-diepoxybicyclo[4.3.0]nonane; and a trisphenol methane-type epoxy compound.

Furthermore, the other epoxy compounds are preferably different from a compound (compound represented by any one of General Formula (B01), . . . , or (B03) and having an epoxy group) represented by any one of General Formula (B01), . . . , or (B03) in a surface modifier for an inorganic nitride, which will be described later, and having one or more epoxy groups.

A content of the other epoxy compounds is preferably 20% by mass or less, more preferably 10% by mass or less, and even more preferably 5% by mass or less, with respect to the total solid content of the composition, and it is particularly preferable that the other epoxy compounds are not substantially contained. Here, the expression in which the other epoxy compounds are not substantially contained means that the content of the other epoxy compounds is 0.5% by mass or less with respect to the total solid content of the composition.

Moreover, the content of the other epoxy compounds is preferably 0% to 60% by mass and more preferably 0% by mass or greater and less than 5% by mass, with respect to the total content of the compound represented by General Formula (1) and the other epoxy compounds. It is preferable that the composition for forming a thermally conductive material contains the epoxy compound, and the epoxy compound consists of the compound represented by General Formula (1).

[Surface Modifier]

The composition according to the embodiment of the present invention may further contain a surface modifier from the viewpoint that the thermally conductive properties of the thermally conductive material are superior.

The surface modifier is a component which modifies a surface of the aforementioned inorganic substance (for example, an inorganic nitride and/or an inorganic oxide).

In the present specification, "surface modification" means a state where an organic substance is adsorbed onto at least a portion of a surface of an inorganic substance. A form of the adsorption is not particularly limited, and may be in a bonded state. That is, the surface modification also includes a state where an organic group obtained by desorbing a portion of an organic substance is bonded to a surface of an inorganic substance. The bond may be any one of a covalent bond, a coordinate bond, an ionic bond, a hydrogen bond, a van der Waals bond, or a metallic bond. The surface modification may be performed so that a monolayer is formed on at least a portion of the surface. The monolayer is a single-layer film formed by chemical adsorption of organic molecules, and is known as a self-assembled monolayer (SAM). Moreover, in the present specification, the surface modification may be performed only on a portion of the surface of the inorganic substance, or may be performed on the entire surface thereof. In the present specification, a "surface-modified inorganic substance" means an inorganic substance of which the surface is modified with a surface modifier, that is, matter in which an organic substance is adsorbed onto a surface of an inorganic substance.

The surface modifier may be a surface modifier for an inorganic nitride (surface modifier for an inorganic nitride), or a surface modifier for an inorganic oxide (surface modifier for an inorganic oxide).

That is, in the composition according to the embodiment of the present invention, the inorganic substance may form a surface-modified inorganic substance (preferably, a surface-modified inorganic nitride and/or a surface-modified inorganic oxide) in cooperation with the surface modifier.

As the surface modifier, surface modifiers, which is known in the related art, such as carboxylic acid such as a long-chain alkyl fatty acid, organic phosphonic acid, organic phosphoric acid ester, and an organic silane molecule (silane coupling agent) can be used. In addition to the aforementioned surface modifiers, for example, the surface modifiers described in JP2009-502529A, JP2001-192500A, and JP4694929B may be used.

Furthermore, the composition (preferably, in a case where the inorganic substance includes an inorganic nitride (boron nitride and/or aluminum nitride)) preferably contains a compound having a fused-ring skeleton (preferably a fused-ring skeleton in which aromatic rings are fused) or a compound having a triazine skeleton, as the surface modifier. That is, these compounds are preferably used as the surface modifier for an inorganic nitride.

In addition, as will be described later, the surface modifier may be a surface modifier (for example, a surface modifier A having a phenolic hydroxyl group, or a surface modifier B having a phenolic hydroxyl group (compound represented by any one of General Formula (B01), . . . , or (B03) and having a phenolic hydroxyl group)) having a phenolic hydroxyl group.

Here, the surface modifier having a phenolic hydroxyl group is preferably a compound different from the aforementioned phenolic compound.

Moreover, in a case where the composition contains the surface modifier having a phenolic hydroxyl group, a content of the surface modifier having a phenolic hydroxyl group is preferably less than 1.0% by mass and more preferably less than 0.5% by mass, with respect to the total solid content of the composition. The lower limit thereof is preferably 0.01% by mass or greater and more preferably 0.1% by mass or greater.

Furthermore, in a case where the surface modifier is a surface modifier having a phenolic hydroxyl group, the number of phenolic hydroxyl groups contained in the surface modifier is preferably 1 to 10, more preferably 1 to 3, and even more preferably 1 or 2.

<Surface Modifier A>

As the surface modifier (preferably, the surface modifier for an inorganic nitride), for example, the surface modifier A described below is preferable. Moreover, the surface modifier A is a surface modifier having a fused-ring skeleton.

The surface modifier A satisfies the following Conditions 1 and 2.

Condition 1: the surface modifier A has a functional group (hereinafter, also referred to as a "specific functional group A") selected from the following group P of functional groups.

(Group P of Functional Groups)

A functional group selected from the group consisting of a boronic acid group (—B(OH)$_2$), an aldehyde group (—CHO), an isocyanate group (—N═C═O), an isothiocyanate group (—N═C═S), a cyanate group (—O—CN), an acyl azide group, a succinimide group, a sulfonyl chloride group (—SO$_2$Cl), a carboxylic acid chloride group (—COCl), an onium group, a carbonate group (—O—CO—O—), an aryl halide group, a carbodiimide group (—N═C═N—), an acid anhydride group (—CO—O—CO— or a monovalent acid anhydride group such as maleic acid anhydride, phthalic acid anhydride, pyromellitic acid anhydride, and trimellitic acid anhydride), a carboxylic acid group (—COOH), a phosphonic acid group (—PO(OH)$_2$), a phosphinic acid group (—HPO(OH)), a phosphoric acid group (—OP(═O)(OH)$_2$), a phosphoric acid ester group (—OP(═O)(OR$^B$)$_2$), a sulfonic acid group (—SO$_3$H), a halogenated alkyl group, a nitrile group (—CN), a nitro group (—NO$_2$), an ester group (—CO—O— or —O—CO—), a carbonyl group (—CO—), an imidoester group (—C(═NR$^C$)—O— or —O—C(═NR$^C$)—), an alkoxysilyl group, an acrylic group (—OCOCH$_2$═CH$_2$), a methacrylic group (—OCOCH(CH$_3$)═CH$_2$), an oxetanyl group, a vinyl group (—CH═CH$_2$), an alkynyl group (a group obtained by removing one hydrogen atom from alkyne, and examples thereof include an ethynyl group and a prop-2-yn-1-yl group), a maleimide group, a thiol group (—SH), a hydroxyl group (—OH), a halogen atom (a F atom, a Cl atom, a Br atom, and an I atom), and an amino group.

The acyl azide group means a group represented by the following structure. Moreover, * in the formula represents a bonding position. A counter anion (Z) of the acyl azide group is not particularly limited, and examples thereof include a halogen ion.

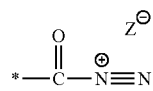

The succinimide group, the oxetanyl group, and the maleimide group represent groups formed by removing one hydrogen atom at any position from the compounds represented by the following formulae, respectively.

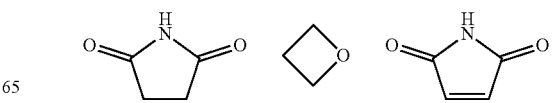

Furthermore, the onium group means a group having an onium salt structure. The onium salt is a compound which is generated in a case where a compound having an electron pair not being involved in chemical bonding forms a coordinate bond with another cationic compound through the electron pair. Generally, the onium salt contains a cation and an anion.

The onium salt structure is not particularly limited, but examples thereof include an ammonium salt structure, a pyridinium salt structure, an imidazolium salt structure, a pyrrolidinium salt structure, a piperidinium salt structure, a triethylenediamine salt structure, a phosphonium salt structure, a sulfonium salt structure, and a thiopyrylium salt structure. Moreover, a kind of the anion used as a counter is not particularly limited, and known anions are used. A valence of the anion is also not particularly limited, examples of the anion include monovalent to trivalent anions, and a monovalent or divalent anion is preferable.

As the onium group, among them, a group having an ammonium salt structure and represented by General Formula (A1) is preferable.

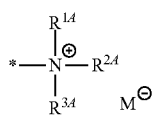

(A1)

In General Formula (A1), $R^{1A}$ to $R^{3A}$ each independently represent a hydrogen atom or an alkyl group (including all of a linear alkyl group, a branched alkyl group, and a cyclic alkyl group). The number of carbon atoms in the alkyl group is, for example, 1 to 10, preferably 1 to 6, and more preferably 1 to 3. $M^-$ represents an anion.

\* represents a bonding position. Moreover, the alkyl group may further have a substituent (for example, the substituent group Y).

The aryl halide group is not particularly limited as long as the aryl halide group is a group in which one or more halogen atoms are substituted on an aromatic ring group. The aromatic ring group may have any one of a monocyclic structure or a polycyclic structure, but is preferably a phenyl group. Moreover, examples of the halogen atom include a fluorine atom, a chlorine atom, a bromine atom, and an iodine atom, and a fluorine atom is preferable. Furthermore, the aryl halide group may further have a substituent (for example, the substituent group Y).

Specific examples of the aryl halide group include a fluorophenyl group, a perfluorophenyl group, a chlorophenyl group, a bromophenyl group, and an iodophenyl group.

The phosphoric acid ester group is not particularly limited as long as the phosphoric acid ester group is a group represented by $-OP(=O)(OR^B)_2$. Examples of $R^B$ include a hydrogen atom or a monovalent organic group. Here, any one or more of $R^B$'s each represent a monovalent organic group. Examples of the monovalent organic group include an alkyl group (including all of a linear alkyl group, a branched alkyl group, and a cyclic alkyl group) and an aryl group. The number of carbon atoms in the alkyl group is, for example, 1 to 10, preferably 1 to 6, and more preferably 1 to 3. Moreover, the alkyl group may further have a substituent (for example, the substituent group Y). Furthermore, the aryl group is not particularly limited, but examples thereof include a phenyl group and a pyrenyl group.

The halogenated alkyl group is not particularly limited, but examples thereof include a group in which one or more halogen atoms are substituted on an alkyl group having 1 to 10 carbon atoms. The number of carbon atoms in the alkyl group (including all of a linear alkyl group, a branched alkyl group, and a cyclic alkyl group) is preferably 1 to 6 and more preferably 1 to 3. Examples of the halogen atom include a fluorine atom, a chlorine atom, a bromine atom, and an iodine atom, and a fluorine atom, a chlorine atom, or a bromine atom is preferable. Moreover, the halogenated alkyl group may further have a substituent (for example, the substituent group Y).

The imidoester group is not particularly limited as long as the imidoester group is a group represented by $-C(=NR^C)-O-$ or $-O-C(=NR^C)-$. Examples of $R^C$ include a hydrogen atom and an alkyl group (including all of a linear alkyl group, a branched alkyl group, and a cyclic alkyl group). The number of carbon atoms in the alkyl group is, for example, 1 to 10, preferably 1 to 6, and more preferably 1 to 3. Moreover, the alkyl group may further have a substituent (for example, the substituent group Y).

Furthermore, the imidoester group may have an onium salt structure by a coordinate bond between an electron pair not being involved in chemical bonding of imine nitrogen and another cation (for example, a hydrogen ion).

The alkoxysilyl group is not particularly limited, but examples thereof include a group represented by General Formula (A2).

 General Formula (A2):

In General Formula (A2), $R^D$'s each independently represent an alkyl group (including all of a linear alkyl group, a branched alkyl group, and a cyclic alkyl group). \* represents a bonding position.

The alkyl group represented by $R^D$ is, for example, an alkyl group having 1 to 10 carbon atoms, preferably has 1 to 6 carbon atoms, and more preferably has 1 to 3 carbon atoms.

Specific examples thereof include a trimethoxysilyl group and a triethoxysilyl group.

Moreover, the alkyl group may further have a substituent (for example, the substituent group Y).

The amino group is not particularly limited, and may be any one of a primary amino group, a secondary amino group, or a tertiary amino group. Specific examples thereof include an amino group represented by $-N(R^E)_2$ ($R^E$'s are each independently represent a hydrogen atom or an alkyl group (including all of a linear alkyl group, a branched alkyl group, and a cyclic alkyl group)). The number of carbon atoms in the alkyl group is, for example, 1 to 10, preferably 1 to 6, and more preferably 1 to 3. Moreover, the alkyl group may further have a substituent (for example, the substituent group Y)).

The number of the specific functional groups A in the surface modifier A is not particularly limited as long as the number thereof is 1 or more. Moreover, the upper limit thereof is not particularly limited, but is preferably 15 or less. Among them, from the viewpoint that the dispersibility of the surface-modified inorganic substance (preferably, the surface-modified inorganic nitride) is superior, the number of the specific functional groups A is preferably 1 to 8, more preferably 1 to 3, and even more preferably 1 or 2.

Condition 2: the surface modifier A has a fused-ring structure containing two or more rings selected from the group consisting of an aromatic hydrocarbon ring and an aromatic heterocyclic ring.

The aromatic hydrocarbon ring is not particularly limited, but examples thereof include a monocyclic aromatic hydrocarbon ring having a 5- or higher membered ring. The upper limit of the number of ring members is not particularly limited, but is 10 or less in many cases. As the aromatic hydrocarbon ring, a monocyclic aromatic hydrocarbon ring having a 5-membered or 6-membered ring is preferable.

Examples of the aromatic hydrocarbon ring include a cyclopentadienyl ring and a benzene ring.

The aromatic heterocyclic ring is not particularly limited, but examples thereof include a monocyclic aromatic heterocyclic ring having a 5- or higher membered ring. The upper limit of the number of ring members is not particularly limited, but is 10 or less in many cases. As the aromatic heterocyclic ring, for example, a monocyclic aromatic heterocyclic ring having a 5-membered or 6-membered ring is preferable.

Examples of the aromatic heterocyclic ring include a thiophene ring, a thiazole ring, an imidazole ring, a pyridine ring, a pyridazine ring, a pyrimidine ring, a pyrazine ring, and a triazine ring.

The condensed structure is not particularly limited as long as the condensed structure is a fused-ring structure containing two or more rings selected from the group consisting of an aromatic hydrocarbon ring and an aromatic heterocyclic ring, but from the viewpoint that the effect of the present invention is superior, among them, a fused-ring structure containing two or more aromatic hydrocarbon rings is preferable, a fused-ring structure containing two or more benzene rings is more preferable, and a fused-ring structure containing three or more benzene rings is even more preferable. Moreover, the upper limit of the number of the aromatic hydrocarbon rings or the aromatic heterocyclic rings contained in the condensed structure is not particularly limited, but is, for example, 10 or less in many cases.

Specifically, the fused-ring structure having two or more aromatic hydrocarbon rings is preferably a condensed structure which consists of a fused ring selected from the group consisting of biphenylene, indacene, acenaphthylene, fluorene, phenalene, phenanthrene, anthracene, fluoranthene, acephenanthrylene, aceanthrylene, pyrene, chrysene, tetracene, pleiadene, picene, perylene, pentaphene, pentacene, tetraphenylene, hexaphene, and triphenylene, and from the viewpoint that the effect of the present invention is superior, among them, a condensed structure consisting of a fused ring containing two or more benzene rings is more preferable, a condensed structure consisting of a fused ring containing three or more benzene rings is even more preferable, and a condensed structure consisting of pyrene or perylene is particularly preferable.

From the viewpoint that the dispersibility is further improved, the surface modifier A is preferably a compound represented by General Formula (V1) and more preferably a compound represented by General Formula (V2).

Hereinafter, the compound represented by General Formula (V1) and the compound represented by General Formula (V2) will be described, respectively.

(Compound Represented by General Formula (V1))

$$X\text{-}(Y)_n \quad (V1)$$

In General Formula (V1), X represents an n-valent organic group which has a fused-ring structure containing two or more rings selected from the group consisting of an aromatic hydrocarbon ring and an aromatic heterocyclic ring.

X represents an n-valent organic group (n is an integer of 1 or greater). n is not particularly limited as long as n is an integer of 1 or greater. Moreover, the upper limit thereof is not particularly limited, but is preferably an integer of 15 or less. Among them, from the viewpoint that the dispersibility of the surface-modified inorganic substance (preferably, the surface-modified inorganic nitride) is superior, n is preferably 1 to 8, more preferably 1 to 3, and even more preferably 1 or 2.

Examples of the fused-ring structure containing two or more rings selected from the group consisting of the aromatic hydrocarbon ring and the aromatic heterocyclic ring in X include the aforementioned structures, and the preferred aspect thereof is also the same as described above.

The n-valent organic group represented by X is not particularly limited as long as the organic group has a fused-ring structure containing two or more rings selected from the group consisting of an aromatic hydrocarbon ring and an aromatic heterocyclic ring, but from the viewpoint that the effect of the present invention is superior, a group formed by extracting n hydrogen atoms from a fused ring containing two or more rings selected from the group consisting of an aromatic hydrocarbon ring and an aromatic heterocyclic ring is preferable.

Moreover, the condensed structure may further have a substituent (for example, the substituent group Y), in addition to the specific functional group A.

Y represents a monovalent group represented by General Formula (B1), a monovalent group represented by General Formula (B2), or a monovalent group represented by General Formula (B4), or represents a divalent group which is represented by General Formula (B3) and formed by bonding a plurality of Y's to each other, in a case where n represents an integer of 2 or greater.

In other words, in a case where n is 1, Y represents a monovalent group represented by General Formula (B1), a monovalent group represented by General Formula (B2), or a monovalent group represented by General Formula (B4).

In a case where n represents an integer of 2 or greater, Y represents a monovalent group represented by General Formula (B1), a monovalent group represented by General Formula (B2), or a monovalent group represented by General Formula (B4), or represents a divalent group which is represented by General Formula (B3) and formed by bonding a plurality of Y's to each other. Moreover, in a case where n is 2 or greater, the plurality of Y's may be the same as or different from each other.

Furthermore, in a case where Y represents a divalent group represented by General Formula (B3), the compound represented by General Formula (V1) is represented by General Formula (V3).

(V3)

In General Formula (V3), X has the same definition as X in General Formula (V1). Moreover, $L^3$ has the same definition as $L^3$ in General Formula (B3).

$$*^1\text{-}L^1\text{-}P^1 \qquad \text{General Formula (B1):}$$

In General Formula (B1), $L^1$ represents a single bond or a divalent linking group.

The divalent linking group is not particularly limited, but examples thereof include —O—, —S—, —$NR^F$— ($R^F$ represents a hydrogen atom or an alkyl group), a divalent hydrocarbon group (for example, an alkylene group, an alkenylene group (for example, —CH═CH—), an alkynylene group (for example, —C≡C—), and an arylene group), a divalent organic group (a carbonate group (—O—CO—O—), a carbodiimide group (—N═C═N—), an acid anhydride group (—CO—O—CO—), an ester group (—CO—O— or —O—CO—), a carbonyl group (—CO—), and an imidoester group (—C(═$NR^C$)—O— or —O—C(═$NR^C$)—)) in the group P of functional groups, and a group obtained by combining these groups.

Examples of the combined group include -(divalent hydrocarbon group)-$X^{111}$—, —$X^{111}$-(divalent hydrocarbon group)-, -(divalent hydrocarbon group)-$X^{111}$-(divalent hydrocarbon group)-, —$X^{111}$-(divalent hydrocarbon group)-$X^{111}$-(divalent hydrocarbon group)-, and -(divalent hydrocarbon group)-$X^{111}$-(divalent hydrocarbon group)-$X^{111}$—. Moreover, —$X^{111}$— is —O—, —S—, —$NR^F$—, a divalent organic group in the group P of functional groups, or a group obtained by combining these groups. The total number of carbon atoms in the combined group is, for example, 1 to 20 and preferably 1 to 12.

$P^1$ represents a monovalent organic group (a boronic acid group (—B(OH)$_2$), an aldehyde group (—CHO), an isocyanate group (—N═C═O), an isothiocyanate group (—N═C═S), a cyanate group (—O—CN), an acyl azide group, a succinimide group, a sulfonyl chloride group (—SO$_2$Cl), a carboxylic acid chloride group (—COCl), an onium group, an aryl halide group, an acid anhydride group (examples thereof include a monovalent acid anhydride group such as maleic acid anhydride, phthalic acid anhydride, pyromellitic acid anhydride, and trimellitic acid anhydride), a carboxylic acid group (—COOH), a phosphonic acid group (—PO(OH)$_2$), a phosphinic acid group (—HPO(OH)), a phosphoric acid group (—OP(═O)(OH)$_2$), a phosphoric acid ester group (—OP(═O)(ORB)$_2$), a sulfonic acid group (—SO$_3$H), a halogenated alkyl group, a nitrile group (—CN), a nitro group (—NO$_2$), an alkoxysilyl group, an acrylic group (—OCOCH$_2$═CH$_2$), a methacrylic group (—OCOCH(CH$_3$)═CH$_2$), an oxetanyl group, a vinyl group (—CH═CH$_2$), an alkynyl group (a group obtained by removing one hydrogen atom from alkyne, and examples thereof include an ethynyl group and a prop-2-yn-1-yl group), a maleimide group, a thiol group (—SH), a hydroxyl group (—OH), or a halogen atom (a F atom, a Cl atom, a Br atom, and an I atom)) in the group P of functional groups.

$*^1$ represents a position bonded to X.

$$*^2\text{-}L^2\text{-}P^2 \quad \text{General Formula (B2):}$$

In General Formula (B2), $L^2$ represents a divalent linking group including a divalent organic group (a carbonate group (—O—CO—O—), a carbodiimide group (—N═C═N—), an acid anhydride group (—CO—O—CO—), an ester group (—CO—O— or —O—CO—), a carbonyl group (—CO—), or an imidoester group (—C(═$NR^C$)—O— or —O—C(═$NR^C$)—)) in the group P of functional groups.

Examples of $L^2$ include a divalent organic group in the group P of functional groups, and a group obtained by combining a divalent organic group in the group P of functional groups with a linking group selected from the group consisting of —O—, —S—, —$NR^F$— ($R^F$ represents a hydrogen atom or an alkyl group), and a divalent hydrocarbon group (for example, an alkylene group, an alkenylene group (for example, —CH═CH—), an alkynylene group (for example, —C≡C—), and an arylene group).

Examples of the combined group include -(divalent hydrocarbon group)-$X^{112}$-Moreover, —$X^{112}$— is a divalent organic group in the group P of functional groups, or a group obtained by combining a divalent organic group in the group P of functional groups with a divalent group selected from —O—, —S—, and —$NR^F$—. The total number of carbon atoms in the combined group is, for example, 1 to 20 and preferably 1 to 12.

$P^2$ represents a monovalent organic group. The monovalent organic group represented by $P^2$ is not particularly limited, and examples thereof include an alkyl group. The number of carbon atoms in the alkyl group is, for example, 1 to 10, preferably 1 to 6, and more preferably 1 to 3.

$*^2$ represents a position bonded to X.

$$*^{31}\text{-}L^3\text{-}*^{32} \quad \text{General Formula (B3):}$$

In General Formula (B3), $L^3$ represents a divalent linking group including a divalent organic group (a carbonate group (—O—CO—O—), a carbodiimide group (—N═C═N—), an acid anhydride group (—CO—O—CO—), an ester group (—CO—O— or —O—CO—), a carbonyl group (—CO—), or an imidoester group (—C(═$NR^C$)—O— or —O—C(═$NR^C$)—)) in the group P of functional groups.

Examples of $L^3$ include a divalent organic group in the group P of functional groups, and a group obtained by combining a divalent organic group in the group P of functional groups with a linking group selected from the group consisting of —O—, —S—, —$NR^F$— ($R^F$ represents a hydrogen atom or an alkyl group), and a divalent hydrocarbon group (for example, an alkylene group, an alkenylene group (for example, —CH═CH—), an alkynylene group (for example, —C≡C—), and an arylene group).

Examples of the combined group include -(divalent hydrocarbon group)-$X^{113}$-(divalent hydrocarbon group)-, -(divalent hydrocarbon group)-$X^{113}$—, —$X^{113}$-(divalent hydrocarbon group)-, and —$X^{113}$-(divalent hydrocarbon group)-$X^{113}$-Moreover, —$X^{113}$— is a divalent organic group in the group P of functional groups, or a group obtained by combining a divalent organic group in the group P of functional groups with a divalent group selected from —O—, —S—, and —$NR^F$—. The total number of carbon atoms in the combined group is, for example, 1 to 20 and preferably 1 to 12.

$*^{31}$ and $*^{32}$ represent positions bonded to X. That is, $L^3$ forms a ring together with two different carbon atoms on a fused-ring structure represented by X.

$$*^4\text{-}L^4\text{-}(P^4)_{m^{11}} \quad \text{General Formula (B4):}$$

In General Formula (B4), $L^4$ represents an ($m^{11}$+1)-valent linking group.

$m^{11}$ represents an integer of 2 or greater. The upper limit value of $m^{11}$ is not particularly limited, but is, for example, 100 or less, preferably 30 or less, more preferably 20 or less, and even more preferably 15 or less. The lower limit value of $m^{11}$ is not particularly limited, but is preferably 4 or greater.

The linking group represented by $L^4$ is not particularly limited, but examples thereof include an ($m^{11}$+1)-valent aromatic hydrocarbon ring and a group represented by General Formula (M1).

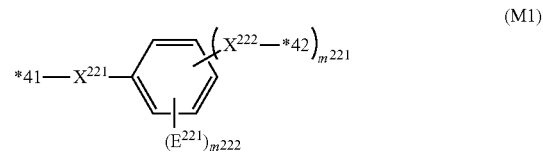

(M1)

In General Formula (M1), $X^{221}$ and $X^{222}$ each independently represent a single bond or a divalent linking group.

The divalent linking groups represented by $X^{221}$ and $X^{222}$ have the same definitions as the divalent linking group represented by $L^1$ in General Formula (B1).

$E^{221}$ represents a substituent. Examples of the substituent represented by $E^{221}$ include the groups exemplified in the substituent group Y $m^{221}$ represents an integer 2 to 5. Among them, $m^{221}$ is preferably 2 or 3.

$m^{222}$ represents an integer 0 to 3.

Here, $m^{221}+m^{222}$ represents an integer 2 to 5.

*41 represents a position bonded to X.

*42 represents a position bonded to $P^4$.

Among them, the group represented by General Formula (M1) is preferably a group represented by General Formula (M2).

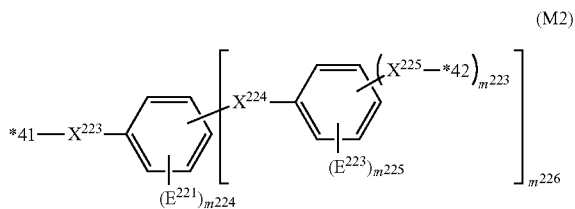

(M2)

In General Formula (M2), $X^{223}$, $X^{224}$, and $X^{225}$ each independently represent a single bond or a divalent linking group. The divalent linking groups represented by $X^{223}$, $X^{224}$, and $X^{225}$ have the same definitions as the divalent linking group represented by $L^1$ in General Formula (B1).

$E^{222}$ and $E^{223}$ each independently represent a substituent. Examples of the substituents represented by $E^{222}$ and $E^{223}$ include the groups exemplified in the substituent group Y $m^{223}$ represents an integer 1 to 5. Among them, $m^{223}$ is preferably 2 or 3.

$m^{224}$ represents an integer 0 to 3.

$m^{225}$ represents an integer 0 to 4.

$m^{226}$ represents an integer 2 to 5. Among them, $m^{226}$ is preferably 2 or 3.

Here, $m^{224}+m^{226}$ represents an integer 2 to 5. Moreover, $m^{223}+m^{225}$ represents an integer 1 to 5.

*41 represents a position bonded to X.

*42 represents a position bonded to $P^4$.

$P^4$ has the same definition as $P^1$ in General Formula (B1).

*4 represents a position bonded to X.

(Compound Represented by General Formula (V2))

(V2)

In General Formula (V2), $X^{11}$ represents an $(n^{11}+n^{12})$-valent organic group which has a fused-ring structure containing two or more rings selected from the group consisting of an aromatic hydrocarbon ring and an aromatic heterocyclic ring.

$X^{11}$ represents an $(n^{11}+n^{12})$-valent organic group ($n^{11}$ and $n^{12}$ are each independently an integer of 1 or greater). $n^{11}$ and $n^{12}$ are not particularly limited as long as $n^{11}$ and $n^{12}$ are each independently an integer of 1 or greater. Moreover, the upper limit of $n^{11}+n^{12}$ is not particularly limited, but is preferably an integer of 15 or less. Among them, from the viewpoint that the dispersibility of the surface-modified inorganic substance is superior, $n^{11}+n^{12}$ is preferably 2 to 8, more preferably 2 or 3, and even more preferably 2.

Examples of the fused-ring structure containing two or more rings selected from the group consisting of the aromatic hydrocarbon ring and the aromatic heterocyclic ring in $X^{11}$ include the aforementioned structures, and the preferred aspect thereof is also the same as described above.

The $(n^{11}+n^{12})$-valent organic group represented by $X^{11}$ is not particularly limited as long as the organic group has a fused-ring structure containing two or more rings selected from the group consisting of an aromatic hydrocarbon ring and an aromatic heterocyclic ring, but from the viewpoint that the effect of the present invention is superior, a group formed by extracting $(n^{11}+n^{12})$ hydrogen atoms from a fused ring containing two or more rings selected from the group consisting of an aromatic hydrocarbon ring and an aromatic heterocyclic ring is preferable.

Moreover, the condensed structure may further have a substituent (for example, the substituent group Y), in addition to $Y^{11}$ and $Y^{12}$.

$Y^{11}$ contains a functional group selected from the following group Q of functional groups. Functional groups exemplified in the following group Q of functional groups correspond particularly to groups which tend to have excellent adsorptivity to an inorganic substance (in particular, an inorganic nitride), among the functional groups exemplified in the group P of functional groups.

Moreover, $Y^{12}$ contains a functional group selected from the following group R of functional groups. Functional groups exemplified in the following group R of functional groups correspond to groups which have a function of easily promoting the curing of the composition, among the functional groups exemplified in the group P of functional groups.

(Group Q of Functional Groups)

A functional group selected from the group consisting of a boronic acid group (—B(OH)$_2$), an aldehyde group (—CHO), an isocyanate group (—N=C=O), an isothiocyanate group (—N=C=S), a cyanate group (—O—CN), an acyl azide group, a succinimide group, a sulfonyl chloride group (—SO$_2$Cl), a carboxylic acid chloride group (—COCl), an onium group, a carbonate group (—O—CO—O—), an aryl halide group, a carbodiimide group (—N=C=N—), an acid anhydride group (—CO—O—CO— or a monovalent acid anhydride group such as maleic acid anhydride, phthalic acid anhydride, pyromellitic acid anhydride, or trimellitic acid anhydride), a phosphonic acid group (—PO(OH)$_2$), a phosphinic acid group (—HPO(OH)), a phosphoric acid group (—OP(=O)(OH)$_2$), a phosphoric acid ester group (—OP(=O)(OR$^B$)$_2$), a sulfonic acid group (—SO$_3$H), a halogenated alkyl group, a nitrile group (—CN), a nitro group (—NO$_2$), an ester group (—CO—O— or —O—CO—), a carbonyl group (—CO—), an imidoester group (—C(=NR$^C$)—O— or —O—C(=NR$^C$)—), and a halogen atom (a fluorine atom, a chlorine atom, a bromine atom, and an iodine atom).

(Group R of Functional Groups)

A functional group selected from the group consisting of a carboxylic acid group (—COOH), an alkoxysilyl group, an acrylic group (—OCOCH$_2$=CH$_2$), a methacrylic group (—OCOCH(CH$_3$)=CH$_2$), an oxetanyl group, a vinyl group (—CH=CH$_2$), an alkynyl group (a group obtained by removing one hydrogen atom from alkyne, and examples thereof include an ethynyl group and a prop-2-yn-1-yl group), a maleimide group, a thiol group (—SH), a hydroxyl group (—OH), and an amino group.

In General Formula (V2), specifically, $Y^{11}$ represents a monovalent group represented by General Formula (C1) or a monovalent group represented by General Formula (C2), or represents a divalent group which is represented by General Formula (C3) and formed by bonding a plurality of $Y^{11}$'s to each other, in a case where $n^{11}$ represents an integer of 2 or greater.

In other words, in a case where $n^{11}$ is 1, $Y^{11}$ represents a monovalent group represented by General Formula (C1) or a monovalent group represented by General Formula (C2). In a case where $n^{11}$ represents an integer of 2 or greater, $Y^{11}$ represents a monovalent group represented by General Formula (C1) or a monovalent group represented by General Formula (C2), or represents a divalent group which is represented by General Formula (C3) and formed by bonding the plurality of $Y^{11}$'s to each other. Moreover, in a case where $n^{11}$ is 2 or greater, the plurality of $Y^{11}$'s may be the same as or different from each other.

Furthermore, in a case where $Y^{11}$ represents a divalent group represented by General Formula (C3), the compound represented by General Formula (V2) is represented by General Formula (V4).

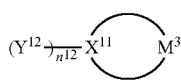
(V4)

In General Formula (V4), $X^{11}$, $Y^{12}$, and $n^{12}$ have the same definitions as $X^{11}$, $Y^{12}$, and $n^{12}$ in General Formula (V2), respectively. Moreover, $M^3$ has the same definition as $M^3$ in General Formula (C3).

$$*^1\text{-}M^1\text{-}Q^1 \qquad \text{General Formula (C1):}$$

In General Formula (C1), $M^1$ represents a single bond or a divalent linking group. The divalent linking group represented by $M^1$ has the same definition as Li, and the preferred aspects thereof are also the same.

$Q^1$ represents a monovalent organic group (a boronic acid group (—B(OH)$_2$), an aldehyde group (—CHO), an isocyanate group (—N=C=O), an isothiocyanate group (—N=C=S), a cyanate group (—O—CN), an acyl azide group, a succinimide group, a sulfonyl chloride group (—SO$_2$Cl), a carboxylic acid chloride group (—COCl), an onium group, an aryl halide group, an acid anhydride group (examples thereof include a monovalent acid anhydride group such as maleic acid anhydride, phthalic acid anhydride, pyromellitic acid anhydride, or trimellitic acid anhydride), a phosphonic acid group (—PO(OH)$_2$), a phosphinic acid group (—HPO(OH)), a phosphoric acid group (—OP(=O)(OH)$_2$), a phosphoric acid ester group (—OP(=O)(OR$^B$)$_2$), a sulfonic acid group (—SO$_3$H), a halogenated alkyl group, a nitrile group (—CN), a nitro group (—NO$_2$), or a halogen atom (a fluorine atom, a chlorine atom, a bromine atom, and an iodine atom)) in the group Q of functional groups. $*^1$ represents a position bonded to $X^{11}$.

$$*^2\text{-}M^2\text{-}Q^2 \qquad \text{General Formula (C2):}$$

In General Formula (C2), $M^2$ has the same definition as $L^2$, and the preferred aspects thereof are also the same. $Q^2$ represents a monovalent organic group. The monovalent linking group represented by $Q^2$ has the same definition as $P^2$, and the preferred aspects thereof are also the same. $*^2$ represents a position bonded to $X^{11}$.

$$*^{31}\text{-}M^3\text{-}*^{32} \qquad \text{General Formula (C3):}$$

In General Formula (C3), $M^3$ has the same definition as $L^3$, and the preferred aspects thereof are also the same. $*^{31}$ and $*^{32}$ represent positions bonded to $X^{11}$. That is, $M^3$ forms a ring together with two different carbon atoms on a fused-ring structure represented by $X^{11}$.

$Y^{12}$ represents a monovalent group represented by General Formula (D1) or a monovalent group represented by General Formula (D2).

$$*^1\text{-}W^1\text{—}R^1 \qquad \text{General Formula (D1):}$$

In General Formula (D1), $W^1$ represents a single bond or a divalent linking group. $R^1$ represents a carboxylic acid group, an alkoxysilyl group, an acrylic group, a methacrylic group, an oxetanyl group, a vinyl group, an alkynyl group, a maleimide group, a thiol group, a hydroxyl group, or an amino group. $*^1$ represents a position bonded to $X^{11}$. Moreover, $R^1$ represents a functional group exemplified in the group R of functional groups.

The divalent linking group represented by $W^1$ has the same definition as $L^1$, and the preferred aspects thereof are also the same.

$*^1$ represents a position bonded to $X^{11}$.

$$*^2\text{—}W_2\text{(-}R^2)_{m^{21}} \qquad \text{General Formula (D2):}$$

In General Formula (D2), $W^2$ represents an ($m^{21}$+1)-valent linking group.

$m^{21}$ represents an integer of 2 or greater. The upper limit value of $m^{21}$ is not particularly limited, but is, for example, 100 or less, preferably 30 or less, more preferably 20 or less, and even more preferably 15 or less. The lower limit value of $m^{21}$ is not particularly limited, but is preferably 4 or greater.

$R^2$ represents a carboxylic acid group, an alkoxysilyl group, an acrylic group, a methacrylic group, an oxetanyl group, a vinyl group, an alkynyl group, a maleimide group, a thiol group, a hydroxyl group, or an amino group. Moreover, $R^2$ represents a functional group exemplified in the group R of functional groups.

The ($m^{21}$+1)-valent linking group represented by $W^2$ has the same definition as $L^4$, and the preferred aspects thereof are also the same.

$*^2$ represents a position bonded to $X^{11}$.

A molecular weight of the surface modifier A is, for example, 150 or greater, is preferably 200 or greater from the viewpoint that the dispersibility of the surface-modified inorganic substance (preferably, the surface-modified inorganic nitride) is superior, and is preferably 2,000 or less and more preferably 1,000 or less from the viewpoint of solubility.

<Surface Modifier B>

As the surface modifier (preferably, the surface modifier for an inorganic nitride), for example, the surface modifier B described below is also preferable.

The surface modifier B is a compound represented by General Formula (B01).

(Compound represented by General Formula (B01))

$$X^B\text{-}[\text{-}(L^{1B})_{mB}\text{-}Z^B]_{nB} \qquad (B01)$$

In General Formula (B01), mB represents an integer of 0 or greater (preferably, 0 to 10), and in a case where mB is 0, $Z^B$ is directly bonded to $X^B$.

nB represents an integer 3 to 6.

$X^B$ represents a benzene ring group or a heterocyclic group (preferably, a triazine ring group) which may have a substituent.

$L^{1B}$ represents an arylene group which may have a substituent, an ester group, an ether group, a thioester group, a thioether group, a carbonyl group, —NR$^N$—, an azo group, or an unsaturated hydrocarbon group which may have a substituent. (R$^N$ represents a hydrogen atom or a substituent)

Z$^B$ represents an aromatic ring group which may have a substituent.

A plurality of mB's may be the same as or different from each other.

In a case where there are a plurality of L$^{1B}$'s, the plurality of L$^{1B}$'s may be the same as or different from each other.

A plurality of Z$^B$'s may be the same as or different from each other.

(Compound Represented by General Formula (B02))

In particular, the surface modifier B is preferably a compound represented by General Formula (B02).

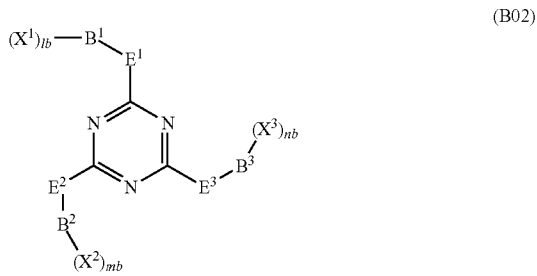

(B02)

In General Formula (B02), E$^1$ to E$^3$ each independently represent a single bond, —NH—, or —NR—.

R represents a substituent (preferably a linear or branched alkyl group having 1 to 5 carbon atoms). In a case where there are a plurality of —NR-'s among E$^1$ to E$^3$, the plurality of R's may be the same as or different from each other.

Among them, from the viewpoint that the thermally conductive properties of the obtained thermally conductive material are superior, E$^1$ to E3 are each independently preferably a single bond or —NH—. The reason for this is considered to be that in a case where E to E3 are each the aforementioned group, an interaction between the compound represented by General Formula (B02) and the inorganic substance (in particular, the inorganic nitride) is further enhanced.

In General Formula (B02), B$^1$ to B$^3$ each independently represent an aromatic ring group which may have a substituent and has 6 or more carbon atoms as ring member atoms.

Moreover, B$^1$ to B$^3$ are bonded to E to E$^3$ and X$^1$ to X$^3$, respectively, via the ring member atom of the aromatic ring group.

The aromatic ring group may be a monocyclic aromatic ring group or a polycyclic aromatic ring group.

The number of membered rings in the monocyclic aromatic ring group is preferably 6 to 10.

The number of rings constituting the polycyclic aromatic ring group is preferably 2 to 4 and more preferably 2. The numbers of membered rings in the rings constituting the polycyclic aromatic ring group are each independently preferably 5 to 10.

The aromatic ring group may be an aromatic hydrocarbon ring group or an aromatic heterocyclic group.

The number of heteroatoms contained in the aromatic heterocyclic group is preferably 1 to 5. Examples of the heteroatom include a nitrogen atom, a sulfur atom, an oxygen atom, a selenium atom, a tellurium atom, a phosphorus atom, a silicon atom, and a boron atom. Among them, a nitrogen atom, a sulfur atom, or an oxygen atom is preferable.

A substituent that the aromatic ring groups represented by B$^1$ to B$^3$ may have is preferably a substituent other than the substituent represented by General Formula (B2R). Here, in a case where an atom in B$^1$ present adjacent to an atom in B$^1$ to which E$^1$ is directly bonded has a substituent, the substituent may be a hydroxyl group. In a case where an atom in B$^2$ present adjacent to an atom in B$^2$ to which E$^2$ is directly bonded has a substituent, the substituent may be a hydroxyl group. In a case where an atom in B$^3$ present adjacent to an atom in B3 to which E$^3$ is directly bonded has a substituent, the substituent may be a hydroxyl group.

In a case where the aromatic ring groups represented by B$^1$ to B$^3$ each have a plurality of substituents, the plurality of substituents may be bonded to each other to form a non-aromatic ring.

The number of carbon atoms, which are ring member atoms, in each of the aromatic ring groups represented by B$^1$ to B$^3$ is 6 or more (preferably 6 to 12). The number of carbon atoms, which are ring member atoms, means the number of carbon atoms which are ring member atoms constituting an aromatic ring.

Moreover, in a case where the aromatic ring group has a plurality of substituents, and the plurality of substituents may be bonded to each other to form a non-aromatic ring, the number of carbon atoms contained only in the non-aromatic ring is not counted in the number of carbon atoms which are ring member atoms. Furthermore, carbon atoms shared by the aromatic ring and the non-aromatic ring in the aromatic ring group are counted as the number of carbon atoms which are ring member atoms.

Examples of B$^1$ to B$^3$ include a benzene ring group, a naphthalene ring group, an anthracene ring group, a benzothiazole ring group, a carbazole ring group, and an indole ring group.

Among them, B to B3 are each independently preferably a benzene ring group or a naphthalene ring group.

In General Formula (B02), lb, mb, and nb each independently represent an integer of 0 or greater.

lb, mb, and nb are each independently preferably 0 to 5 and more preferably 1 or 2.

Moreover, in a case where lb is 0, B$^1$ does not have X$^1$. In a case where mb is 0, B$^2$ does not have X$^2$. In a case where nb is 0, B$^3$ does not have X$^3$.

For example, in a case where mb is 0, the compound represented by General Formula (B02) is a compound represented by the following general formula.

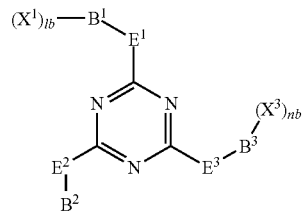

In a case where lb is 2 or greater (that is, in a case where there are a plurality of X$^1$'s), the plurality (lb pieces) of X$^1$'s may be the same as or different from each other. In a case where mb is 2 or greater (that is, in a case where there are a plurality of X$^2$'s), the plurality (mb pieces) of X$^2$'s may be the same as or different from each other. In a case where nb is 2 or greater (that is, in a case where there are a plurality of $X^3$'s), the plurality (nb pieces) of $X^3$'s may be the same as or different from each other.

In General Formula (B02), $X^1$ to $X^3$ each independently represent a group represented by General Formula (B2R).

In General Formula (B2R), * represents a position bonded to any one of $B^1$, . . . , or $B^3$.

In General Formula (B2R), $D^1$ represents a single bond or a divalent linking group.

Examples of the divalent linking group include —O—, —S—, —CO—, —NRN—, —SO$_2$—, an alkylene group, and a group consisting of a combination thereof. $R^N$ in —NR$^N$— represents a hydrogen atom or a substituent. The alkylene group is preferably a linear or branched alkylene group having 1 to 8 carbon atoms.

Among them, $D^1$ is preferably a "single bond" or a "group consisting of a combination selected from the group consisting of —O—, —CO—, and an alkylene group", and more preferably a single bond, *$^A$-alkylene group-O—CO—*$^B$, *A-CO—O-alkylene group-*$^B$*$^A$—O-alkylene group-O—*$^B$, *A-CO—O-alkylene group-O—CO—*$^B$, *$^A$CO—O-alkylene group-O—*$^B$, or *A-O-alkylene group-O—CO—*$^B$.

*$^A$ is a bonding position on a side opposite to $A^1$, and *$^B$ is a position bonded to $A^1$.

In General Formula (B2R), $A^1$ represents an aromatic ring group which may have a substituent and has 6 or more carbon atoms as ring member atoms, or a cycloalkane ring group which may have a substituent and has 6 or more carbon atoms as ring member atoms.

Moreover, $A^1$ is bonded to $D^1$, $Y^1$, and $Q^B$ via the ring member atom of the aromatic ring group or the cycloalkane ring group.

The aromatic ring group, which may have a substituent and has 6 or more carbon atoms as ring member atoms, in Ai is the same as the aromatic ring group, which may have a substituent and has 6 or more carbon atoms as ring member atoms, in $B^1$ to B3.

In the cycloalkane ring group, which may have a substituent and has 6 or more carbon atoms as ring member atoms, in $A^1$, the cycloalkane ring group may be monocyclic or polycyclic.

The number of membered rings in the monocyclic cycloalkane ring group is preferably 6 to 10.

The number of rings constituting the polycyclic cycloalkane ring group is preferably 2 to 4 and more preferably 2. The numbers of membered rings in the rings constituting the polycyclic cycloalkane ring group are each independently preferably 5 to 10.

In a case where the cycloalkane ring group has a plurality of substituents, the plurality of substituents may be bonded to each other to form a ring other than the cycloalkane ring.

The number of carbon atoms, which are ring member atoms, in the cycloalkane ring group is 6 or more (preferably 6 to 12). The number of carbon atoms, which are ring member atoms, means the number of carbon atoms which are ring member atoms constituting a cycloalkane ring.

In a case where the cycloalkane ring group has a plurality of substituents, and the plurality of substituents may be bonded to each other to form a ring other than the cycloalkane ring, the number of carbon atoms contained only in the ring other than the cycloalkane ring is not counted in the number of carbon atoms which are ring member atoms. Moreover, carbon atoms shared by the cycloalkane ring and the ring other than the cycloalkane ring in the cycloalkane ring group are counted as the number of carbon atoms which are ring member atoms.

Examples of the cycloalkane ring group, which may have a substituent and has 6 or more carbon atoms as ring member atoms, in $A^1$ include a cyclohexane ring group, a cycloheptane ring group, a norbornane ring group, and an adamantane ring group.

In General Formula (B2R), $Q^B$ and $Y^1$ each independently represent a specific functional group selected from the group consisting of an aldehyde group (—CHO), a boronic acid group (—B(OH)$_2$), a hydroxyl group (—OH), a monovalent group having an epoxy group, an amino group, a thiol group (—SH), a carboxylic acid group (—COOH), a monovalent group having a carboxylic acid anhydride group, an isocyanate group (—NCO), and a monovalent group having an oxetanyl group.

That is, the group represented by General Formula (B2R) is a group having at least one specific functional group. Here, the expression in which the group represented by General Formula (B2R) is a "group having the specific functional group" means that the group represented by General Formula (B2R) may be a group having the specific functional group as a part, or the group represented by General Formula (B2R) may be the specific functional group.

The monovalent group having an epoxy group as the specific functional group is preferably a group represented by "-$L^{eo}$-epoxy group", for example. $L^{eo}$ is a single bond or a divalent linking group, and is preferably an oxygen atom, an alkylene group (preferably a linear or branched alkylene group having 1 to 6 carbon atoms), or a group consisting of a combination thereof.

Among them, the monovalent group having an epoxy group is preferably "—O-alkylene group-epoxy group".

Moreover, as a substituent that the epoxy group may have, a linear or branched alkyl group having 1 to 6 carbon atoms is preferable.

The amino group as the specific functional group is not particularly limited, and may be any one of a primary amino group, a secondary amino group, or a tertiary amino group. Examples thereof include an amino group represented by —N($R^E$)$_2$ ($R^E$'s are each independently represent a hydrogen atom or an alkyl group (which may be linear or branched)). The number of carbon atoms in the alkyl group is preferably 1 to 10, more preferably 1 to 6, and even more preferably 1 to 3. Moreover, the alkyl group may further have a substituent.

The monovalent group having a carboxylic acid anhydride group as the specific functional group is preferably a group obtained by removing any hydrogen atom from maleic acid anhydride, phthalic acid anhydride, pyromellitic acid anhydride, and trimellitic acid anhydride, for example.

The monovalent group having an oxetanyl group as the specific functional group is preferably a group represented by "-$L^{eo}$-oxetanyl group", for example. $L^{eo}$ is a single bond or a divalent linking group, and is preferably an oxygen atom, an alkylene group (preferably a linear or branched alkylene group having 1 to 6 carbon atoms), or a group consisting of a combination thereof.

Among them, the monovalent group having an oxetanyl group is preferably "—O-alkylene group-oxetanyl group".

Moreover, as a substituent that the oxetanyl group may have, a linear or branched alkyl group having 1 to 6 carbon atoms is preferable.

Among them, the specific functional group is preferably an aldehyde group, a boronic acid group, a hydroxyl group, or a monovalent group having an epoxy group.

In other words, $Q^B$ and $Y^1$ are each independently preferably an aldehyde group, a boronic acid group, a hydroxyl group, or a monovalent group having an epoxy group.

In General Formula (B2R), p represents an integer of 0 or greater.

Among them, p is preferably 0 to 5 and more preferably 0 or 1.

In a case where p is 0, $Y^1$ is directly bonded to any one of $B^1$, . . . , or $B^3$. That is, $X^1$ to $X^3$ may be the specific functional group.

In General Formula (B2R), q represents an integer of 0 to 2.

Among them, q is preferably 0 or 1.

Furthermore, in a case where a plurality of groups represented by General Formula (B2R) are present in the compound represented by General Formula (B02), the plurality of groups represented by General Formula (B2R) may be the same as or different from each other.

For example, in General Formula (B02), in a case where there are a plurality of $D^1$'s, the plurality of $D^1$'s may be the same as or different from each other. In a case where there are a plurality of $A^1$'s, the plurality of $A^1$'s may be the same as or different from each other. In a case where there are a plurality of $Q^B$'s, the plurality of $Q^B$'s may be the same as or different from each other. In a case where there are a plurality of $Y^1$'s, the plurality of $Y^1$'s may be the same as or different from each other. In a case where there are a plurality of p's, the plurality of p's may be the same as or different from each other. In a case where there are a plurality of q's, the plurality of q's may be the same as or different from each other.

In General Formula (B02), the total number of lb, mb, and nb is 2 or greater (preferably 2 to 10 and more preferably 3 to 6).

In other words, the total number of $X^1$ to $X^3$, which may each be present in a plurality of numbers, is 2 or greater (preferably 2 to 10 and more preferably 3 to 6).

That is, in General Formula (B02), the total number of the number of $X$'s which may be present in a plurality of numbers, the number of $X^2$'s which may be present in a plurality of numbers, and the number of $X^3$'s which may be present in a plurality of numbers is 2 or greater, preferably 2 to 10, and more preferably 3 to 6.

For example, lb is preferably 1 or greater (more preferably 1 or 2), mb is preferably 1 or greater (more preferably 1 or 2), and nb is preferably 1 or greater (more preferably 1 or 2).

That is, $B^1$ preferably has one or more (more preferably one or two) $X^1$'s, $B^2$ preferably has one or more (more preferably one or two) $X^2$'s, and $B^3$ preferably has one or more (more preferably one or two) $X^3$'s.

Here, in a case where lb is 1 or greater and at least one $X^1$ is a hydroxyl group, it is preferable that an atom in Bi to which $X^1$, which is a hydroxyl group, is directly bonded and an atom in Bi to which $E^1$ is directly bonded are not adjacent to each other.

In a case where mb is 1 or greater and at least one $X^2$ is a hydroxyl group, it is preferable that an atom in $B^2$ to which $X^2$, which is a hydroxyl group, is directly bonded and an atom in $B^2$ to which $E^2$ is directly bonded are not adjacent to each other.

In a case where nb is 1 or greater and at least one $X^3$ is a hydroxyl group, it is preferable that an atom in B3 to which $X^3$, which is a hydroxyl group, is directly bonded and an atom in B3 to which $E^3$ is directly bonded are not adjacent to each other.

For example, in a case where $B^1$ is a benzene ring group, and the benzene ring group has a hydroxyl group at an ortho position of $E^1$, the hydroxyl group does not correspond to $X^1$, and thus may not be counted in the aforementioned "number of $X^1$'s which may be present in a plurality of numbers".

The present inventors consider that the hydroxyl groups present at positions on $B^1$ to $B^3$ adjacent to $E^1$ to $E^3$ are greatly affected by steric hindrance, and less likely to form a favorable thermal conduction path between the inorganic substances (inorganic nitrides and the like), and thus hydroxyl groups present at different positions have an excellent effect of improving the thermally conductive properties.

For example, the atom in $B^1$ to which $E^1$ is directly bonded, and an atom (preferably a carbon atom) in $B^1$ present adjacent to the atom are preferably unsubstituted. The atom in $B^2$ to which $E^2$ is directly bonded, and an atom (preferably a carbon atom) in $B^2$ present adjacent to the atom are preferably unsubstituted. The atom in B3 to which $E^3$ is directly bonded, and an atom (preferably a carbon atom) in $B^3$ present adjacent to the atom are preferably unsubstituted.

The compound represented by General Formula (B02) may have one kind of the groups represented by General Formula (B2R) singly, and may have two or more kinds thereof.

Among them, the compound represented by General Formula (B02) is preferably a "compound having only a hydroxyl group as the specific functional group", a "compound having only a monovalent group having an epoxy group as the specific functional group", or a "compound having, as the specific functional group, a group (preferably a hydroxyl group) which is neither an aldehyde group nor a boronic acid group, and an aldehyde group and/or a boronic acid group".

Furthermore, as the "compound having, as the specific functional group, both a group which is neither an aldehyde group nor a boronic acid group, and an aldehyde group and/or a boronic acid group", for example, a compound in which in the compound represented by General Formula (B02), a total of one or more among lb pieces of $X^1$'s, mb pieces of $X^2$'s, and nb pieces of $X^3$'s (that is, among (lb+mb+nb) pieces of groups represented by General Formula (B2R)) each are a group having at least one specific functional group of an aldehyde group or a boronic acid group, and a total of one or more (preferably one to four) among lb pieces of $X^1$'s, mb pieces of $X^2$'s, and nb pieces of $X^3$'s (that is, among (lb+mb+nb) pieces of groups represented by General Formula (B2R)) each are a group having a specific functional group which is neither an aldehyde group nor a boronic acid group is preferable.

It is preferable that the "group having at least one specific functional group of an aldehyde group or a boronic acid group", and the "group having a specific functional group which is neither an aldehyde group nor a boronic acid group" are present as separate groups.

As the "specific functional group which is neither an aldehyde group nor a boronic acid group", a hydroxyl group or a monovalent group having an epoxy group is preferable, and a hydroxyl group is more preferable.

It is also preferable that the "group having at least one specific functional group of an aldehyde group or a boronic acid group" does not have any "specific functional group which is neither an aldehyde group nor a boronic acid group".

Moreover, it is also preferable that the "group having a specific functional group which is neither an aldehyde group nor a boronic acid group" has neither an aldehyde group nor a boronic acid group.

By satisfying such conditions, the thermally conductive properties of the obtained thermally conductive material are superior. As a mechanism thereof, the present inventors estimate as follows.

That is, in a case where the compound represented by General Formula (B02) has an aldehyde group and/or a boronic acid group as the specific functional group, the aldehyde group and/or the boronic acid group particularly favorably interacts with the inorganic substance (in particular, an inorganic nitride such as boron nitride).

In a case where the compound represented by General Formula (B02) further has other specific functional groups in addition to the aldehyde group and/or the boronic acid group, the aldehyde group and/or the boronic acid group interacts mainly with the inorganic substance (in particular, inorganic nitride), while the other specific functional groups form a thermal conduction path by an interaction with a substance other than the inorganic substance (for example, between the compounds represented by General Formula (B02)), and thus the thermally conductive properties of the obtained thermally conductive material are superior. Moreover, it is estimated that the other specific functional groups may form an interaction with a resin consisting of the phenolic compound and/or the epoxy compound (the compound represented by General Formula (1), or the like) through chemical bonding, and in this case, the thermally conductive properties of the obtained thermally conductive material are superior.

(Compound Represented by General Formula (B03))

Among them, the compound represented by General Formula (B02) is preferably a compound represented by General Formula (B03).

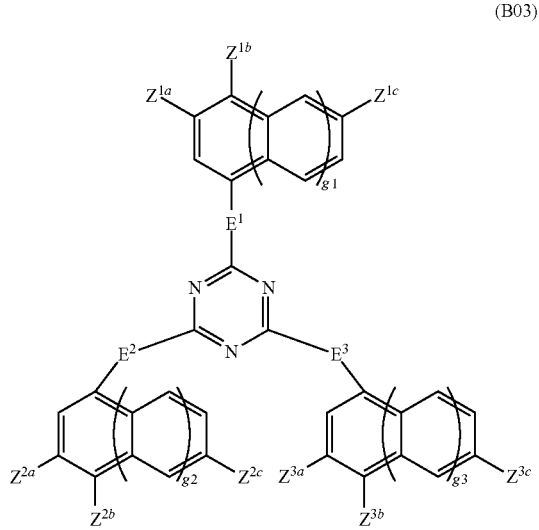

(B03)

In General Formula (B03), $E^1$ to $E^3$ each independently represent a single bond, —NH—, or —NR—. R represents a substituent.

$E^1$ to $E^3$ in General Formula (B03) are the same as $E^1$ to $E^3$ in General Formula (B02), respectively.

In General Formula (B03), $g^1$ to $g^3$ each independently represent an integer of 0 or 1.

In General Formula (B03), $Z^{1a}$ to $Z^{1c}$, $Z^{2a}$ to $Z^{2c}$, and $Z^{3a}$ to $Z^{3c}$ each independently represent a hydrogen atom or the group represented by General Formula (B2R).

Here, a total of two or more (preferably two to nine and more preferably three to six) among $Z^{1a}$ to $Z^{1c}$, $Z^{2a}$ to $Z^{2c}$, and $Z^{3a}$ to $Z^{3c}$ are the groups represented by General Formula (B2R).

The groups represented by General Formula (B2R) are as described above.

It is preferable that one or more (preferably one or two) among $Z^{1a}$ to $Z^{1c}$ are the groups represented by General Formula (B2R), one or more (preferably one or two) among $Z^{2a}$ to $Z^{2c}$ are the groups represented by General Formula (B2R), and one or more (preferably one or two) among $Z^{3a}$ to $Z^{3c}$ are the groups represented by General Formula (B2R).

Among them, it is preferable that $Z^{1a}$ to $Z^{1c}$, $Z^{2a}$ to $Z^{2c}$, and $Z^{3a}$ to $Z^{3c}$ are each independently a "group selected from the group consisting of a hydrogen atom and a group represented by General Formula (B2R) in which the specific functional group is a hydroxyl group", or a "group selected from the group consisting of a hydrogen atom and a group represented by General Formula (B2R) in which the specific functional group is a monovalent group having an epoxy group".

In addition, one or more (preferably one or two) among $Z^{1a}$ to $Z^{1c}$, $Z^{2a}$ to $Z^{2c}$, and $Z^{3a}$ to $Z^{3c}$ each are a group which is represented by General Formula (B2R) and has at least one specific functional group of an aldehyde group or a boronic acid group, and it is also preferable that one or more (preferably one to four) among $Z^{1a}$ to $Z^{1c}$, $Z^{2a}$ to $Z^{2c}$, and $Z^{3a}$ to $Z^{3c}$ each are a group which is represented by General Formula (B2R) and has a specific functional group that is neither an aldehyde group nor a boronic acid group.

Among them, it is more preferable that one or more (preferably one or two) among $Z^{1a}$ to $Z^{1c}$ each are a group which is represented by General Formula (B2R) and has at least one specific functional group of an aldehyde group or a boronic acid group, one or more (preferably one or two) among $Z^{2a}$ to $Z^{2c}$ each are a group which is represented by General Formula (B2R) and has a specific functional group that is neither an aldehyde group nor a boronic acid group, and one or more (preferably one or two) among $Z^{3a}$ to $Z^{3c}$ each are a group which is represented by General Formula (B2R) and has a specific functional group that is neither an aldehyde group nor a boronic acid group.

As the "specific functional group which is neither an aldehyde group nor a boronic acid group", a hydroxyl group or a monovalent group having an epoxy group is preferable, and a hydroxyl group is more preferable.

It is also preferable that the "group which is represented by General Formula (B2R) and has a specific functional group that is neither an aldehyde group nor a boronic acid group" does not have any "specific functional group which is neither an aldehyde group nor a boronic acid group".

Moreover, it is also preferable that the "group which is represented by General Formula (B2R) and has a specific functional group that is neither an aldehyde group nor a boronic acid group" has neither an aldehyde group nor a boronic acid group.

<Other Surface Modifiers (Surface Modifier for Inorganic Oxide)>

In addition, it is also preferable that the composition (preferably, in a case where the inorganic substance includes an inorganic oxide (aluminum oxide or the like)) contains an organic silane molecule (preferably, a compound having an alkoxysilyl group) as the surface modifier. Examples of the organic silane molecule include the surface modifier A, the surface modifier B, and other surface modifiers which do not correspond to the both surface modifiers.

The organic silane molecules, which are such other surface modifiers, are preferably used as a surface modifier for an inorganic oxide (preferably, a surface modifier for aluminum oxide).

Examples of the organic silane molecule which is the other surface modifier include 3-aminopropyl triethoxysilane, 3-(2-aminoethyl)aminopropyl triethoxysilane, 3-aminopropyl trimethoxysilane, 3-(2-aminoethyl)aminopropyl trimethoxysilane, N-phenyl-3-aminopropyl trimethoxysilane, 3-mercapto triethoxysilane, and 3-ureidopropyl triethoxysilane.

One kind of the surface modifiers may be used singly, or two or more kinds thereof may be used.

In a case where the composition contains the surface modifier (preferably, the surface modifier for an inorganic nitride and/or the surface modifier for an inorganic oxide), a content of the surface modifier is preferably 0.01% to 10% by mass and more preferably 0.05% to 5% by mass, with respect to the total solid content of the composition.

Moreover, the content (preferably, the total content of the surface modifier A and the surface modifier B) of the surface modifier for an inorganic nitride is preferably 0.01% to 10% by mass and more preferably 0.05% to 5% by mass, with respect to the total solid content of the composition.

The content of the surface modifier for an inorganic oxide (preferably, the organic silane molecules which are the other surface modifiers) is preferably 0.01% to 10% by mass and more preferably 0.05% to 5% by mass, with respect to the total solid content of the composition.

In a case where the composition contains the surface modifier (preferably, the surface modifier for an inorganic nitride and/or the surface modifier for an inorganic oxide), the content of the surface modifier is preferably 0.01% to 10% by mass and more preferably 0.10% to 5% by mass, with respect to the total mass of the inorganic substance.

Moreover, the content (preferably, the total content of the surface modifier A and the surface modifier B) of the surface modifier for an inorganic nitride is preferably 0.01% to 10% by mass and more preferably 0.10% to 5% by mass, with respect to the total mass of the inorganic nitride (preferably, boron nitride).

The content of the surface modifier for an inorganic oxide (preferably, the organic silane molecules which are the other surface modifiers) is preferably 0.01% to 10% by mass and more preferably 0.10% to 5% by mass, with respect to the total mass of the inorganic oxide (preferably, aluminum oxide).

In the composition according to the embodiment of the present invention, a content (total content) of compounds having an epoxy group (for example, the aforementioned other epoxy compounds, a surface modifier having an epoxy group, and the like) other than the compound represented by General Formula (1) is preferably 20% by mass or less, more preferably 10% by mass or less, and even more preferably 5% by mass or less, with respect to the total solid content of the composition, and it is particularly preferable that the compounds are not substantially contained.

Here, the expression in which the compounds having an epoxy group other than the compound represented by General Formula (1) are not substantially contained means that the content of the compounds having an epoxy group other than the compound represented by General Formula (1) is 0.5% by mass or less with respect to the total solid content of the composition.

Moreover, the content of the compounds having an epoxy group other than the compound represented by General Formula (1) is preferably 0% to 60% by mass and more preferably 0% by mass or greater and less than 5% by mass, with respect to the total content of the compound represented by General Formula (1) and the compounds having an epoxy group other than the compound represented by General Formula (1).

In the composition according to the embodiment of the present invention, a ratio (total number of phenolic hydroxyl groups contained in solid content/total number of epoxy groups contained in the solid content) of the total number of phenolic hydroxyl groups contained in the solid content (for example, the total number of the number of phenolic hydroxyl groups contained in the phenolic compound, and the number of phenolic hydroxyl groups contained in the surface modifier having the phenolic hydroxyl group) to the total number of epoxy groups contained in the solid content (for example, the total number of the number of epoxy groups contained in the compound represented by General Formula (1), the number of epoxy groups contained in the other epoxy compounds, and the number of epoxy groups contained in the surface modifier having the epoxy group) is preferably 0.50 to 2.00, more preferably 0.65 to 1.50, and even more preferably 0.90 to 1.10.

In the composition according to the embodiment of the present invention, a ratio (total number of active hydrogen atoms contained in solid content/total number of epoxy groups contained in the solid content) of the total number of active hydrogen atoms (hydrogen atoms of the phenolic hydroxyl group, and the like) contained in the solid content to the total number of epoxy groups contained in the solid content is preferably 0.50 to 2.00, more preferably 0.65 to 1.50, and even more preferably 0.90 to 1.10.

[Curing Accelerator]

The composition may further contain a curing accelerator.

A kind of the curing accelerator is not limited, and examples thereof include triphenylphosphine, a boron trifluoride-amine complex, and the compound described in paragraph 0052 in JP2012-67225A. In addition to the aforementioned curing accelerators, examples thereof include imidazole-based curing accelerators such as 2-methylimidazole (trade name; 2MZ), 2-undecylimidazole (trade name; C11-Z), 2-heptadecylimidazole (trade name; C17Z), 1,2-dimethylimidazole (trade name; 1.2DMZ), 2-ethyl-4-methylimidazole (trade name; 2E4MZ), 2-phenylimidazole (trade name; 2PZ), 2-phenyl-4-methylimidazole (trade name; 2P4MZ), 1-benzyl-2-methylimidazole (trade name; 1B2MZ), 1-benzyl-2-phenylimidazole (trade name; 1B2PZ), 1-cyanoethyl-2-methylimidazole (trade name; 2MZ-CN), 1-cyanoethyl-2-undecylimidazole (trade name; C11Z-CN), 1-cyanoethyl-2-phenylimidazolium trimellitate (trade name; 2PZCNS-PW), 2,4-diamino-6-[2'-methylimidazolyl-(1')]-ethyl-s-triazine (trade name; 2MZ-A), 2,4-diamino-6-[2'-undecylimidazolyl-(1')]-ethyl-s-triazine (trade name; C11Z-A), 2,4-diamino-6-[2'-ethyl-4'-methylimidazolyl-(1')]-ethyl-s-triazine (trade name; 2E4MZ-A), 2,4-diamino-6-[2'-methylimidazolyl-(1')]-ethyl-s-triazine isocyanuric acid adduct (trade name; 2MA-OK), 2-phenyl-4,5-dihydroxymethylimidazole (trade name; 2PHZ-PW), 2-phenyl-4-methyl-5-hydroxymethylimidazole (trade name; 2P4MHZ-PW), and 1-cyanoethyl-2-phenylimidazole (trade name; 2PZ-CN) (all produced by SHIKOKU CHEMICALS CORPORATION).

One kind of the curing accelerators may be used singly, or two or more kinds thereof may be used.

In a case where the composition contains the curing accelerator, a content of the curing accelerator is preferably 0.01% to 10% by mass and more preferably 0.1% to 5% by mass, with respect to the total content of the compound represented by General Formula (1) and the other epoxy compounds.

[Dispersant]

The composition may further contain a dispersant.

In a case where the composition contains a dispersant, the dispersibility of the inorganic substance in the composition is improved, and thus superior thermal conductivity and adhesiveness can be achieved.

The dispersant can be appropriately selected from commonly used dispersants. Examples thereof include DISPERBYK-106 (produced by BYK-Chemie GmbH), DISPERBYK-111 (produced by BYK-Chemie GmbH), ED-113 (produced by Kusumoto Chemicals, Ltd.), AJISPER PN-411 (produced by Ajinomoto Fine-Techno Co., Inc.), and REB122-4 (produced by Hitachi Chemical Company, Ltd.).

One kind of the dispersants may be used singly, or two or more kinds thereof may be used.

In a case where the composition contains the dispersant, a content of the dispersant is preferably 0.01% to 10% by mass and more preferably 0.1% to 5% by mass, with respect to the content of the inorganic substance.

[Solvent]

The composition may further contain a solvent.

A kind of the solvent is not particularly limited, and an organic solvent is preferable. Examples of the organic solvent include cyclopentanone, cyclohexanone, ethyl acetate, methyl ethyl ketone, dichloromethane, and tetrahydrofuran.

In a case where the composition contains a solvent, a content of the solvent is preferably an amount such that the concentration of the solid contents in the composition is 20% to 90% by mass, more preferably an amount such that the concentration is 30% to 85% by mass, and even more preferably an amount such that the concentration is 40% to 85% by mass.

[Method for Producing Composition]

A method for producing the composition is not particularly limited, known methods can be adopted, and for example, the composition can be produced by mixing the aforementioned various components. In a case of mixing, the various components may be mixed at a time or mixed sequentially.

A method for mixing the components is not particularly limited, and known methods can be used. A mixing device used for the mixing is preferably a submerged disperser, and examples thereof include a rotating and revolving mixer, a stirrer such as a high-speed rotating shear-type stirrer, a colloid mill, a roll mill, a high-pressure injection-type disperser, an ultrasonic disperser, a beads mill, and a homogenizer. One kind of the mixing devices may be used singly, or two or more kinds thereof may be used. A deaeration treatment may be performed before and after the mixing and/or simultaneously with the mixing.

[Method for Curing Composition]

The composition according to the embodiment of the present invention is a composition for forming a thermally conductive material.

The composition according to the embodiment of the present invention is subjected to a curing treatment to obtain a thermally conductive material.

A method for curing the composition is not particularly limited, but a thermal curing reaction is preferable.

A heating temperature during the thermal curing reaction is not particularly limited. For example, the heating temperature may be appropriately selected within the range of 50° C. to 250° C. Moreover, in a case where the thermal curing reaction is performed, a heating treatment at different temperatures may be performed a plurality of times.

The curing treatment is preferably performed on the composition which is formed in a film shape or a sheet shape. Specifically, for example, the composition may be applied to form a film, and a curing reaction may be performed.

In a case where the curing treatment is performed, it is preferable to apply the composition onto a substrate to form a coating film, and then cure the coating film. In this case, after further bringing the coating film formed on the substrate into contact with another substrate, the curing treatment may be performed. A cured substance (thermally conductive material) obtained after the curing may or may not be separated from one or both of the substrates.

Furthermore, in a case where the curing treatment is performed, after applying the composition onto different substrates to form respective coating films, the curing treatment may be performed in a state where the obtained coating films are in contact with each other. A cured substance (thermally conductive material) obtained after the curing may or may not be separated from one or both of the substrates.

During the curing treatment, press working may be performed. A press used for the press working is not limited, and for example, a flat plate press may be used, or a roll press may be used.

In a case where the roll press is used, for example, it is preferable that a substrate with a coating film, which is obtained by forming a coating film on a substrate, is sandwiched between a pair of rolls in which two rolls face each other, and while rotating the pair of rolls to cause the substrate with a coating film to be passed, a pressure is applied in a film thickness direction of the substrate with a coating film. In the substrate with a coating film, a substrate may be present on only one surface of a coating film, or a substrate may be present on both surfaces of a coating film. The substrate with a coating film may be passed through the roll press only once or a plurality of times.

Only one of the treatment with the flat plate press and the treatment with the roll press may be performed, or both the treatments may be performed.

In addition, the curing treatment may be completed when the composition is in a semi-cured state. The semi-cured thermally conductive material of the present invention may be disposed so as to be in contact with a device to be used or the like, and then further cured by heating or the like to be finally cured. It is also preferable that the device and the thermally conductive material of the present invention adhere to each other by heating or the like during the final curing.

Regarding the preparation of the thermally conductive material including a curing reaction, "Highly Thermally Conductive Composite Material" (CMC Publishing CO., LTD., written by Yoshitaka TAKEZAWA) can be referred to.

A shape of the thermally conductive material is not particularly limited, and the thermally conductive material can be molded into various shapes according to the use. Examples of a typical shape of the molded thermally conductive material include a sheet shape.

That is, it is also preferable that the thermally conductive material formed of the composition according to the embodiment of the present invention is a thermally conductive sheet.

Furthermore, the thermally conductive properties of the thermally conductive material formed of the composition according to the embodiment of the present invention are preferably isotropic rather than anisotropic.

The thermally conductive material preferably has insulating properties (electrical insulating properties). In other words, the composition according to the embodiment of the present invention is preferably a thermally conductive insulating composition.

For example, a volume resistivity of the thermally conductive material at 23° C. and a relative humidity of 65% is preferably $10^{10}$ Ω·cm or greater, more preferably $10^{12}$ Ω·cm or greater, and even more preferably $10^{14}$ Ω·cm or greater. The upper limit thereof is not particularly limited, but is generally $10^{18}$ Ω·cm or less.

[Use of Thermally Conductive Material]

The thermally conductive material formed of the composition according to the embodiment of the present invention can be used as a heat dissipation material such as a heat dissipation sheet, and can be used for dissipating heat from various devices. More specifically, a device with a thermally conductive layer is prepared by disposing a thermally conductive layer, which contains the thermally conductive material of the present invention, on a device, and thus the heat generated from the device can be efficiently dissipated by the thermally conductive layer.

The thermally conductive material formed of the composition according to the embodiment of the present invention has sufficient thermally conductive properties and high heat resistance, and thus is suitable for dissipating heat from a power semiconductor device used in various electrical machines such as a personal computer, a general household electric appliance, and an automobile.

Furthermore, the thermally conductive material formed of the composition according to the embodiment of the present invention has sufficient thermally conductive properties even in a semi-cured state, and thus can also be used as a heat dissipation material which is disposed in a portion where light for photocuring is hardly reached, such as a gap between members of various devices. Moreover, the thermally conductive material also has excellent adhesiveness, and thus can also be used as an adhesive having thermally conductive properties.

The thermally conductive material formed of the composition according to the embodiment of the present invention may be used in combination with members other than the members formed of the present composition.

For example, a sheet-shaped thermally conductive material (thermally conductive sheet) may be combined with a sheet-shaped support in addition to the layer formed of the present composition.

Examples of the sheet-shaped support include a plastic film, a metal film, and a glass plate. Examples of a material for the plastic film include polyester such as polyethylene terephthalate (PET), polycarbonate, an acrylic resin, an epoxy resin, polyurethane, polyamide, polyolefin, a cellulose derivative, and silicone. Examples of the metal film include a copper film.

A film thickness of the sheet-shaped thermally conductive material (thermally conductive sheet) is preferably 100 to 300 μm and more preferably 150 to 250 μm. Examples.

Hereinafter, the present invention will be described in more detail based on Examples. The materials, the amount and proportion of the materials used, the details of treatments, the procedure of treatments, and the like shown in the following Examples can be appropriately changed within a range that does not depart from the gist of the present invention. Accordingly, the scope of the present invention is not limitedly interpreted by the following Examples.

[Preparation and Evaluation of Composition]

[Various Components]

Various components used in Examples and Comparative Examples will be shown below.

<Phenolic Compound>

Phenolic compounds used in Examples and Comparative Examples will be shown below.

Moreover, the phenolic compounds A-1, A-5, and A-6 used in Examples were synthesized with reference to U.S. Pat. No. 4,992,596A.

Furthermore, the phenolic compound A-7 is MEH-7500 produced by Meiwa Plastic Industries, Ltd.

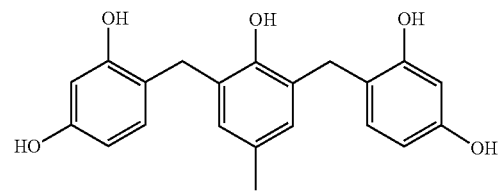

A-1

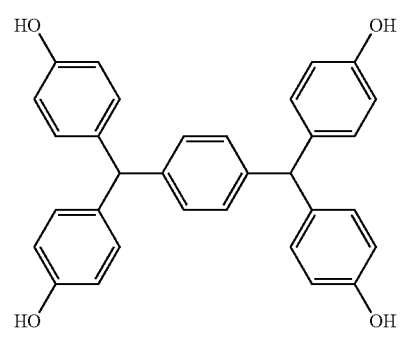

A-2

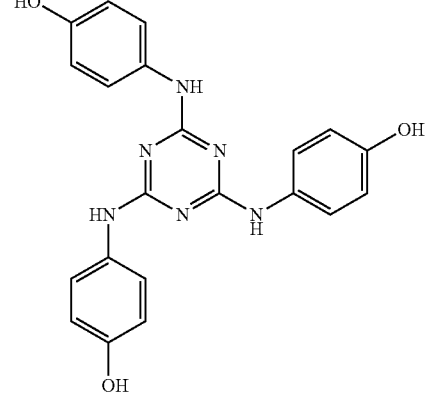

A-3

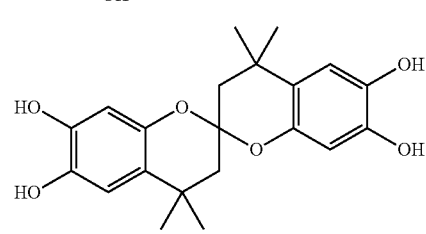

A-4

A-5
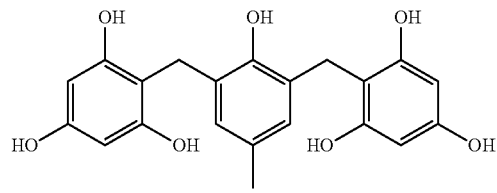
A-6
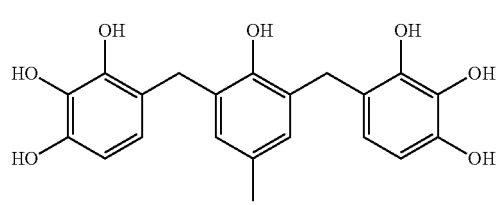
A-7
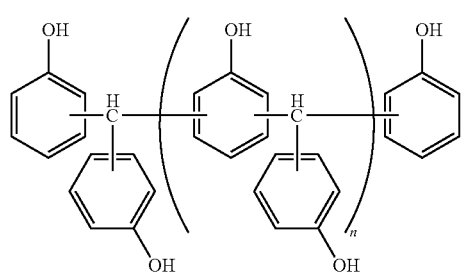
A-8
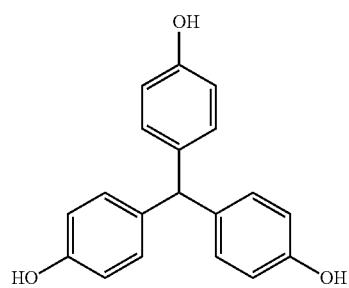
<Epoxy Compound>
Epoxy compounds (the compound represented by General Formula (1), or the other epoxy compounds) used in Examples and Comparative Examples will be shown below.
Moreover, the epoxy compound C-1 is YX-4000 produced by Mitsubishi Chemical Corporation, and the epoxy compound C-2 is EPPN-201 produced by Nippon Kayaku Co., Ltd.
B-1
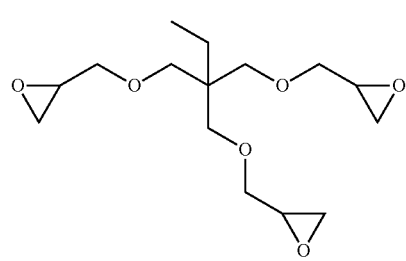
B-2
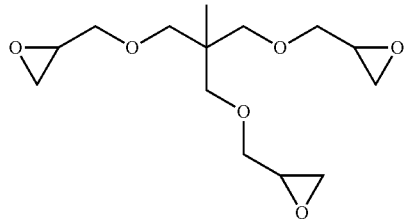
B-3
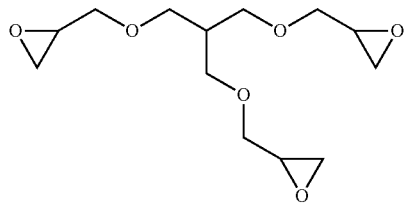
B-4
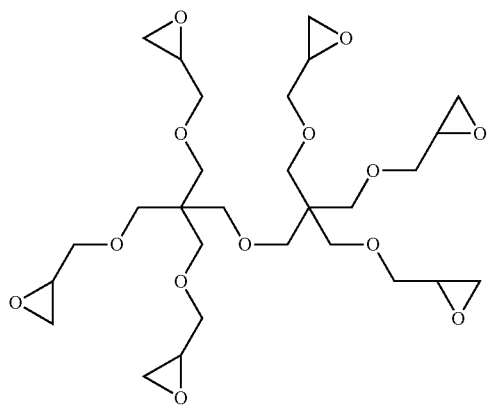
B-5
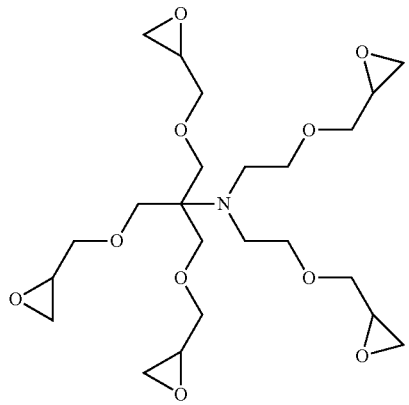
B-6
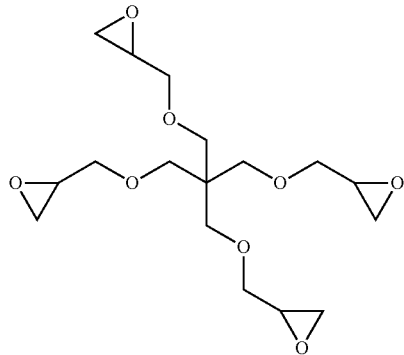

B-7
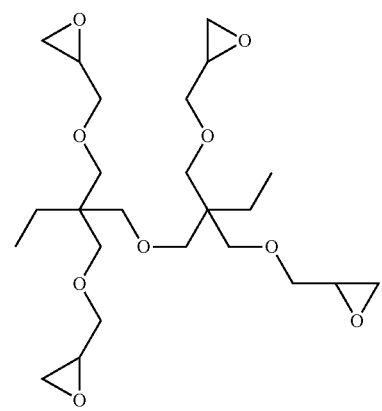

B-8
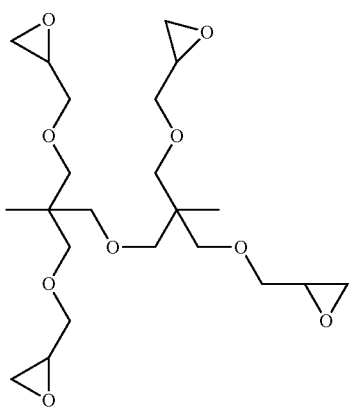

B-9
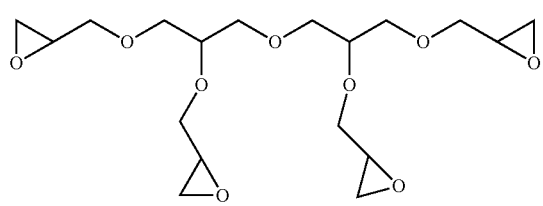

B-10
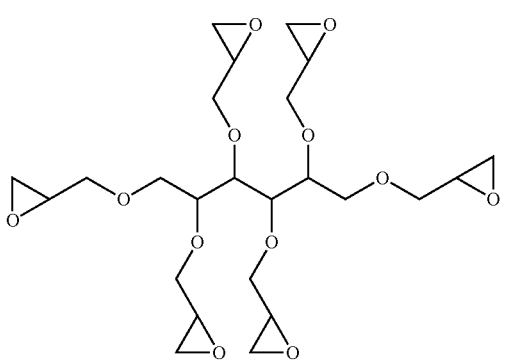

B-11
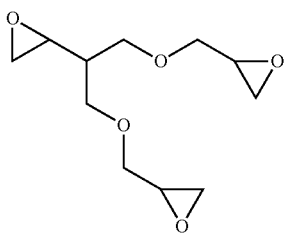

C-1
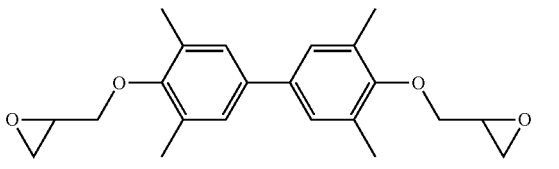

C-2
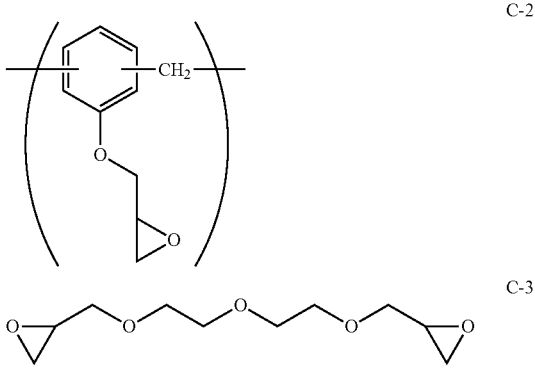

C-3
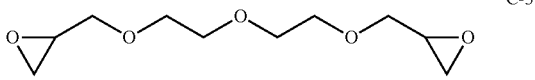

<Inorganic Substances (Inorganic Nitride and Other Inorganic Substances)>

Inorganic substances used in Examples and Comparative Examples will be shown below.

"AA-3": Aluminum oxide (average particle diameter: 3 μm, produced by Sumitomo Chemical Co., Ltd.)

"AA-04": Aluminum oxide (average particle diameter: 0.4 μm, produced by Sumitomo Chemical Co., Ltd.)

"HP-40 MF100": Aggregation-shaped boron nitride (average particle diameter: 40 μm, produced by MIZUSHIMA FERROALLOY CO., LTD.)

<Curing Accelerator>

Inorganic substances used in Examples and Comparative Examples will be shown below.

"E-1": Triphenylphosphine (PPh$_3$)

"E-2": 1-Cyanoethyl-2-phenylimidazole (trade name; 2PZ-CN, produced by SHIKOKU CHEMICALS CORPORATION)

"E-3": 2-Phenyl-4,5-dihydroxymethylimidazole (trade name; 2PHZ-PW, produced by SHIKOKU CHEMICALS CORPORATION)

<Dispersant>

DISPERBYK-106 (polymer salt having an acidic group) was used as the dispersant.

<Surface Modifier>

The following compounds were used as the surface modifier for an inorganic nitride.

D-1
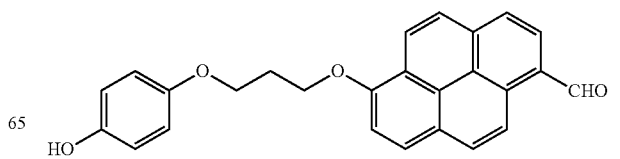

-continued

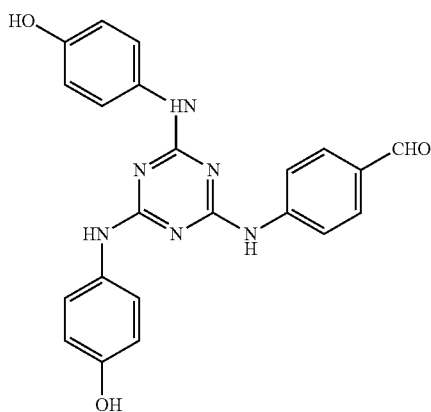

D-2

The following compound was used as the surface modifier for aluminum oxide (organic silane molecule).

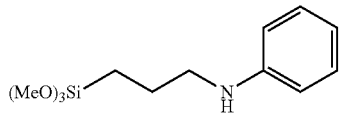

D-3

<Solvent>

Cyclopentanone was used as the solvent.

[Preparation of Composition] A curing liquid was prepared by formulating the epoxy compound and the phenolic compound of each combination shown in Table 1 below.

The total amount of the obtained curing liquid, the solvent, the dispersant, the surface modifier (the surface modifier for aluminum oxide and the surface modifier for an inorganic nitride), and the curing accelerator were mixed in this order, and then the inorganic substances (the inorganic nitride and the inorganic oxide) were added thereto. The obtained mixture was treated for 5 minutes with a rotating and revolving mixer (manufactured by THINKY CORPORATION, AWATORI RENTARO ARE-310) to obtain a composition (composition for forming a thermally conductive material) of each Example or Comparative Example.

Here, the addition amount of the solvent was set such that the concentration of the solid contents in the composition was 50% to 80% by mass.

Furthermore, the concentration of the solid contents in the composition was adjusted for each composition within the above range so that the viscosities of the compositions were about the same.

Moreover, the inorganic substances were used after being mixed so that a ratio (mass ratio) between contents of the respective inorganic substances satisfied a relationship shown in Table 1.

The formulation of the solid content in the composition of each Example or Comparative Example is shown in Table 1.

[Evaluation]

<Thermally Conductive Properties>

The prepared composition was uniformly applied onto a release surface of a release-treated polyester film (NP-100A, manufactured by PANAC CO., LTD., film thickness of 100 m) by using an applicator, and left to stand at 120° C. for 5 minutes to obtain a coating film.

Two polyester films with such a coating film were prepared, and after laminating the coating film surfaces with each other, two polyester films with a coating film were hot-pressed (treated for 1 minute at a hot plate temperature of 65° C. and a pressure of 12 MPa) in the air to obtain a semi-cured film. The obtained semi-cured film was treated with a hot press (treated for 20 minutes at a hot plate temperature of 160° C. and a pressure of 12 MPa, and then for 90 minutes at 180° C. and a normal pressure) in the air to cure the coating film, thereby obtaining a resin sheet. The polyester films on both surfaces of the resin sheet were peeled off to obtain a thermally conductive sheet (sheet-shaped thermally conductive material) having an average film thickness of 200 μm.

The evaluation of thermally conductive properties was performed using each thermally conductive sheet formed of each composition. The thermal conductivity was measured by the following method, and the thermally conductive properties were evaluated according to the following standards.

(Measurement of Thermal Conductivity (W/m·k))

(1) By using "LFA 467" manufactured by NETZSCH, the thermal diffusivity of the thermally conductive sheet in a thickness direction was measured through a laser flash method.

(2) By using a balance "XS204" manufactured by METTLER TOLEDO, the specific gravity of the thermally conductive sheet was measured through an Archimedes method ("solid specific gravity measuring kit" was used).

(3) By using "DSC320/6200" manufactured by Seiko Instruments Inc., the specific heat of the thermally conductive sheet at 25° C. was determined under a temperature rising condition of 10° C./min.

(4) The thermal conductivity of the thermally conductive sheet was calculated by multiplying the obtained thermal diffusivity by the specific gravity and the specific heat.

(Evaluation Standards)

The measured thermal conductivity was classified according to the following standards, and used as the evaluation of the thermally conductive properties.

"A+": 15 W/m·K or greater
"A": 10 W/m·K or greater and less than 15 W/m·K
"B": 8 W/m·K or greater and less than 10 W/m·K
"C": 5 W/m·K or greater and less than 8 W/m·K
"D": Less than 5 W/m·K The results are shown in Table 1.

<Insulating Properties>

A volume resistance value of a thermally conductive sheet, which was prepared in the same manner as in the evaluation of "Thermally conductive properties", at 23° C. and a relative humidity of 65% was measured using a HTRESTA MCP-HT450 type (manufactured by Nittoseiko Analytech Co., Ltd.).

(Evaluation Standards)

The measured volume resistance value of the thermally conductive sheet was classified according to the following standards, and the insulating properties were evaluated.

"A": $10^{14}$ Ω·cm or greater
"B": $10^{12}$ Ω·cm or greater and less than $10^{14}$ Ω·cm
"C": $10^{10}$ Ω·cm or greater and less than $10^{12}$ Ω·cm
"D": Less than $10^{10}$ Ω·cm <Adhesiveness>

A tensile shear test based on JIS K 6850 was performed using copper plates as adherends and the composition as an adhesive.

Moreover, a test specimen was prepared by laminating two copper plates (size: 100 mm×25 mm×0.3 mm) with each other with an adhesion area of 12.5 mm×25 mm.

The curing conditions of the composition were the same as those in a case where the thermally conductive sheet was prepared in the measurement of the thermally conductive properties.

For the test, TENSILON UNIVERSAL MATERIAL TESTING INSTRUMENT RTc-1225A was used, and a tensile rate was 0.05 mm/s.

(Evaluation Standards)

The measured breaking stress was classified according to the following standards, and the adhesiveness was evaluated.

"A": 5 MPa or greater
"B": 4 MPa or greater and less than 5 MPa
"C": Less than 4 MPa

[Results]

Table 1 will be shown below.

In Table 1, a column of "Content (%)" indicates the content (% by mass) of each component with respect to the total solid content.

A column of "Hydroxyl group content (mmol/g)" indicates the content (mmol/g) of the phenolic hydroxyl group in the used phenolic compound.

A column of "Epoxy group content (mmol/g)" indicates the content (mmol/g) of the epoxy group in the used epoxy compound (the compound represented by General Formula (1), or the other epoxy compounds).

A column of "Content (%) of compound represented by General Formula (1) with respect to organic solid content" indicates the content (% by mass) of the compound represented by General Formula (1) in the composition with respect to the total organic solid content.

TABLE 1

| Table 1 | Phenolic compound | | | Compound represented by General Formula (1) | | | Other epoxy compounds | | | Dispersant Content (%) |
|---|---|---|---|---|---|---|---|---|---|---|
| | Kind | Hydroxyl group content (mmol/g) | Content (%) | Kind | Epoxy group content (mmol/g) | Content (%) | Kind | Epoxy group content (mmol/g) | Content (%) | |
| Example 1 | A-1 | 14.2 | 9.5 | B-1 | 9.9 | 13.5 | | | | 0.15 |
| Example 2 | A-1 | 14.2 | 9.7 | B-2 | 10.4 | 13.3 | | | | 0.15 |
| Example 3 | A-1 | 14.2 | 10.0 | B-3 | 10.9 | 13.0 | | | | 0.15 |
| Example 4 | A-1 | 14.2 | 9.6 | B-4 | 10.2 | 13.4 | | | | 0.15 |
| Example 5 | A-1 | 14.2 | 9.6 | B-5 | 10.2 | 13.4 | | | | 0.15 |
| Example 6 | A-1 | 14.2 | 10.1 | B-6 | 11.1 | 12.9 | | | | 0.15 |
| Example 7 | A-1 | 14.2 | 8.6 | B-7 | 8.4 | 14.4 | | | | 0.15 |
| Example 8 | A-1 | 14.2 | 8.9 | B-8 | 9.0 | 14.1 | | | | 0.15 |
| Example 9 | A-1 | 14.2 | 9.6 | B-9 | 10.2 | 13.4 | | | | 0.15 |
| Example 10 | A-1 | 14.2 | 10.3 | B-10 | 11.6 | 12.7 | | | | 0.15 |
| Example 11 | A-1 | 14.2 | 11.0 | B-11 | 13.0 | 12.0 | | | | 0.15 |
| Example 12 | A-2 | 8.4 | 12.5 | B-1 | 9.9 | 10.5 | | | | 0.15 |
| Example 13 | A-2 | 8.4 | 12.7 | B-2 | 10.4 | 10.3 | | | | 0.15 |
| Example 14 | A-2 | 8.4 | 13.0 | B-3 | 10.9 | 10.0 | | | | 0.15 |
| Example 15 | A-2 | 8.4 | 12.6 | B-4 | 10.2 | 10.4 | | | | 0.15 |
| Example 16 | A-2 | 8.4 | 12.6 | B-5 | 10.2 | 10.4 | | | | 0.15 |
| Example 17 | A-2 | 8.4 | 13.1 | B-6 | 11.1 | 9.9 | | | | 0.15 |
| Example 18 | A-2 | 8.4 | 11.5 | B-7 | 8.4 | 11.5 | | | | 0.15 |
| Example 19 | A-2 | 8.4 | 11.9 | B-8 | 9.0 | 11.1 | | | | 0.15 |
| Example 20 | A-2 | 8.4 | 12.6 | B-9 | 10.2 | 10.4 | | | | 0.15 |
| Example 21 | A-2 | 8.4 | 13.3 | B-10 | 11.6 | 9.7 | | | | 0.15 |
| Example 22 | A-2 | 8.4 | 14.0 | B-11 | 13.0 | 9.0 | | | | 0.15 |
| Example 23 | A-3 | 7.5 | 13.1 | B-1 | 9.9 | 9.9 | | | | 0.15 |
| Example 24 | A-3 | 7.5 | 13.4 | B-2 | 10.4 | 9.6 | | | | 0.15 |
| Example 25 | A-3 | 7.5 | 13.7 | B-3 | 10.9 | 9.3 | | | | 0.15 |
| Example 26 | A-3 | 7.5 | 13.3 | B-4 | 10.2 | 9.7 | | | | 0.15 |
| Example 27 | A-3 | 7.5 | 13.3 | B-5 | 10.2 | 9.7 | | | | 0.15 |
| Example 28 | A-3 | 7.5 | 13.8 | B-6 | 11.1 | 9.2 | | | | 0.15 |
| Example 29 | A-3 | 7.5 | 12.2 | B-7 | 8.4 | 10.8 | | | | 0.15 |
| Example 30 | A-3 | 7.5 | 12.6 | B-8 | 9.0 | 10.4 | | | | 0.15 |

| Table 1 | Organic solid content | | | | Content (%) of compound represented by General Formula (1) with respect to organic solid content | Inorganic substance | | Evaluation | | |
|---|---|---|---|---|---|---|---|---|---|---|
| | Curing accelerator | | Surface modifier | | | Kind (Mass ratio in inorganic substance) | Content (%) | Thermal conductivity | Insulating properties | Adhesiveness |
| | Kind | Content (%) | Kind | Content (%) | | | | | | |
| Example 1 | E-1 | 0.23 | | | 57.9 | Only HP-40 MF100 | 76.62 | A+ | A | A |
| Example 2 | E-1 | 0.23 | | | 56.7 | Only HP-40 MF100 | 76.62 | A+ | A | A |

TABLE 1-continued

| | | | | | | | | | | |
|---|---|---|---|---|---|---|---|---|---|---|
| Example 3 | E-1 | 0.23 | | 55.6 | Only HP-40 MF100 | 76.62 | A+ | A | A |
| Example 4 | E-1 | 0.23 | | 57.2 | Only HP-40 MF100 | 76.62 | A+ | A | A |
| Example 5 | E-1 | 0.23 | | 57.2 | Only HP-40 MF100 | 76.62 | A+ | A | A |
| Example 6 | E-1 | 0.23 | | 55.2 | Only HP-40 MF100 | 76.62 | A+ | A | A |
| Example 7 | E-1 | 0.23 | | 61.7 | Only HP-40 MF100 | 76.62 | A+ | A | A |
| Example 8 | E-1 | 0.23 | | 60.3 | Only HP-40 MF100 | 76.62 | A+ | A | A |
| Example 9 | E-1 | 0.23 | | 57.2 | Only HP-40 MF100 | 76.62 | A+ | A | A |
| Example 10 | E-1 | 0.23 | | 54.1 | Only HP-40 MF100 | 76.62 | A+ | A | A |
| Example 11 | E-1 | 0.23 | | 51.3 | Only HP-40 MF100 | 76.62 | A | A | B |
| Example 12 | E-1 | 0.23 | | 45.1 | Only HP-40 MF100 | 76.62 | A+ | A | A |
| Example 13 | E-1 | 0.23 | | 43.9 | Only HP-40 MF100 | 76.62 | A+ | A | A |
| Example 14 | E-1 | 0.23 | | 42.8 | Only HP-40 MF100 | 76.62 | A+ | A | A |
| Example 15 | E-1 | 0.23 | | 44.4 | Only HP-40 MF100 | 76.62 | A+ | A | A |
| Example 16 | E-1 | 0.23 | | 44.4 | Only HP-40 MF100 | 76.62 | A+ | A | A |
| Example 17 | E-1 | 0.23 | | 42.3 | Only HP-40 MF100 | 76.62 | A+ | A | A |
| Example 18 | E-1 | 0.23 | | 49.0 | Only HP-40 MF100 | 76.62 | A+ | A | A |
| Example 19 | E-1 | 0.23 | | 47.6 | Only HP-40 MF100 | 76.62 | A+ | A | A |
| Example 20 | E-1 | 0.23 | | 44.4 | Only HP-40 MF100 | 76.62 | A+ | A | A |
| Example 21 | E-1 | 0.23 | | 41.3 | Only HP-40 MF100 | 76.62 | A+ | A | A |
| Example 22 | E-1 | 0.23 | | 38.6 | Only HP-40 MF100 | 76.62 | A | B | B |
| Example 23 | E-1 | 0.23 | | 42.2 | Only HP-40 MF100 | 76.62 | A+ | A | A |
| Example 24 | E-1 | 0.23 | | 41.0 | Only HP-40 MF100 | 76.62 | A+ | A | A |
| Example 25 | E-1 | 0.23 | | 39.9 | Only HP-40 MF100 | 76.62 | A+ | A | B |
| Example 26 | E-1 | 0.23 | | 41.5 | Only HP-40 MF100 | 76.62 | A+ | A | A |
| Example 27 | E-1 | 0.23 | | 41.5 | Only HP-40 MF100 | 76.62 | A+ | A | A |
| Example 28 | E-1 | 0.23 | | 39.5 | Only HP-40 MF100 | 76.62 | A+ | A | B |
| Example 29 | E-1 | 0.23 | | 46.1 | Only HP-40 MF100 | 76.62 | A+ | A | A |
| Example 30 | E-1 | 0.23 | | 44.6 | Only HP-40 MF100 | 76.62 | A+ | A | A |

TABLE 2

| | Formulation of solid content in composition | | | | | | | | |
|---|---|---|---|---|---|---|---|---|---|
| | Organic solid content | | | | | | | | |
| | Phenolic compound | | Compound represented by General Formula (1) | | | Other epoxy compounds | | | |
| Table 1 (continued) | Kind | Hydroxyl group content (mmol/g) | Content (%) | Kind | Epoxy group content (mmol/g) | Content (%) | Kind | Epoxy group content (mmol/g) | Content (%) | Dispersant Content (%) |
| Example 31 | A-3 | 7.5 | 13.3 | B-9 | 10.2 | 9.7 | | | | 0.15 |
| Example 32 | A-3 | 7.5 | 14.0 | B-10 | 11.6 | 9.0 | | | | 0.15 |
| Example 33 | A-3 | 7.5 | 14.6 | B-11 | 13.0 | 8.4 | | | | 0.15 |
| Example 34 | A-4 | 10.7 | 11.1 | B-1 | 9.9 | 11.9 | | | | 0.15 |
| Example 35 | A-4 | 10.7 | 11.3 | B-2 | 10.4 | 11.7 | | | | 0.15 |
| Example 36 | A-4 | 10.7 | 11.6 | B-3 | 10.9 | 11.4 | | | | 0.15 |
| Example 37 | A-4 | 10.7 | 11.2 | B-4 | 10.2 | 11.8 | | | | 0.15 |
| Example 38 | A-4 | 10.7 | 11.2 | B-5 | 10.2 | 11.8 | | | | 0.15 |
| Example 39 | A-4 | 10.7 | 11.7 | B-6 | 11.1 | 11.3 | | | | 0.15 |
| Example 40 | A-4 | 10.7 | 10.1 | B-7 | 8.4 | 12.9 | | | | 0.15 |
| Example 41 | A-4 | 10.7 | 10.5 | B-8 | 9.0 | 12.5 | | | | 0.15 |
| Example 42 | A-4 | 10.7 | 11.2 | B-9 | 10.2 | 11.8 | | | | 0.15 |
| Example 43 | A-4 | 10.7 | 12.0 | B-10 | 11.6 | 11.0 | | | | 0.15 |
| Example 44 | A-4 | 10.7 | 12.6 | B-11 | 13.0 | 10.4 | | | | 0.15 |
| Example 45 | A-5 | 18.2 | 8.1 | B-1 | 9.9 | 14.9 | | | | 0.15 |
| Example 46 | A-5 | 18.2 | 8.4 | B-2 | 10.4 | 14.6 | | | | 0.15 |
| Example 47 | A-5 | 18.2 | 8.6 | B-3 | 10.9 | 14.4 | | | | 0.15 |
| Example 48 | A-5 | 18.2 | 8.3 | B-4 | 10.2 | 14.7 | | | | 0.15 |
| Example 49 | A-5 | 18.2 | 8.3 | B-5 | 10.2 | 14.7 | | | | 0.15 |
| Example 50 | A-5 | 18.2 | 8.7 | B-6 | 11.1 | 14.3 | | | | 0.15 |
| Example 51 | A-5 | 18.2 | 7.3 | B-7 | 8.4 | 15.7 | | | | 0.15 |
| Example 52 | A-5 | 18.2 | 7.6 | B-8 | 9.0 | 15.4 | | | | 0.15 |
| Example 53 | A-5 | 18.2 | 8.3 | B-9 | 10.2 | 14.7 | | | | 0.15 |
| Example 54 | A-5 | 18.2 | 9.0 | B-10 | 11.6 | 14.0 | | | | 0.15 |
| Example 55 | A-5 | 18.2 | 9.6 | B-11 | 13.0 | 13.4 | | | | 0.15 |
| Example 56 | A-6 | 18.2 | 8.1 | B-1 | 9.9 | 14.9 | | | | 0.15 |
| Example 57 | A-6 | 18.2 | 8.4 | B-2 | 10.4 | 14.6 | | | | 0.15 |
| Example 58 | A-6 | 18.2 | 8.6 | B-3 | 10.9 | 14.4 | | | | 0.15 |
| Example 59 | A-6 | 18.2 | 8.3 | B-4 | 10.2 | 14.7 | | | | 0.15 |
| Example 60 | A-6 | 18.2 | 8.3 | B-5 | 10.2 | 14.7 | | | | 0.15 |

TABLE 2-continued

| Table 1 (continued) | Organic solid content | | | | Content (%) of compound represented by General Formula (1) with respect to organic solid content | Inorganic substance | | Evaluation | | |
|---|---|---|---|---|---|---|---|---|---|---|
| | Curing accelerator | | Surface modifier | | | | | | | |
| | Kind | Content (%) | Kind | Content (%) | | Kind (Mass ratio in inorganic substance) | Content (%) | Thermal conductivity | Insulating properties | Adhesiveness |
| Example 31 | E-1 | 0.23 | | | 41.5 | Only HP-40 MF100 | 76.62 | A+ | A | A |
| Example 32 | E-1 | 0.23 | | | 38.5 | Only HP-40 MF100 | 76.62 | A+ | A | B |
| Example 33 | E-1 | 0.23 | | | 35.8 | Only HP-40 MF100 | 76.62 | A | B | B |
| Example 34 | E-1 | 0.23 | | | 51.0 | Only HP-40 MF100 | 76.62 | A+ | A | A |
| Example 35 | E-1 | 0.23 | | | 49.8 | Only HP-40 MF100 | 76.62 | A+ | A | A |
| Example 36 | E-1 | 0.23 | | | 48.7 | Only HP-40 MF100 | 76.62 | A+ | A | A |
| Example 37 | E-1 | 0.23 | | | 50.3 | Only HP-40 MF100 | 76.62 | A+ | A | A |
| Example 38 | E-1 | 0.23 | | | 50.3 | Only HP-40 MF100 | 76.62 | A+ | A | A |
| Example 39 | E-1 | 0.23 | | | 48.2 | Only HP-40 MF100 | 76.62 | A+ | A | A |
| Example 40 | E-1 | 0.23 | | | 55.0 | Only HP-40 MF100 | 76.62 | A+ | A | A |
| Example 41 | E-1 | 0.23 | | | 53.5 | Only HP-40 MF100 | 76.62 | A+ | A | A |
| Example 42 | E-1 | 0.23 | | | 50.3 | Only HP-40 MF100 | 76.62 | A+ | A | A |
| Example 43 | E-1 | 0.23 | | | 47.2 | Only HP-40 MF100 | 76.62 | A+ | A | A |
| Example 44 | E-1 | 0.23 | | | 44.4 | Only HP-40 MF100 | 76.62 | A | A | B |
| Example 45 | E-1 | 0.23 | | | 63.6 | Only HP-40 MF100 | 76.62 | A+ | A | A |
| Example 46 | E-1 | 0.23 | | | 62.6 | Only HP-40 MF100 | 76.62 | A+ | A | A |
| Example 47 | E-1 | 0.23 | | | 61.5 | Only HP-40 MF100 | 76.62 | A+ | A | A |
| Example 48 | E-1 | 0.23 | | | 63.0 | Only HP-40 MF100 | 76.62 | A+ | A | A |
| Example 49 | E-1 | 0.23 | | | 63.0 | Only HP-40 MF100 | 76.62 | A+ | A | A |
| Example 50 | E-1 | 0.23 | | | 61.1 | Only HP-40 MF100 | 76.62 | A+ | A | A |
| Example 51 | E-1 | 0.23 | | | 67.2 | Only HP-40 MF100 | 76.62 | A+ | A | A |
| Example 52 | E-1 | 0.23 | | | 65.9 | Only HP-40 MF100 | 76.62 | A+ | A | A |
| Example 53 | E-1 | 0.23 | | | 63.0 | Only HP-40 MF100 | 76.62 | A+ | A | A |
| Example 54 | E-1 | 0.23 | | | 60.0 | Only HP-40 MF100 | 76.62 | A+ | A | A |
| Example 55 | E-1 | 0.23 | | | 57.3 | Only HP-40 MF100 | 76.62 | A | A | B |
| Example 56 | E-1 | 0.23 | | | 63.6 | Only HP-40 MF100 | 76.62 | A+ | A | A |
| Example 57 | E-1 | 0.23 | | | 62.6 | Only HP-40 MF100 | 76.62 | A+ | A | A |
| Example 58 | E-1 | 0.23 | | | 61.5 | Only HP-40 MF100 | 76.62 | A+ | A | A |
| Example 59 | E-1 | 0.23 | | | 63.0 | Only HP-40 MF100 | 76.62 | A+ | A | A |
| Example 60 | E-1 | 0.23 | | | 63.0 | Only HP-40 MF100 | 76.62 | A+ | A | A |

TABLE 3

| Table 1 (continued) | Formulation of solid content in composition | | | | | | | | | |
|---|---|---|---|---|---|---|---|---|---|---|
| | Organic solid content | | | | | | | | | |
| | Phenolic compound | | | Compound represented by General Formula (1) | | | Other epoxy compounds | | | Dispersant Content (%) |
| | Kind | Hydroxyl group content (mmol/g) | Content (%) | Kind | Epoxy group content (mmol/g) | Content (%) | Kind | Epoxy group content (mmol/g) | Content (%) | |
| Example 61 | A-6 | 18.2 | 8.7 | B-6 | 11.1 | 14.3 | | | | 0.15 |
| Example 62 | A-6 | 18.2 | 7.3 | B-7 | 8.4 | 15.7 | | | | 0.15 |
| Example 63 | A-6 | 18.2 | 7.6 | B-8 | 9.0 | 15.4 | | | | 0.15 |
| Example 64 | A-6 | 18.2 | 8.3 | B-9 | 10.2 | 14.7 | | | | 0.15 |
| Example 65 | A-6 | 18.2 | 9.0 | B-10 | 11.6 | 14.0 | | | | 0.15 |
| Example 66 | A-6 | 18.2 | 9.6 | B-11 | 13.0 | 13.4 | | | | 0.15 |
| Example 67 | A-7 | 10.2 | 11.3 | B-1 | 9.9 | 11.7 | | | | 0.15 |
| Example 68 | A-7 | 10.2 | 11.6 | B-2 | 10.4 | 11.4 | | | | 0.15 |
| Example 69 | A-7 | 10.2 | 11.9 | B-3 | 10.9 | 11.1 | | | | 0.15 |
| Example 70 | A-7 | 10.2 | 11.5 | B-4 | 10.2 | 11.5 | | | | 0.15 |
| Example 71 | A-7 | 10.2 | 11.5 | B-5 | 10.2 | 11.5 | | | | 0.15 |
| Example 72 | A-7 | 10.2 | 12.0 | B-6 | 11.1 | 11.0 | | | | 0.15 |
| Example 73 | A-7 | 10.2 | 10.4 | B-7 | 8.4 | 12.6 | | | | 0.15 |
| Example 74 | A-7 | 10.2 | 10.8 | B-8 | 9.0 | 12.2 | | | | 0.15 |
| Example 75 | A-7 | 10.2 | 11.5 | B-9 | 10.2 | 11.5 | | | | 0.15 |
| Example 76 | A-7 | 10.2 | 12.2 | B-10 | 11.6 | 10.8 | | | | 0.15 |
| Example 77 | A-7 | 10.2 | 12.9 | B-11 | 13.0 | 10.1 | | | | 0.15 |

TABLE 3-continued

| | | | | | | | | | | |
|---|---|---|---|---|---|---|---|---|---|---|
| Example 78 | A-8 | 10.3 | 11.3 | B-1 | 9.9 | 11.7 | | | | 0.15 |
| Example 79 | A-8 | 10.3 | 11.6 | B-2 | 10.4 | 11.4 | | | | 0.15 |
| Example 80 | A-8 | 10.3 | 11.8 | B-3 | 10.9 | 11.2 | | | | 0.15 |
| Example 81 | A-8 | 10.3 | 11.4 | B-4 | 10.2 | 11.6 | | | | 0.15 |
| Example 82 | A-8 | 10.3 | 11.4 | B-5 | 10.2 | 11.6 | | | | 0.15 |
| Example 83 | A-8 | 10.3 | 11.9 | B-6 | 11.1 | 11.1 | | | | 0.15 |
| Example 84 | A-8 | 10.3 | 10.4 | B-7 | 8.4 | 12.6 | | | | 0.15 |
| Example 85 | A-8 | 10.3 | 10.7 | B-8 | 9.0 | 12.3 | | | | 0.15 |
| Example 86 | A-8 | 10.3 | 11.4 | B-9 | 10.2 | 11.6 | | | | 0.15 |
| Example 87 | A-8 | 10.3 | 12.2 | B-10 | 11.6 | 10.8 | | | | 0.15 |
| Example 88 | A-8 | 10.3 | 12.8 | B-11 | 13.0 | 10.2 | | | | 0.15 |
| Example 89 | A-1 | 14.2 | 8.1 | B-1 | 9.9 | 7.4 | C-1 | 5.6 | 7.4 | 0.15 |
| Example 90 | A-1 | 14.2 | 8.3 | B-2 | 10.4 | 7.3 | C-1 | 5.6 | 7.3 | 0.15 |

| | Formulation of solid content in composition | | | | | | | | |
|---|---|---|---|---|---|---|---|---|---|
| | Organic solid content | | | | Content (%) of compound represented by General Formula (1) with respect to organic solid content | Inorganic substance | | Evaluation | | |
| | Curing accelerator | | Surface modifier | | | | | | | |
| Table 1 (continued) | Kind | Content (%) | Kind | Content (%) | | Kind (Mass ratio in inorganic substance) | Content (%) | Thermal conductivity | Insulating properties | Adhesiveness |
| Example 61 | E-1 | 0.23 | | | 61.1 | Only HP-40 MF100 | 76.62 | A+ | A | A |
| Example 62 | E-1 | 0.23 | | | 67.2 | Only HP-40 MF100 | 76.62 | A+ | A | A |
| Example 63 | E-1 | 0.23 | | | 65.9 | Only HP-40 MF100 | 76.62 | A+ | A | A |
| Example 64 | E-1 | 0.23 | | | 63.0 | Only HP-40 MF100 | 76.62 | A+ | A | A |
| Example 65 | E-1 | 0.23 | | | 60.0 | Only HP-40 MF100 | 76.62 | A+ | A | A |
| Example 66 | E-1 | 0.23 | | | 57.3 | Only HP-40 MF100 | 76.62 | A | A | B |
| Example 67 | E-1 | 0.23 | | | 49.8 | Only HP-40 MF100 | 76.62 | A+ | A | A |
| Example 68 | E-1 | 0.23 | | | 48.7 | Only HP-40 MF100 | 76.62 | A+ | A | A |
| Example 69 | E-1 | 0.23 | | | 47.5 | Only HP-40 MF100 | 76.62 | A+ | A | A |
| Example 70 | E-1 | 0.23 | | | 49.1 | Only HP-40 MF100 | 76.62 | A+ | A | A |
| Example 71 | E-1 | 0.23 | | | 49.1 | Only HP-40 MF100 | 76.62 | A+ | A | A |
| Example 72 | E-1 | 0.23 | | | 47.1 | Only HP-40 MF100 | 76.62 | A+ | A | A |
| Example 73 | E-1 | 0.23 | | | 53.8 | Only HP-40 MF100 | 76.62 | A+ | A | A |
| Example 74 | E-1 | 0.23 | | | 52.3 | Only HP-40 MF100 | 76.62 | A+ | A | A |
| Example 75 | E-1 | 0.23 | | | 49.1 | Only HP-40 MF100 | 76.62 | A+ | A | A |
| Example 76 | E-1 | 0.23 | | | 46.0 | Only HP-40 MF100 | 76.62 | A+ | A | A |
| Example 77 | E-1 | 0.23 | | | 43.2 | Only HP-40 MF100 | 76.62 | A | A | B |
| Example 78 | E-1 | 0.23 | | | 50.1 | Only HP-40 MF100 | 76.62 | A+ | A | A |
| Example 79 | E-1 | 0.23 | | | 48.9 | Only HP-40 MF100 | 76.62 | A+ | A | A |
| Example 80 | E-1 | 0.23 | | | 47.7 | Only HP-40 MF100 | 76.62 | A+ | A | A |
| Example 81 | E-1 | 0.23 | | | 49.4 | Only HP-40 MF100 | 76.62 | A+ | A | A |
| Example 82 | E-1 | 0.23 | | | 49.4 | Only HP-40 MF100 | 76.62 | A+ | A | A |
| Example 83 | E-1 | 0.23 | | | 47.3 | Only HP-40 MF100 | 76.62 | A+ | A | A |
| Example 84 | E-1 | 0.23 | | | 54.0 | Only HP-40 MF100 | 76.62 | A+ | A | A |
| Example 85 | E-1 | 0.23 | | | 52.6 | Only HP-40 MF100 | 76.62 | A+ | A | A |
| Example 86 | E-1 | 0.23 | | | 49.4 | Only HP-40 MF100 | 76.62 | A+ | A | A |
| Example 87 | E-1 | 0.23 | | | 46.2 | Only HP-40 MF100 | 76.62 | A+ | A | A |
| Example 88 | E-1 | 0.23 | | | 43.4 | Only HP-40 MF100 | 76.62 | A | A | B |
| Example 89 | E-1 | 0.16 | | | 31.8 | Only HP-40 MF 100 | 76.69 | A+ | A | B |
| Example 90 | E-1 | 0.16 | | | 31.5 | Only HP-40 MF 100 | 76.69 | A+ | A | B |

TABLE 4

| | Formulation of solid content in composition | | | | | | | | |
|---|---|---|---|---|---|---|---|---|---|
| | Organic solid content | | | | | | | | |
| | Phenolic compound | | | Compound represented by General Formula (1) | | | Other epoxy compounds | | |
| Table 1 (continued) | Kind | Hydroxyl group content (mmol/g) | Content (%) | Kind | Epoxy group content (mmol/g) | Content (%) | Kind | Epoxy group content (mmol/g) | Content (%) | Dispersant Content (%) |
| Example 91 | A-1 | 14.2 | 8.5 | B-3 | 10.9 | 7.3 | C-1 | 5.6 | 7.3 | 0.15 |
| Example 92 | A-1 | 14.2 | 8.2 | B-4 | 10.2 | 7.4 | C-1 | 5.6 | 7.4 | 0.15 |
| Example 93 | A-1 | 14.2 | 8.2 | B-5 | 10.2 | 7.4 | C-1 | 5.6 | 7.4 | 0.15 |
| Example 94 | A-1 | 14.2 | 8.5 | B-6 | 11.1 | 7.2 | C-1 | 5.6 | 7.2 | 0.15 |
| Example 95 | A-1 | 14.2 | 7.6 | B-7 | 8.4 | 7.7 | C-1 | 5.6 | 7.7 | 0.15 |
| Example 96 | A-1 | 14.2 | 7.8 | B-8 | 9.0 | 7.6 | C-1 | 5.6 | 7.6 | 0.15 |
| Example 97 | A-1 | 14.2 | 8.2 | B-9 | 10.2 | 7.4 | C-1 | 5.6 | 7.4 | 0.15 |

TABLE 4-continued

| | | | | | | | | | | |
|---|---|---|---|---|---|---|---|---|---|---|
| Example 98 | A-1 | 14.2 | 8.7 | B-10 | 11.6 | 7.2 | C-1 | 5.6 | 7.2 | 0.15 |
| Example 99 | A-1 | 14.2 | 9.5 | B-11 | 13.0 | 8.1 | C-1 | 5.6 | 5.4 | 0.15 |
| Example 100 | A-2 | 8.4 | 11.7 | B-1 | 9.9 | 7.9 | C-1 | 5.6 | 3.4 | 0.15 |
| Example 101 | A-2 | 8.4 | 11.9 | B-2 | 10.4 | 7.8 | C-1 | 5.6 | 3.3 | 0.15 |
| Example 102 | A-2 | 8.4 | 12.1 | B-3 | 10.9 | 7.6 | C-1 | 5.6 | 3.3 | 0.15 |
| Example 103 | A-2 | 8.4 | 11.8 | B-4 | 10.2 | 7.8 | C-1 | 5.6 | 3.4 | 0.15 |
| Example 104 | A-2 | 8.4 | 11.8 | B-5 | 10.2 | 7.8 | C-1 | 5.6 | 3.4 | 0.15 |
| Example 105 | A-2 | 8.4 | 12.2 | B-6 | 11.1 | 7.6 | C-1 | 5.6 | 3.2 | 0.15 |
| Example 106 | A-2 | 8.4 | 10.9 | B-7 | 8.4 | 8.5 | C-1 | 5.6 | 3.6 | 0.15 |
| Example 107 | A-2 | 8.4 | 11.2 | B-8 | 9.0 | 8.3 | C-1 | 5.6 | 3.5 | 0.15 |
| Example 108 | A-2 | 8.4 | 11.8 | B-9 | 10.2 | 7.8 | C-1 | 5.6 | 3.4 | 0.15 |
| Example 109 | A-2 | 8.4 | 12.4 | B-10 | 11.6 | 7.4 | C-1 | 5.6 | 3.2 | 0.15 |
| Example 110 | A-2 | 8.4 | 12.9 | B-11 | 13.0 | 7.0 | C-1 | 5.6 | 3.0 | 0.15 |
| Example 111 | A-2 | 8.4 | 11.6 | B-1 | 9.9 | 8.0 | C-2 | 5.3 | 3.4 | 0.15 |
| Example 112 | A-2 | 8.4 | 11.8 | B-2 | 10.4 | 7.8 | C-2 | 5.3 | 3.4 | 0.15 |
| Example 113 | A-2 | 8.4 | 12.0 | B-3 | 10.9 | 7.7 | C-2 | 5.3 | 3.3 | 0.15 |
| Example 114 | A-2 | 8.4 | 11.7 | B-4 | 10.2 | 7.9 | C-2 | 5.3 | 3.4 | 0.15 |
| Example 115 | A-2 | 8.4 | 11.7 | B-5 | 10.2 | 7.9 | C-2 | 5.3 | 3.4 | 0.15 |
| Example 116 | A-2 | 8.4 | 12.1 | B-6 | 11.1 | 7.6 | C-2 | 5.3 | 3.3 | 0.15 |
| Example 117 | A-2 | 8.4 | 10.8 | B-7 | 8.4 | 8.5 | C-2 | 5.3 | 3.7 | 0.15 |
| Example 118 | A-2 | 8.4 | 11.1 | B-8 | 9.0 | 8.3 | C-2 | 5.3 | 3.6 | 0.15 |
| Example 119 | A-2 | 8.4 | 11.7 | B-9 | 10.2 | 7.9 | C-2 | 5.3 | 3.4 | 0.15 |
| Example 120 | A-2 | 8.4 | 12.3 | B-10 | 11.6 | 7.5 | C-2 | 5.3 | 3.2 | 0.15 |

| | Formulation of solid content in composition | | | | | | | |
|---|---|---|---|---|---|---|---|---|
| | Organic solid content | | | Content (%) of compound represented by General Formula (1) with respect to organic solid content | Inorganic substance | | Evaluation | | |
| | Curing accelerator | | Surface modifier | | | | | | |
| Table 1 (continued) | Kind | Content (%) | Kind | Content (%) | | Kind (Mass ratio in inorganic substance) | Content (%) | Thermal conductivity | Insulating properties | Adhesiveness |
| Example 91 | E-1 | 0.16 | | | 31.1 | Only HP-40 MF100 | 76.69 | A+ | A | B |
| Example 92 | E-1 | 0.16 | | | 31.6 | Only HP-40 MF100 | 76.69 | A+ | A | B |
| Example 93 | E-1 | 0.16 | | | 31.6 | Only HP-40 MF100 | 76.69 | A+ | A | B |
| Example 94 | E-1 | 0.16 | | | 31.0 | Only HP-40 MF100 | 76.69 | A+ | A | B |
| Example 95 | E-1 | 0.15 | | | 33.0 | Only HP-40 MF100 | 76.70 | A+ | A | B |
| Example 96 | E-1 | 0.15 | | | 32.5 | Only HP-40 MF100 | 76.70 | A+ | A | B |
| Example 97 | E-1 | 0.16 | | | 31.6 | Only HP-40 MF100 | 76.69 | A+ | A | B |
| Example 98 | E-1 | 0.16 | | | 30.7 | Only HP-40 MF100 | 76.69 | A+ | A | B |
| Example 99 | E-1 | 0.18 | | | 34.6 | Only HP-40 MF100 | 76.67 | A | B | B |
| Example 100 | E-1 | 0.20 | | | 34.0 | Only HP-40 MF100 | 76.65 | A+ | A | B |
| Example 101 | E-1 | 0.20 | | | 33.3 | Only HP-40 MF100 | 76.65 | A+ | A | B |
| Example 102 | E-1 | 0.20 | | | 32.6 | Only HP-40 MF100 | 76.65 | A+ | A | B |
| Example 103 | E-1 | 0.20 | | | 33.6 | Only HP-40 MF100 | 76.65 | A+ | A | B |
| Example 104 | E-1 | 0.20 | | | 33.6 | Only HP-40 MF100 | 76.65 | A+ | A | B |
| Example 105 | E-1 | 0.20 | | | 32.4 | Only HP-40 MF100 | 76.65 | A+ | A | B |
| Example 106 | E-1 | 0.19 | | | 36.2 | Only HP-40 MF100 | 76.66 | A+ | A | B |
| Example 107 | E-1 | 0.19 | | | 35.4 | Only HP-40 MF100 | 76.66 | A+ | A | B |
| Example 108 | E-1 | 0.20 | | | 33.6 | Only HP-40 MF100 | 76.65 | A+ | A | B |
| Example 109 | E-1 | 0.20 | | | 31.8 | Only HP-40 MF100 | 76.65 | A+ | A | B |
| Example 110 | E-1 | 0.20 | | | 30.1 | Only HP-40 MF100 | 76.65 | A | B | B |
| Example 111 | E-1 | 0.20 | | | 34.2 | Only HP-40 MF100 | 76.65 | A | A | B |
| Example 112 | E-1 | 0.20 | | | 33.5 | Only HP-40 MF100 | 76.65 | A | A | B |
| Example 113 | E-1 | 0.20 | | | 32.8 | Only HP-40 MF100 | 76.65 | A | A | B |
| Example 114 | E-1 | 0.20 | | | 33.8 | Only HP-40 MF100 | 76.65 | A | A | B |
| Example 115 | E-1 | 0.20 | | | 33.8 | Only HP-40 MF100 | 76.65 | A | A | B |
| Example 116 | E-1 | 0.20 | | | 32.6 | Only HP-40 MF100 | 76.65 | A | A | B |
| Example 117 | E-1 | 0.19 | | | 36.4 | Only HP-40 MF100 | 76.66 | A | A | B |
| Example 118 | E-1 | 0.19 | | | 35.6 | Only HP-40 MF100 | 76.66 | A | A | B |
| Example 119 | E-1 | 0.20 | | | 33.8 | Only HP-40 MF100 | 76.65 | A | A | B |
| Example 120 | E-1 | 0.20 | | | 32.0 | Only HP-40 MF100 | 76.65 | A | A | B |

TABLE 5

| Table 1 (continued) | Organic solid content | | | | | | | | | Dispersant Content (%) |
|---|---|---|---|---|---|---|---|---|---|---|
| | Phenolic compound | | | Compound represented by General Formula (1) | | | Other epoxy compounds | | | |
| | Kind | Hydroxyl group content (mmol/g) | Content (%) | Kind | Epoxy group content (mmol/g) | Content (%) | Kind | Epoxy group content (mmol/g) | Content (%) | |
| Example 121 | A-2 | 8.4 | 12.9 | B-11 | 13.0 | 7.1 | C-2 | 5.3 | 3.0 | 0.15 |
| Example 122 | A-7 | 10.2 | 10.3 | B-1 | 9.9 | 7.6 | C-1 | 5.6 | 5.1 | 0.15 |
| Example 123 | A-7 | 10.2 | 10.5 | B-2 | 10.4 | 7.5 | C-1 | 5.6 | 5.0 | 0.15 |
| Example 124 | A-7 | 10.2 | 10.7 | B-3 | 10.9 | 7.4 | C-1 | 5.6 | 4.9 | 0.15 |
| Example 125 | A-7 | 10.2 | 10.4 | B-4 | 10.2 | 7.6 | C-1 | 5.6 | 5.1 | 0.15 |
| Example 126 | A-7 | 10.2 | 10.4 | B-5 | 10.2 | 7.6 | C-1 | 5.6 | 5.1 | 0.15 |
| Example 127 | A-7 | 10.2 | 10.7 | B-6 | 11.1 | 7.4 | C-1 | 5.6 | 4.9 | 0.15 |
| Example 128 | A-7 | 10.2 | 9.6 | B-7 | 8.4 | 8.0 | C-1 | 5.6 | 5.4 | 0.15 |
| Example 129 | A-7 | 10.2 | 9.8 | B-8 | 9.0 | 7.9 | C-1 | 5.6 | 5.3 | 0.15 |
| Example 130 | A-7 | 10.2 | 10.4 | B-9 | 10.2 | 7.6 | C-1 | 5.6 | 5.1 | 0.15 |
| Example 131 | A-7 | 10.2 | 10.9 | B-10 | 11.6 | 7.2 | C-1 | 5.6 | 4.8 | 0.15 |
| Example 132 | A-7 | 10.2 | 11.8 | B-11 | 13.0 | 7.8 | C-1 | 5.6 | 3.4 | 0.15 |
| Example 133 | A-2 | 8.4 | 12.5 | B-1 | 9.9 | 10.5 | | | | 0.15 |
| Example 134 | A-2 | 8.4 | 12.7 | B-2 | 10.4 | 10.3 | | | | 0.15 |
| Example 135 | A-2 | 8.4 | 13.0 | B-3 | 10.9 | 10.0 | | | | 0.15 |
| Example 136 | A-2 | 8.4 | 12.6 | B-4 | 10.2 | 10.4 | | | | 0.15 |
| Example 137 | A-2 | 8.4 | 12.6 | B-5 | 10.2 | 10.4 | | | | 0.15 |
| Example 138 | A-2 | 8.4 | 13.1 | B-6 | 11.1 | 9.9 | | | | 0.15 |
| Example 139 | A-2 | 8.4 | 11.5 | B-7 | 8.4 | 11.5 | | | | 0.15 |
| Example 140 | A-2 | 8.4 | 11.9 | B-8 | 9.0 | 11.1 | | | | 0.15 |
| Example 141 | A-2 | 8.4 | 12.6 | B-9 | 10.2 | 10.4 | | | | 0.15 |
| Example 142 | A-2 | 8.4 | 13.3 | B-10 | 11.6 | 9.7 | | | | 0.15 |
| Example 143 | A-2 | 8.4 | 14.0 | B-11 | 13.0 | 9.0 | | | | 0.15 |
| Example 144 | A-2 | 8.4 | 12.5 | B-1 | 9.9 | 10.5 | | | | 0.15 |
| Example 145 | A-2 | 8.4 | 12.7 | B-2 | 10.4 | 10.3 | | | | 0.15 |
| Example 146 | A-2 | 8.4 | 13.0 | B-3 | 10.9 | 10.0 | | | | 0.15 |
| Example 147 | A-2 | 8.4 | 12.6 | B-4 | 10.2 | 10.4 | | | | 0.15 |
| Example 148 | A-2 | 8.4 | 12.6 | B-5 | 10.2 | 10.4 | | | | 0.15 |
| Example 149 | A-2 | 8.4 | 13.1 | B-6 | 11.1 | 9.9 | | | | 0.15 |
| Example 150 | A-2 | 8.4 | 11.5 | B-7 | 8.4 | 11.5 | | | | 0.15 |

| Table 1 (continued) | Organic solid content | | | | Content (%) of compound represented by General Formula (1) with respect to organic solid content | Inorganic substance | | Evaluation | | |
|---|---|---|---|---|---|---|---|---|---|---|
| | Curing accelerator | | Surface modifier | | | | | | | |
| | Kind | Content (%) | Kind | Content (%) | | Kind (Mass ratio in inorganic substance) | Content (%) | Thermal conductivity | Insulating properties | Adhesiveness |
| Example 121 | E-1 | 0.20 | | | 30.3 | Only HP-40 MF100 | 76.65 | B | B | B |
| Example 122 | E-1 | 0.18 | | | 32.7 | Only HP-40 MF100 | 76.67 | A+ | A | B |
| Example 123 | E-1 | 0.18 | | | 32.2 | Only HP-40 MF100 | 76.67 | A+ | A | B |
| Example 124 | E-1 | 0.18 | | | 31.7 | Only HP-40 MF100 | 76.67 | A+ | A | B |
| Example 125 | E-1 | 0.18 | | | 32.4 | Only HP-40 MF100 | 76.67 | A+ | A | B |
| Example 126 | E-1 | 0.18 | | | 32.4 | Only HP-40 MF100 | 76.67 | A+ | A | B |
| Example 127 | E-1 | 0.18 | | | 31.5 | Only HP-40 MF100 | 76.67 | A+ | A | B |
| Example 128 | E-1 | 0.18 | | | 34.4 | Only HP-40 MF100 | 76.67 | A+ | A | B |
| Example 129 | E-1 | 0.18 | | | 33.8 | Only HP-40 MF100 | 76.67 | A+ | A | B |
| Example 130 | E-1 | 0.18 | | | 32.4 | Only HP-40 MF100 | 76.67 | A+ | A | B |
| Example 131 | E-1 | 0.18 | | | 31.0 | Only HP-40 MF100 | 76.67 | A+ | A | B |
| Example 132 | E-1 | 0.20 | | | 33.5 | Only HP-40 MF100 | 76.65 | A | B | B |
| Example 133 | E-1 | 0.23 | D-1 | 0.23 | 44.6 | Only HP-40 MF100 | 76.39 | A+ | A | A |
| Example 134 | E-1 | 0.23 | D-1 | 0.23 | 43.5 | Only HP-40 MF100 | 76.39 | A+ | A | A |
| Example 135 | E-1 | 0.23 | D-1 | 0.23 | 42.3 | Only HP-40 MF100 | 76.39 | A+ | A | A |
| Example 136 | E-1 | 0.23 | D-1 | 0.23 | 43.9 | Only HP-40 MF100 | 76.39 | A+ | A | A |
| Example 137 | E-1 | 0.23 | D-1 | 0.23 | 43.9 | Only HP-40 MF100 | 76.39 | A+ | A | A |
| Example 138 | E-1 | 0.23 | D-1 | 0.23 | 41.9 | Only HP-40 MF100 | 76.39 | A+ | A | A |
| Example 139 | E-1 | 0.23 | D-1 | 0.23 | 48.6 | Only HP-40 MF100 | 76.39 | A+ | A | A |
| Example 140 | E-1 | 0.23 | D-1 | 0.23 | 47.1 | Only HP-40 MF100 | 76.39 | A+ | A | A |
| Example 141 | E-1 | 0.23 | D-1 | 0.23 | 43.9 | Only HP-40 MF100 | 76.39 | A+ | A | A |
| Example 142 | E-1 | 0.23 | D-1 | 0.23 | 40.9 | Only HP-40 MF100 | 76.39 | A+ | A | A |
| Example 143 | E-1 | 0.23 | D-1 | 0.23 | 38.2 | Only HP-40 MF100 | 76.39 | A+ | A | B |
| Example 144 | E-1 | 0.23 | D-2 | 0.23 | 44.6 | Only HP-40 MF100 | 76.39 | A+ | A | A |
| Example 145 | E-1 | 0.23 | D-2 | 0.23 | 43.5 | Only HP-40 MF100 | 76.39 | A+ | A | A |
| Example 146 | E-1 | 0.23 | D-2 | 0.23 | 42.3 | Only HP-40 MF100 | 76.39 | A+ | A | A |

TABLE 5-continued

| | | | | | | | | | | |
|---|---|---|---|---|---|---|---|---|---|---|
| Example 147 | E-1 | 0.23 | D-2 | 0.23 | 43.9 | Only HP-40 MF100 | 76.39 | A+ | A | A |
| Example 148 | E-1 | 0.23 | D-2 | 0.23 | 43.9 | Only HP-40 MF100 | 76.39 | A+ | A | A |
| Example 149 | E-1 | 0.23 | D-2 | 0.23 | 41.9 | Only HP-40 MF100 | 76.39 | A+ | A | A |
| Example 150 | E-1 | 0.23 | D-2 | 0.23 | 48.6 | Only HP-40 MF100 | 76.39 | A+ | A | A |

TABLE 6

Formulation of solid content in composition

Organic solid content

| Table 1 (continued) | Phenolic compound | | | Compound represented by General Formula (1) | | | Other epoxy compounds | | | Dispersant Content (%) |
|---|---|---|---|---|---|---|---|---|---|---|
| | Kind | Hydroxyl group content (mmol/g) | Content (%) | Kind | Epoxy group content (mmol/g) | Content (%) | Kind | Epoxy group content (mmol/g) | Content (%) | |
| Example 151 | A-2 | 8.4 | 11.9 | B-8 | 9.0 | 11.1 | | | | 0.15 |
| Example 152 | A-2 | 8.4 | 12.6 | B-9 | 10.2 | 10.4 | | | | 0.15 |
| Example 153 | A-2 | 8.4 | 13.3 | B-10 | 11.6 | 9.7 | | | | 0.15 |
| Example 154 | A-2 | 8.4 | 14.0 | B-11 | 13.0 | 9.0 | | | | 0.15 |
| Example 155 | A-1 | 14.2 | 9.5 | B-1 | 9.9 | 13.5 | | | | 0.15 |
| Example 156 | A-2 | 8.4 | 12.5 | B-1 | 9.9 | 10.5 | | | | 0.15 |
| Example 157 | A-3 | 7.5 | 13.1 | B-1 | 9.9 | 9.9 | | | | 0.15 |
| Example 158 | A-4 | 10.7 | 11.1 | B-1 | 9.9 | 11.9 | | | | 0.15 |
| Example 159 | A-5 | 18.2 | 8.1 | B-1 | 9.9 | 14.9 | | | | 0.15 |
| Example 160 | A-6 | 18.2 | 8.1 | B-1 | 9.9 | 14.9 | | | | 0.15 |
| Example 161 | A-7 | 10.2 | 11.3 | B-1 | 9.9 | 11.7 | | | | 0.15 |
| Example 162 | A-8 | 10.3 | 11.3 | B-1 | 9.9 | 11.7 | | | | 0.15 |
| Example 163 | A-1 | 14.2 | 9.5 | B-1 | 9.9 | 13.5 | | | | 0.15 |
| Example 164 | A-2 | 8.4 | 12.5 | B-1 | 9.9 | 10.5 | | | | 0.15 |
| Example 165 | A-3 | 7.5 | 13.1 | B-1 | 9.9 | 9.9 | | | | 0.15 |
| Example 166 | A-4 | 10.7 | 11.1 | B-1 | 9.9 | 11.9 | | | | 0.15 |
| Example 167 | A-5 | 18.2 | 8.1 | B-1 | 9.9 | 14.9 | | | | 0.15 |
| Example 168 | A-6 | 18.2 | 8.1 | B-1 | 9.9 | 14.9 | | | | 0.15 |
| Example 169 | A-7 | 10.2 | 11.3 | B-1 | 9.9 | 11.7 | | | | 0.15 |
| Example 170 | A-8 | 10.3 | 11.3 | B-1 | 9.9 | 11.7 | | | | 0.15 |

Formulation of solid content in composition

| Table 1 (continued) | Organic solid content | | | | Content (%) of compound represented by General Formula (1) with respect to organic solid content | Inorganic substance | | Evaluation | | |
|---|---|---|---|---|---|---|---|---|---|---|
| | Curing accelerator | | Surface modifier | | | | | | | |
| | Kind | Content (%) | Kind | Content (%) | | Kind (Mass ratio in inorganic substance) | Content (%) | Thermal conductivity | Insulating properties | Adhesiveness |
| Example 151 | E-1 | 0.23 | D-2 | 0.23 | 47.1 | Only HP-40 MF100 | 76.39 | A+ | A | A |
| Example 152 | E-1 | 0.23 | D-2 | 0.23 | 43.9 | Only HP-40 MF100 | 76.39 | A+ | A | A |
| Example 153 | E-1 | 0.23 | D-2 | 0.23 | 40.9 | Only HP-40 MF100 | 76.39 | A+ | A | A |
| Example 154 | E-1 | 0.23 | D-2 | 0.23 | 38.2 | Only HP-40 MF100 | 76.39 | A+ | A | B |
| Example 155 | E-2 | 0.23 | | | 57.9 | Only HP-40 MF100 | 76.62 | A+ | A | A |
| Example 156 | E-2 | 0.23 | | | 45.1 | Only HP-40 MF100 | 76.62 | A+ | A | A |
| Example 157 | E-2 | 0.23 | | | 42.2 | Only HP-40 MF100 | 76.62 | A+ | A | A |
| Example 158 | E-2 | 0.23 | | | 51.0 | Only HP-40 MF100 | 76.62 | A+ | A | A |
| Example 159 | E-2 | 0.23 | | | 63.6 | Only HP-40 MF100 | 76.62 | A+ | A | A |
| Example 160 | E-2 | 0.23 | | | 63.6 | Only HP-40 MF100 | 76.62 | A+ | A | A |
| Example 161 | E-2 | 0.23 | | | 49.8 | Only HP-40 MF100 | 76.62 | A+ | A | A |
| Example 162 | E-2 | 0.23 | | | 50.1 | Only HP-40 MF100 | 76.62 | A+ | A | A |
| Example 163 | E-3 | 0.23 | | | 57.9 | Only HP-40 MF100 | 76.62 | A+ | A | A |
| Example 164 | E-3 | 0.23 | | | 45.1 | Only HP-40 MF100 | 76.62 | A+ | A | A |
| Example 165 | E-3 | 0.23 | | | 42.2 | Only HP-40 MF100 | 76.62 | A+ | A | A |
| Example 166 | E-3 | 0.23 | | | 51.0 | Only HP-40 MF100 | 76.62 | A+ | A | A |
| Example 167 | E-3 | 0.23 | | | 63.6 | Only HP-40 MF100 | 76.62 | A+ | A | A |
| Example 168 | E-3 | 0.23 | | | 63.6 | Only HP-40 MF100 | 76.62 | A+ | A | A |
| Example 169 | E-3 | 0.23 | | | 49.8 | Only HP-40 MF100 | 76.62 | A+ | A | A |
| Example 170 | E-3 | 0.23 | | | 50.1 | Only HP-40 MF100 | 76.62 | A+ | A | A |

TABLE 7

| Table 1 (continued) | Phenolic compound | | | Compound represented by General Formula (1) | | | Other epoxy compounds | | | Dispersant Content (%) |
|---|---|---|---|---|---|---|---|---|---|---|
| | Kind | Hydroxyl group content (mmol/g) | Content (%) | Kind | Epoxy group content (mmol/g) | Content (%) | Kind | Epoxy group content (mmol/g) | Content (%) | |
| Example 171 | A-2 | 8.4 | 12.5 | B-1 | 9.9 | 10.5 | | | | 0.15 |
| Example 172 | A-2 | 8.4 | 12.7 | B-2 | 10.4 | 10.3 | | | | 0.15 |
| Example 173 | A-2 | 8.4 | 13.0 | B-3 | 10.9 | 10.0 | | | | 0.15 |
| Example 174 | A-2 | 8.4 | 12.6 | B-4 | 10.2 | 10.4 | | | | 0.15 |
| Example 175 | A-2 | 8.4 | 12.6 | B-5 | 10.2 | 10.4 | | | | 0.15 |
| Example 176 | A-2 | 8.4 | 13.1 | B-6 | 11.1 | 9.9 | | | | 0.15 |
| Example 177 | A-2 | 8.4 | 11.5 | B-7 | 8.4 | 11.5 | | | | 0.15 |
| Example 178 | A-2 | 8.4 | 11.9 | B-8 | 9.0 | 11.1 | | | | 0.15 |
| Example 179 | A-2 | 8.4 | 12.6 | B-9 | 10.2 | 10.4 | | | | 0.15 |
| Example 180 | A-2 | 8.4 | 13.3 | B-10 | 11.6 | 9.7 | | | | 0.15 |
| Example 181 | A-2 | 8.4 | 14.0 | B-11 | 13.0 | 9.0 | | | | 0.15 |
| Comparative Example 1 | A-2 | 8.4 | 12.0 | | | | C-3 | 9.2 | 11.0 | 0.15 |
| Comparative Example 2 | A-7 | 10.2 | 9.5 | B-1 | 9.9 | 5.4 | C-2 | 5.3 | 8.1 | 0.15 |
| Comparative Example 3 | A-7 | 10.2 | 9.1 | B-1 | 9.9 | 4.2 | C-2 | 5.3 | 9.7 | 0.15 |
| Comparative Example 4 | A-7 | 10.2 | 8.7 | B-1 | 9.9 | 2.9 | C-2 | 5.3 | 11.4 | 0.15 |
| Comparative Example 5 | A-7 | 10.2 | 8.3 | B-1 | 9.9 | 1.5 | C-2 | 5.3 | 13.3 | 0.15 |

| Table 1 (continued) | Organic solid content | | | | Content (%) of compound represented by General Formula (1) with respect to organic solid content | Inorganic substance | | Evaluation | | |
|---|---|---|---|---|---|---|---|---|---|---|
| | Curing accelerator | | Surface modifier | | | Kind (Mass ratio in inorganic substance) | Content (%) | Thermal conductivity | Insulating properties | Adhesiveness |
| | Kind | Content (%) | Kind | Content (%) | | | | | | |
| Example 171 | E-1 | 0.23 | D-3 | 0.08 | 44.9 | HP-40 MF 100/AA-3/AA-04 = 47/40/13 | 76.54 | A | A | A |
| Example 172 | E-1 | 0.23 | D-3 | 0.08 | 43.8 | HP-40 MF 100/AA-3/AA-04 = 47/40/13 | 76.54 | A | A | A |
| Example 173 | E-1 | 0.23 | D-3 | 0.08 | 42.6 | HP-40 MF 100/AA-3/AA-04 = 47/40/13 | 76.54 | A | A | A |
| Example 174 | E-1 | 0.23 | D-3 | 0.08 | 44.2 | HP-40 MF 100/AA-3/AA-04 = 47/40/13 | 76.54 | A | A | A |
| Example 175 | E-1 | 0.23 | D-3 | 0.08 | 44.2 | HP-40 MF 100/AA-3/AA-04 = 47/40/13 | 76.54 | A | A | A |
| Example 176 | E-1 | 0.23 | D-3 | 0.08 | 42.2 | HP-40 MF 100/AA-3/AA-04 = 47/40/13 | 76.54 | A | A | A |
| Example 177 | E-1 | 0.23 | D-3 | 0.08 | 48.9 | HP-40 MF 100/AA-3/AA-04 = 47/40/13 | 76.54 | A | A | A |
| Example 178 | E-1 | 0.23 | D-3 | 0.08 | 47.4 | HP-40 MF 100/AA-3/AA-04 = 47/40/13 | 76.54 | A | A | A |
| Example 179 | E-1 | 0.23 | D-3 | 0.08 | 44.2 | HP-40 MF 100/AA-3/AA-04 = 47/40/13 | 76.54 | A | A | A |
| Example 180 | E-1 | 0.23 | D-3 | 0.08 | 41.1 | HP-40 MF 100/AA-3/AA-04 = 47/40/13 | 76.54 | A | A | A |
| Example 181 | E-1 | 0.23 | D-3 | 0.08 | 38.4 | HP-40 MF 100/AA-3/AA-04 = 47/40/13 | 76.54 | B | B | B |
| Comparative Example 1 | E-1 | 0.12 | | | 0.0 | Only HP-40 MF100 | 76.73 | D | D | B |

TABLE 7-continued

| | | | | | | | | |
|---|---|---|---|---|---|---|---|---|
| Comparative Example 2 | E-1 | 0.15 | 23.2 | Only HP-40 MF100 | 76.70 | C | C | B |
| Comparative Example 3 | E-1 | 0.13 | 17.9 | Only HP-40 MF100 | 76.72 | C | C | B |
| Comparative Example 4 | E-1 | 0.12 | 12.3 | Only HP-40 MF100 | 76.73 | C | C | C |
| Comparative Example 5 | E-1 | 0.10 | 6.3 | Only HP-40 MF100 | 76.75 | D | D | C |

From the results shown in the tables, it was confirmed that with the composition according to the embodiment of the present invention, a thermally conductive material having excellent thermally conductive properties can be obtained. Moreover, it was confirmed that the aforementioned thermally conductive material also has excellent insulating properties and adhesiveness.

In addition, it was confirmed that in a case where, in the compound represented by General Formula (1), $Z^1$ is an alkylene group having 1 to 7 carbon atoms (one or more —$CH_2$—'s constituting the alkylene group may be substituted with —O—), the thermally conductive properties, insulating properties, and/or adhesiveness of the obtained thermally conductive material is superior.

Comparison Between Examples in which B-11 was Used as the Compound Represented by General Formula (1), and Examples in which the Other Compound Represented by General Formula (1) was Used, and the Like It was confirmed that in a case where the content of the compound represented by General Formula (1) is 40.0% by mass or greater with respect to the total organic solid content of the composition, the insulating properties and/or adhesiveness of the obtained thermally conductive material is superior.

Comparison Between Examples 89 to 99 and Examples 1 to 11, and the Like

It was confirmed that in a case where the composition does not substantially contain a compound having an epoxy group other than the compound represented by General Formula (1), the insulating properties and/or adhesiveness of the obtained thermally conductive material is superior.

Comparison Between Examples 89 to 99 and Examples 1 to 11, and the Like

It was confirmed that in a case where the content of the inorganic nitride in the composition is 50% by mass or greater with respect to the total mass of the inorganic substance, the thermally conductive properties of the obtained thermally conductive material are superior.

Comparison Between Examples 171 to 181 and Examples 12 to 22, and the Like

It was confirmed that in a case where the composition contains the surface modifier for an inorganic nitride, the thermally conductive properties and insulating properties of the obtained thermally conductive material are superior. (Comparison between Example 22 and Examples 143 and 154, and the like)

What is claimed is:

1. A composition for forming a thermally conductive material, comprising:
   a compound represented by General Formula (1);
   a phenolic compound; and
   an inorganic substance,
   wherein the phenolic compound is a compound represented by General Formula (P1) or General Formula (P2), or a compound represented by any one of General Formulae (B01) to (B03) and having one or more phenolic hydroxyl groups, and
   wherein a content of the compound represented by General Formula (1) is 40.0% by mass or greater with respect to a total organic solids content, $$(X-Z^1-)_m\text{-}A\text{-}(-Z^2-Y)_n \quad (1)$$

in General Formula (1), m represents an integer of 3 or greater,
n represents an integer of 0 or greater,
X represents an epoxy group,
Y represents a hydroxyl group,
$Z^1$ and $Z^2$ each independently represents a single bond or an alkylene group having 1 to 7 carbon atoms,
one or more —$CH_2$—'s constituting the alkylene group may be substituted with —O—,
A represents an (m+n)-valent aliphatic saturated hydrocarbon group,
one or more —$CH_2$—'s constituting the aliphatic saturated hydrocarbon group may be substituted with —O—,
one or more —CH<'s constituting the aliphatic saturated hydrocarbon group may be substituted with —N<,
in a case where there are a plurality of X's, the plurality of X's may be the same as or different from each other,
in a case where there are a plurality of Y's, the plurality of Y's may be the same as or different from each other,
in a case where there are a plurality of $Z^1$'s, the plurality of $Z^1$'s may be the same as or different from each other, and
in a case where there are a plurality of $Z^2$'s, the plurality of $Z^2$'s may be the same as or different from each other and,

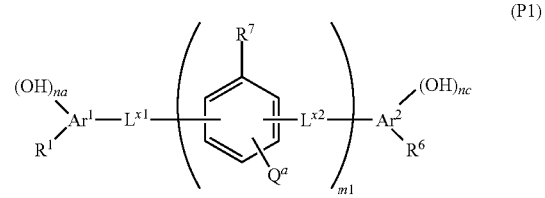

(P1)

in General Formula (P1), m1 represents an integer of 0 or greater,
na and nc each independently represents an integer of 1 or greater, $R^1$ and $R^6$ each independently represents a hydrogen atom, a halogen atom, a carboxylic acid group, a boronic acid group, an aldehyde group, an alkyl group, an alkoxy group, or an alkoxycarbonyl group, $R^7$ represents a hydrogen atom or a hydroxyl group, $L^{x1}$ represents a single bond, —C($R^2$)($R^3$)—, or —CO—, where $R^2$ and $R^3$ each independently represents a hydrogen atom or a substituent, $L^{x2}$ represents a single bond, —C($R^4$)($R^5$)—, or —CO—, where $R^4$ and $R^5$ each independently represents a hydrogen atom or a substituent, $Ar^1$ and $Ar^2$ each independently represents a benzene ring group or a naphthalene ring group, $Q^a$ represents a hydrogen atom, an alkyl group, a phenyl group, a halogen atom, a carboxylic acid group, a boronic acid group, an aldehyde group, an alkoxy group, or an alkoxycarbonyl group,

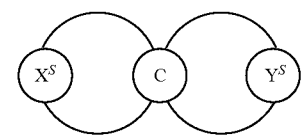
(P2)

in General Formula (P2), C represents a carbon atom which is a spiro atom, $X^S$ and $Y^S$ each independently represents a divalent linking group having one or more phenolic hydroxyl groups, provided that both terminals of $X^S$ are each bonded to the same carbon atom C, both terminals of $Y^S$ are each bonded to the same carbon atom C, the carbon atom C to which the both terminals of $X^S$ are bonded, and the carbon atom C to which the both terminals of $Y^S$ are bonded are the same, and the compound represented by General Formula (P2) is a spiro compound having the carbon atom C as a spiro atom,

(B01)

in General Formula (B01), mB represents an integer of 0 or greater, and in a case where mB is 0, $Z^B$ is directly bonded to $X^B$, provided that a plurality of mB's may be the same as or different from each other, nB represents an integer 3 to 6, $X^B$ represents a benzene ring group or a heterocyclic group which may have a substituent, $L^{1B}$ represents an arylene group which may have a substituent, an ester group, an ether group, a thioester group, a thioether group, a carbonyl group, —$NR^N$—, an azo group, or an unsaturated hydrocarbon group which may have a substituent, where $R^N$ represents a hydrogen atom or a substituent, provided that in a case where there are a plurality of $L^{1B}$'s, the plurality of $L^{1B}$'s may be the same as or different from each other, $Z^B$ represents an aromatic ring group which may have a substituent, provided that a plurality of $Z^B$'s may be the same as or different from each other,

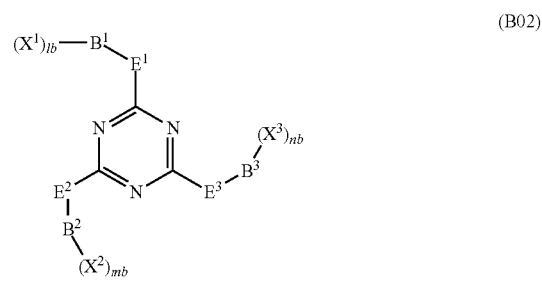
(B02)

in General Formula (B02), $E^1$ to $E^3$ each independently represents a single bond, —NH—, or —NR—, where R represents a substituent, provided that in a case where there are a plurality of —NR—'s among $E^1$ to $E^3$, the plurality of R's may be the same as or different from each other, $B^1$ to $B^3$ each independently represents an aromatic ring group which may have a substituent and has 6 or more carbon atoms as ring member atoms, lb, mb, and nb each independently represents an integer of 0 or greater, provided that in a case where lb is 2 or greater, the plurality of $X^1$'s may be the same as or different from each other, and in a case where mb is 2 or greater, the plurality of $X^2$'s may be the same as or different from each other, and in a case where nb is 2 or greater, the plurality of $X^3$'s may be the same as or different from each other, $X^1$ to $X^3$ each independently represents a group represented by General Formula (B2R),

(B2R)

in General Formula (B2R), * represents a position bonded to any one of $B^1$ to $B^3$, $D^1$ represents a single bond or a divalent linking group, $A^1$ represents an aromatic ring group which may have a substituent and has 6 or more carbon atoms as ring member atoms, or a cycloalkane ring group which may have a substituent and has 6 or more carbon atoms as ring member atoms, $Q^B$ and $Y^1$ each independently represents a specific functional group selected from the group consisting of an aldehyde group, a boronic acid group, a hydroxyl group, a monovalent group having an epoxy group, an amino group, a thiol group, a carboxylic acid group, a monovalent group having a carboxylic acid anhydride group, an isocyanate group, and a monovalent group having an oxetanyl group, p represents an integer of 0 or greater, q represents an integer of 0 to 2, (B03)

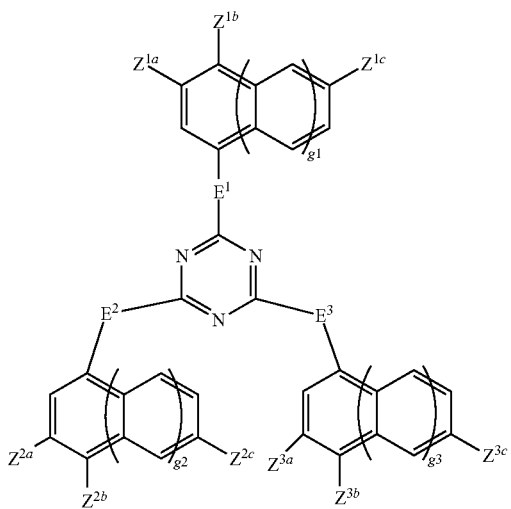

in General Formula (B03), $E^1$ to $E^3$ each independently represents a single bond, —NH—, or —NR—, where R represents a substituent, $g^1$ to $g^3$ each independently represents an integer of 0 or 1, $Z^{1a}$ to $Z^{1c}$, $Z^{2a}$ to $Z^{2c}$, and $Z^{3a}$ to $Z^{3c}$ each independently represents a hydrogen atom or the group represented by General Formula (B2R), provided that a total of two or more among $Z^{1a}$ to $Z^{1c}$, $Z^{2a}$ to $Z^{2c}$, and $Z^{3a}$ to $Z^{3c}$ are the groups represented by General Formula (B2R).

2. The composition for forming a thermally conductive material according to claim 1,
wherein $Z^1$ is the alkylene group.

3. The composition for forming a thermally conductive material according to claim 1,
wherein a compound having an epoxy group, other than the compound represented by General Formula (1), is not substantially contained.

4. The composition for forming a thermally conductive material according to claim 1,
wherein a hydroxyl group content of the phenolic compound is 7.0 mmol/g or greater.

5. The composition for forming a thermally conductive material according to claim 1, further comprising a curing accelerator.

6. The composition for forming a thermally conductive material according to claim 1,
wherein the inorganic substance includes an inorganic nitride.

7. The composition for forming a thermally conductive material according to claim 6,
wherein the inorganic nitride includes boron nitride.

8. The composition for forming a thermally conductive material according to claim 6,
wherein a content of the inorganic nitride is 50% by mass or greater with respect to a total mass of the inorganic substance.

9. The composition for forming a thermally conductive material according to claim 6, further comprising a curing accelerator.

10. The composition for forming a thermally conductive material according to claim 9, further comprising a surface modifier for the inorganic nitride.

11. The composition for forming a thermally conductive material according to claim 6, further comprising a surface modifier for the inorganic nitride.

12. A thermally conductive material which is obtained by curing the composition for forming a thermally conductive material according to claim 1.

* * * * *